(12) United States Patent
Lee

(10) Patent No.: US 9,594,919 B2
(45) Date of Patent: Mar. 14, 2017

(54) SYSTEM AND METHOD FOR EXECUTING FILE BY USING BIOMETRIC INFORMATION

(71) Applicant: SAMSUNG ELECTRONICS CO., LTD., Suwon-si (KR)

(72) Inventor: Jung-kyuen Lee, Suwon-si (KR)

(73) Assignee: SAMUNSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/663,919

(22) Filed: Mar. 20, 2015

(65) Prior Publication Data

US 2015/0269389 A1    Sep. 24, 2015

(30) Foreign Application Priority Data

Mar. 21, 2014 (KR) .................. 10-2014-0033693
May 23, 2014 (KR) .................. 10-2014-0062623

(51) Int. Cl.
*G06F 21/62* (2013.01)
*G06F 21/32* (2013.01)
*H04L 29/06* (2006.01)

(52) U.S. Cl.
CPC .......... *G06F 21/6209* (2013.01); *G06F 21/32* (2013.01); *H04L 63/0428* (2013.01); *H04L 63/0435* (2013.01); *H04L 63/0861* (2013.01)

(58) Field of Classification Search
USPC ................. 235/379; 705/14.58, 41; 726/7
See application file for complete search history.

(56) References Cited

U.S. PATENT DOCUMENTS

| | | |
|---|---|---|
| 2006/0069923 A1 | 3/2006 | Ito et al. |
| 2006/0150211 A1 | 7/2006 | Ritter |
| 2006/0206725 A1* | 9/2006 | Milgramm ............ G06F 21/32 713/186 |
| 2007/0255963 A1 | 11/2007 | Pizano et al. |
| 2010/0008506 A1 | 1/2010 | Park et al. |
| 2010/0039218 A1* | 2/2010 | Cohen ............ H04L 29/12594 340/5.8 |
| 2010/0316260 A1 | 12/2010 | Nenni, Jr. |
| 2011/0047237 A1* | 2/2011 | Walsh ................ G06Q 10/10 709/207 |
| 2012/0240195 A1* | 9/2012 | Weiss ................ H04L 63/0846 726/4 |

(Continued)

FOREIGN PATENT DOCUMENTS

WO    0163386 A1    8/2001

OTHER PUBLICATIONS

Communication dated Jun. 4, 2015, issued by the International Searching Authority in counterpart International Application No. PCT/KR2015/002796 (PCT/ISA/210 & PCT/ISA/237).

(Continued)

*Primary Examiner* — Allyson Trail
(74) *Attorney, Agent, or Firm* — Sughrue Mion, PLLC

(57) ABSTRACT

Provided are a first device for transmitting data, a second device for receiving data, and a system including the same. The first device includes: a controller configured to obtain biometric information of the second user; and a transceiver configured to transmit, to the device of the second user, the data and to transmit, to the device of the second user, the obtained biometric information to control an access to the data by the second user.

21 Claims, 60 Drawing Sheets

(56) References Cited

U.S. PATENT DOCUMENTS

| | | | |
|---|---|---|---|
| 2012/0297190 A1 | 11/2012 | Shen et al. | |
| 2013/0254533 A1 | 9/2013 | Welch et al. | |
| 2013/0333015 A1* | 12/2013 | Reynolds | H04L 63/0861 726/7 |
| 2013/0339749 A1 | 12/2013 | Spuehier et al. | |
| 2014/0032924 A1 | 1/2014 | Durham et al. | |
| 2014/0354401 A1* | 12/2014 | Soni | G06F 21/32 340/5.52 |
| 2015/0227191 A1* | 8/2015 | Pitigoi-Aron | A61B 5/0024 713/189 |

OTHER PUBLICATIONS

Communication dated Jun. 5, 2015, issued by the European Patent Office in counterpart European Application No. 15160137.4.
Alejandro Enrique Flores Zuniga et al: Biometrics for Electronic Health [tecord s11 Journal of Medical Systems, Kluwer Academic Publishers-Plenum Publishers,NE, vol. 34, No. 5, Jun. 2, 2009, pp. 975-983, XP019823693, ISSN: 1573-689X.

* cited by examiner

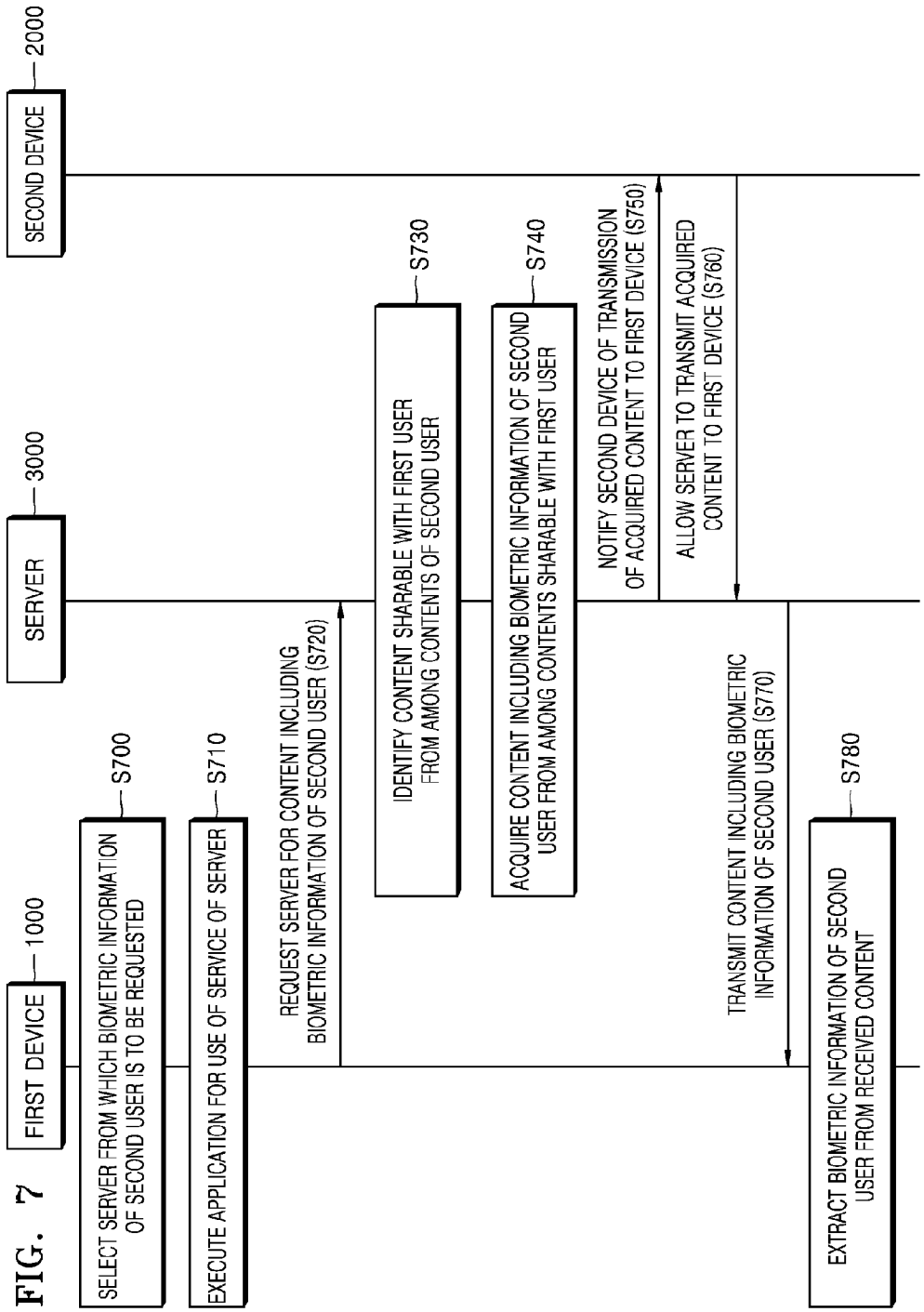

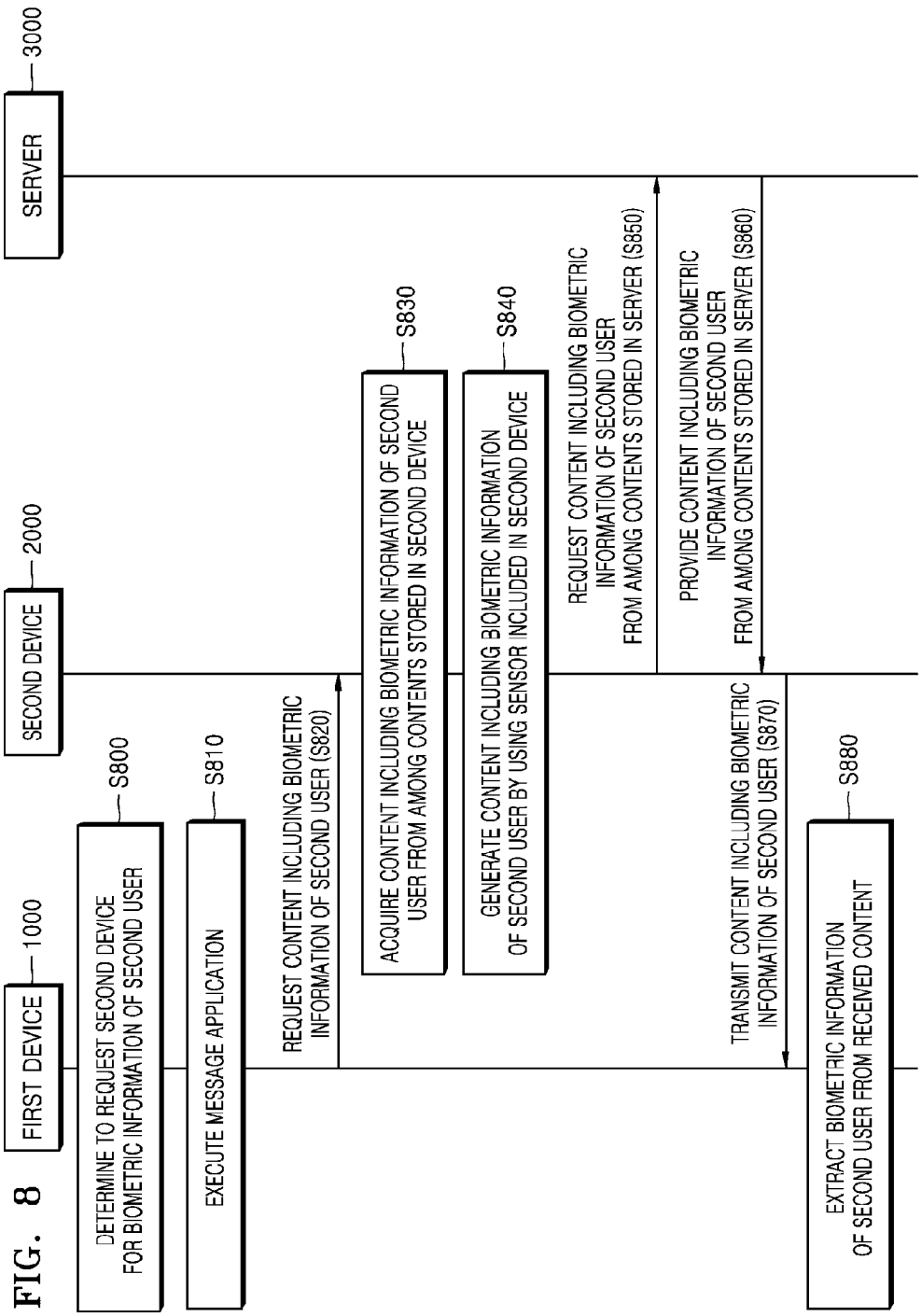

FIG. 19

| NAME OF FIRST FILE | TYPE OF BIOMETRIC INFORMATION | SUBJECT OF BIOMETRIC INFORMATION | BIOMETRIC INFORMATION | NAME OF SECOND FILE |
|---|---|---|---|---|
| FILE A-1 | PUPIL IMAGE | USER A | aaa.jpg | FILE A-2 |
| FILE B-1 | FACE IMAGE | USER A | bbb.jpg | FILE B-2 |
| FILE C-1 | VOICE ("ABC") | USER B | ccc.m4a | FILE C-2 |
| FILE D-1 | FINGERPRINT IMAGE | USER B | ddd.png | FILE D-2 |
| FILE E-1 | FACE IMAGE | USER C | eee.avi | FILE E-2 |
| FILE F-1 | PULSE | USER D | fff.bmp | FILE F-2 |
| ... | ... | ... | ... | ... |

FIG. 46

| NAME OF FILE /460 | SUBJECT OF BIOMETRIC INFORMATION /462 | TYPE OF BIOMETRIC INFORMATION /464 | ENCRYPTION METHOD /466 | STRENGTH OF ENCRYPTION KEY /468 |
|---|---|---|---|---|
| FILE A | FIRST USER | PUPIL IMAGE | METHOD A | HIGH |
| FILE B | SECOND USER | FINGERPRINT IMAGE | METHOD B | MEDIUM |
| FILE C | FIRST USER | VOICE (JAMES) | METHOD A | MEDIUM |
| FILE D | FIRST USER | FACE IMAGE | METHOD C | LOW | ized distribution of files is prevented by
SYSTEM AND METHOD FOR EXECUTING FILE BY USING BIOMETRIC INFORMATION

CROSS-REFERENCE TO RELATED APPLICATIONS

This application claims priority from Korean Patent Application No. 10-2014-0033693, filed on Mar. 21, 2014 in the Korean Intellectual Property Office, and Korean Patent Application No. 10-2014-0062623, filed on May 23, 2014 in the Korean Intellectual Property Office, the disclosures of which are incorporated herein in their entireties by reference.

BACKGROUND

1. Field

Apparatuses and methods consistent with exemplary embodiments relate to executing a file by using biometric information of a user.

2. Description of the Related Art

Due to advances in multimedia technology and network technology, users may easily share files with other users while the unauthor various security technologies. Also, a technology of authenticating a user of a device by using biometric information has been developed.

SUMMARY

One or more exemplary embodiments provide systems and methods for generating a second file including a first file and biometric information of a user who is to use the first file.

One or more exemplary embodiments also provide systems and methods for authenticating execution of a first file included in a second file by using biometric information included in the second file.

According to an aspect of an exemplary embodiment, there is provided a device of a first user for transmitting data to a device of a second user, the device of the first user including: a controller configured to obtain biometric information of the second user; and a transceiver configured to transmit, to the device of the second user, the data and to transmit, to the device of the second user, the obtained biometric information to control an access to the data by the second user.

The device may further include a storage configured to store the biometric information of the second user, wherein the controller may be configured to obtain the biometric information from the storage in response to a selection, by the first user, of the second user.

The controller may be configured to combine the data and the obtained biometric information into a single file to control the access to the data, and the transceiver may be configured to transmit the single file to the device of the second user.

Transceiver may be configured to transmit the data separately from the obtained biometric information.

The controller may be configured to encrypt the data using the obtained biometric information, and the transceiver may be configured to transmit the encrypted data.

The controller may be configured to encrypt the data using an encryption key based on the obtained biometric information, and the transceiver may be configured to transmit the encrypted data.

The controller may be configured to encrypt the data using an encryption key, and the transceiver may be configured to transmit, to the device of the second user, the data, and to transmit, to the device of the second user, the obtained biometric information to control an access to the encryption key.

The transceiver may be configured to transmit, to the device of the second user, the encryption key or information for obtaining the encryption key.

The controller may be configured to encrypt the data and the obtained biometric information using at least one encryption key, and the transceiver may be configured to transmit, to the device of the second user, the data, and to transmit, to the device of the second user, the obtained biometric information to control an access to the data.

The transceiver may be configured to transmit, to the device of the second user, the at least one encryption key or information for obtaining the at least one encryption key.

According to an aspect of another exemplary embodiment, there is provided a device of a second user for receiving data from a device of a first user, the device of the second user including: a transceiver configured to receive, from the device of the first user, data to which access is controlled based on first biometric information of the second user; and a controller configured to obtain second biometric information of the second user and to access the received data using the obtained second biometric information.

The transceiver may be configured to receive, from the device of the first user, the first biometric information, and the controller may be configured to access the received data in response to the obtained second biometric information corresponding to the received first biometric information.

The transceiver may be configured to receive a single file including the data and the first biometric information.

The transceiver may be configured to receive the data separately from the first biometric information.

The received data may be encrypted by the first biometric information, and the controller may be configured to access the data in response to the obtained second biometric information decrypting the data.

The received data may be encrypted using an encryption key based on the first biometric information, and the controller may be configured to access the data in response to a decryption key based on the obtained second biometric information decrypting the data.

The received data may be encrypted using an encryption key, the transceiver may be configured to receive, from the device of the first user, the first biometric information, and the controller may be configured to access the encryption key using the obtained second biometric information.

The transceiver may be configured to receive, from the device of the first user, information for obtaining the encryption key, and the controller may be configured to access the information for obtaining the encryption key using the obtained second biometric information.

According to an aspect of another exemplary embodiment, there is provided a system for transmitting data between devices, the system including: a device of a first user, including: a first controller configured to obtain first biometric information of a second user, and a first transceiver configured to transmit the data and to transmit the obtained first biometric information to control an access to the data by the second user; and a device of the second user, including: a second transceiver configured to receive the data transmitted by the first transceiver, and a second controller configured to obtain second biometric information of the second user and to access the received data using the obtained second biometric information.

The second transceiver may be configured to receive the first biometric information transmitted by the first transceiver, and the second controller may be configured to access the received data in response to the obtained second biometric information corresponding to the received first biometric information.

The system may further include a server configured to receive the data transmitted by the first transceiver, and to transmit the received data to the second transceiver.

BRIEF DESCRIPTION OF THE DRAWINGS

The above and/or other aspects will become apparent and more readily appreciated from the following description of exemplary embodiments, taken in conjunction with the accompanying drawings in which:

FIG. 7 is a flowchart of a method in which the first device selects the server that requests biometric information of the second user and acquires content including the biometric information of the second user from among contents shared between the first user and the second user, according to an exemplary embodiment;

FIG. 8 is a flowchart of a method in which the first device acquires biometric information of the second user from the second device, according to an exemplary embodiment;

FIG. 19 illustrates an example of a packaging information table according to an exemplary embodiment;

FIG. 46 illustrates an example of a table showing metadata of an encrypted file according to an exemplary embodiment;

DETAILED DESCRIPTION OF EXEMPLARY EMBODIMENTS

Figure 1:
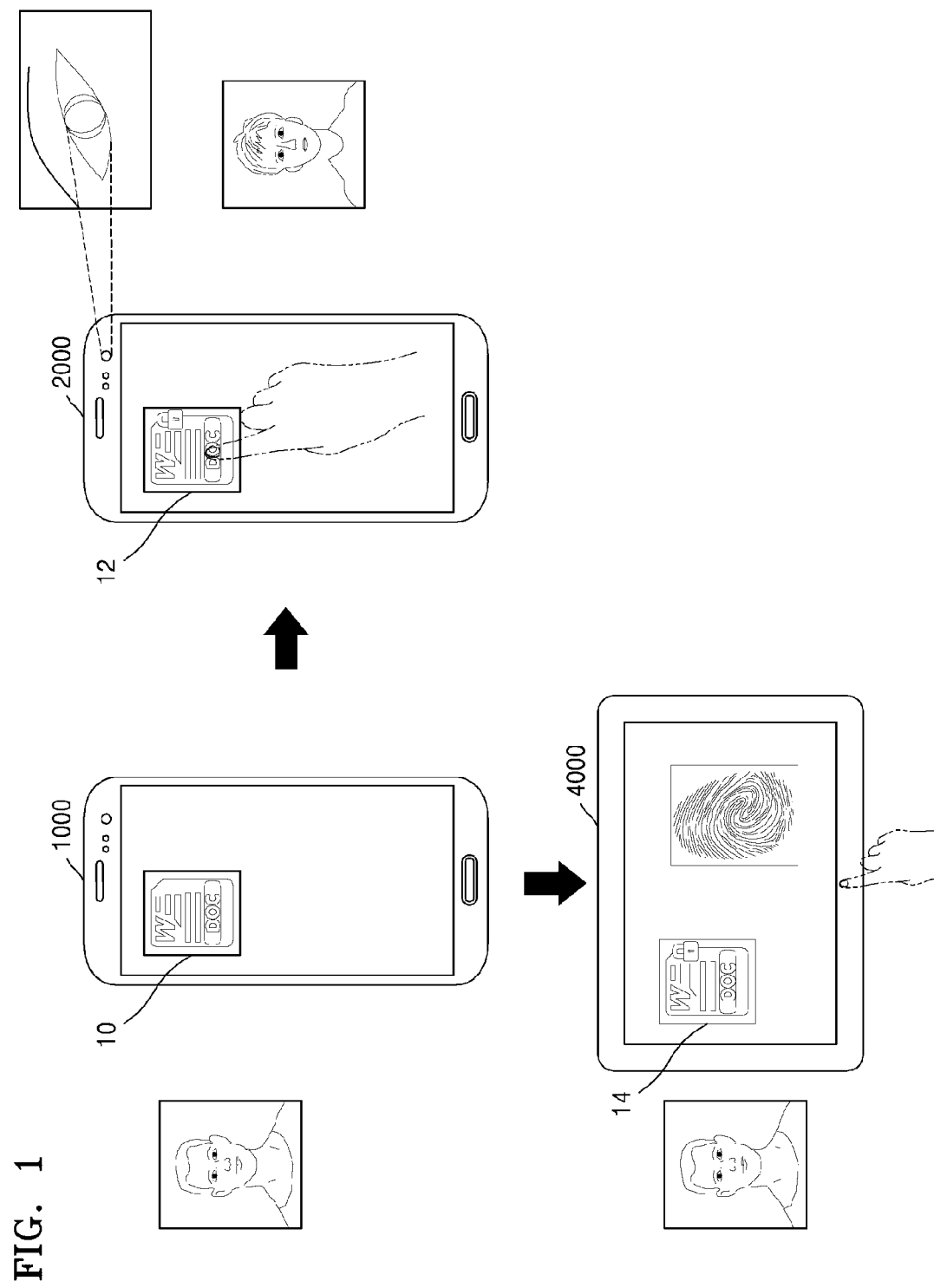
FIG. 1 illustrates an example of setting authentication information of a file and using the file, according to an exemplary embodiment.

Reference will now be made in detail to exemplary embodiments, examples of which are illustrated in the accompanying drawings, wherein like reference numerals refer to like elements throughout. In this regard, exemplary embodiments may have different forms and should not be construed as being limited to the descriptions set forth herein. Accordingly, exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Exemplary embodiments will be described below in detail with reference to the accompanying drawings so that those of ordinary skill in the art may easily implement the exemplary embodiments. In this regard, exemplary embodiments may have different forms and should not be construed as being limited to the descriptions set forth herein. In addition, portions irrelevant to the description of exemplary embodiments will be omitted in the drawings for a clear description of exemplary embodiments.

It will be understood that when an element is referred to as being "connected" to another element, it may be directly connected to the other element or may be electrically connected to the other element with other element(s) interposed therebetween. It will also be understood that the terms "comprises", "includes", and "has", when used herein, specify the presence of stated elements, but do not preclude the presence or addition of other elements, unless otherwise defined.

Also, in the specification, for convenience of description, a user of a first device will be referred to as a first user and a user of a second device will be referred to as a second user.

Hereinafter, exemplary embodiments will be described in detail with reference to the accompanying drawings.

FIG. 1 illustrates an example of setting authentication information of a file and using the file, according to an exemplary embodiment.

Referring to FIG. 1, a first user may own a first device 1000 and a third device 4000, and a second user may own a second device 2000. Also, the first device 1000, the second device 2000, and the third device 4000 may share a file 10 with each other and execute the file 10.

Also, the first device 1000 may set authentication information for execution of the file 10 by using biometric information of the second user. The first device 1000 may generate a packaged file 12 by packaging the file 10 and the biometric information of the second user.

Thereafter, when the second device 2000 executes the packaged file 12, the second device 2000 may perform authentication for execution of the file 10 included in the packaged file 12 by using the biometric information of the second user.

Also, the first device 1000 may set authentication information for execution of the file 10 by using biometric information of the first user. The first device 1000 may generate a packaged file 14 by packaging the file 10 and the biometric information of the first user.

Thereafter, when the third device 4000 executes the packaged file 14, the third device 4000 may perform authentication for execution of the file 10 included in the packaged file 14 by using the biometric information of the first user.

The biometric information may include, for example, at least one of a face image of the user, a fingerprint image of the user, a pupil image of the user, and a voice of the user, although it is understood that one or more exemplary embodiments are not limited thereto.

Also, the first device 1000, the second device 2000, and the third device 4000 may be, for example, at least one of smart phones, tablet personal computers (PCs), PCs, smart televisions (TVs), portable phones, personal digital assistants (PDAs), laptop computers, media players, servers, micro servers, global positioning system (GPS) devices, e-book terminals, digital broadcasting terminals, navigation devices, kiosks, MP3 players, digital cameras, wearable devices, and other mobile or non-mobile computing devices, although it is understood that one or more exemplary embodiments are not limited thereto. Also, the first device 1000, the second device 2000, and the third device 4000 may include various devices, such as electronic boards and touch tables, that may receive a touch input. Also, the first device 1000, the second device 2000, and the third device 4000 may be watches, spectacles, hair bands, and rings that have a communication operability and a data processing operability.

Figure 2:
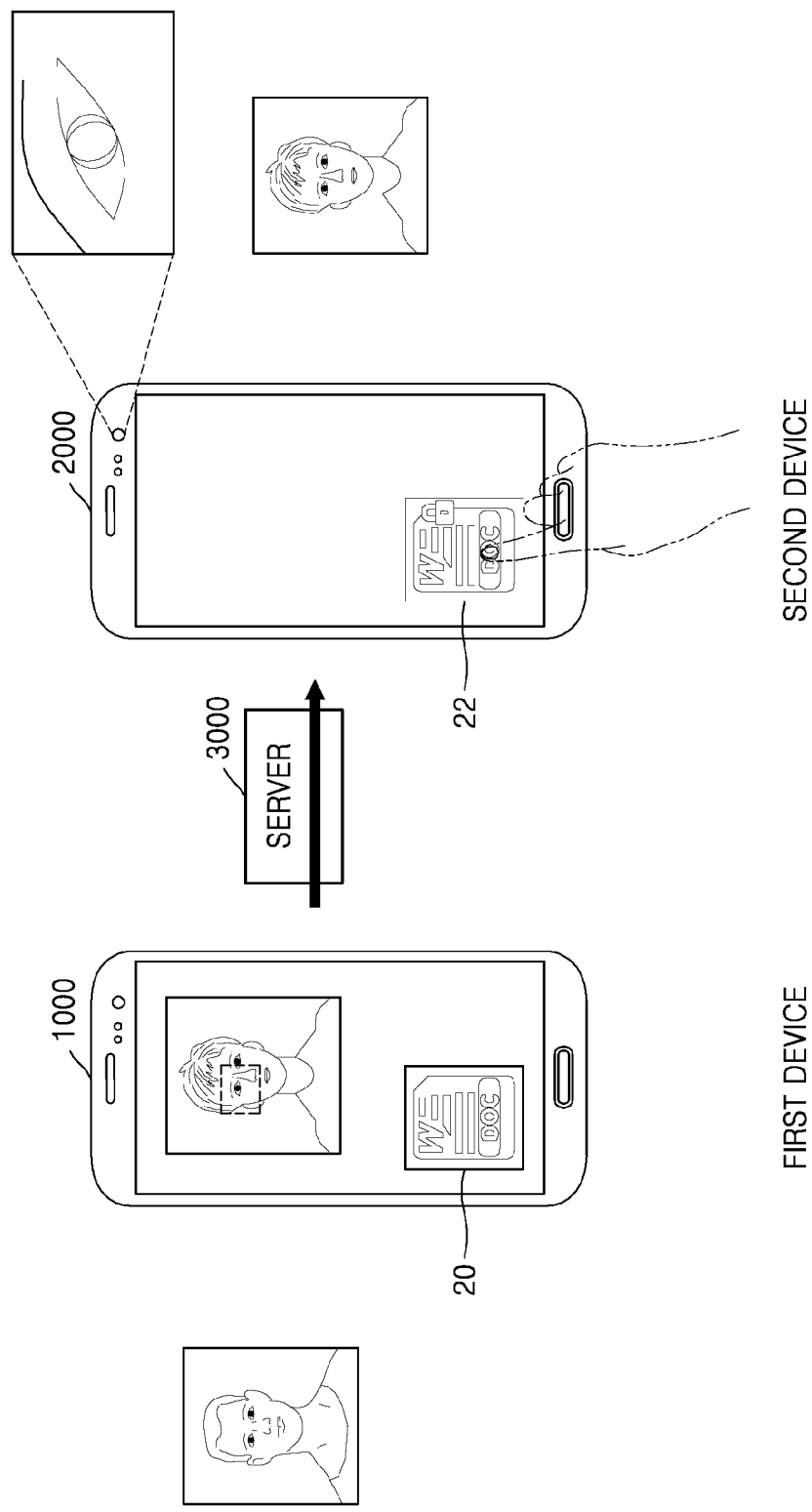
FIG. 2 illustrates an example in which a first device sets authentication information of a file by using biometric information of a second user and a second device receives authentication for execution of the file by using the biometric information of the second user, according to an exemplary embodiment.

FIG. 2 illustrates an example in which the first device 1000 sets authentication information of a file by using biometric information of the second user and the second device 2000 receives authentication for execution of the file by using the biometric information of the second user, according to an exemplary embodiment.

Referring to FIG. 2, the first device 1000 may select a file 20, acquire a pupil image of the second user as biometric information of the second user from a picture of the second user, and set the acquired pupil image of the second user as authentication information for execution of the file 20. Also, the first device 1000 may generate a packaged file 22 by packaging the file 20 and the biometric information of the second user.

The second device 2000 may receive the packaged file 22 from the first device 1000 or a server 3000 (see FIG. 5) and capture a pupil image of the second user in order to execute the file 20 included in the packaged file 22. Also, the second device 2000 may determine whether to execute the file 20 included in the packaged file 22, by comparing the captured pupil image with the biometric information (authentication information) included in the packaged file 22.

Figure 3:
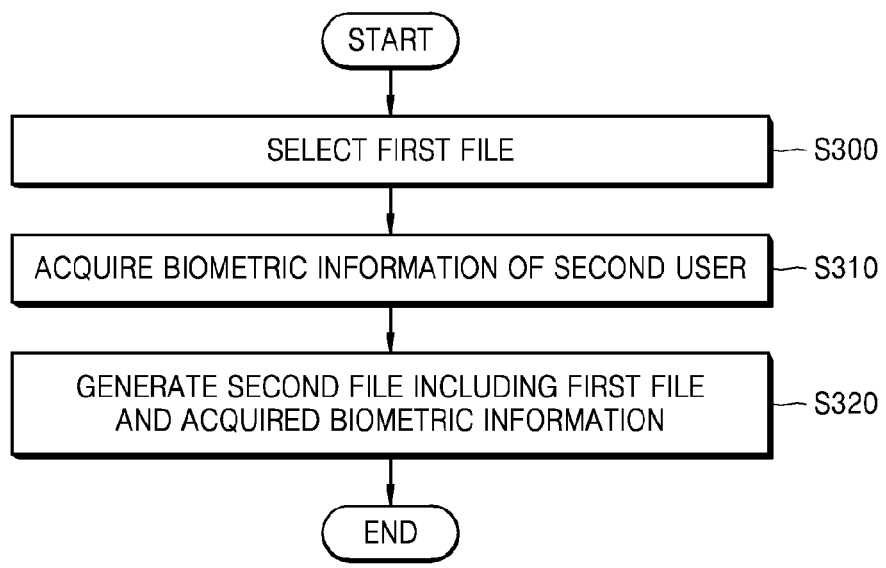
FIG. 3 is a flowchart of a method in which the first device sets biometric information of the second user as authentication information for execution of a file, according to an exemplary embodiment.

FIG. 3 is a flowchart of a method in which the first device 1000 sets biometric information of the second user as authentication information for execution of a file, according to an exemplary embodiment.

Referring to FIG. 3, in operation S300, the first device 1000 may select a first file related to setting of authentication information. The first device 1000 may select the first file for setting of authentication information from among files stored in the first device 1000. Also, the first device 1000 may select the first file for setting of authentication information from among files stored in the server 3000. Furthermore, the first device 1000 may select the first file for setting of authentication information from among files stored in the second device 2000.

The file may be, for example, a file of content, and the contents may include, for example, video contents (e.g., TV program images, video on demand (VOD), user-created contents (UCC), music videos, YouTube images, etc.), still image contents (e.g., pictures, paintings, etc.), text contents (e.g., e-books, letters, e-mails, word processing documents, spreadsheet documents, business documents, etc.), music contents (e.g., music, songs, radio broadcasts, audio broadcasts, etc.), web pages, and application execution information, although it is understood that exemplary embodiments are not limited thereto.

Also, the selected first file may be a file to be transmitted to the second device 2000 of the second user. In this case, the first device 1000 may select the first file for setting of authentication information by executing an application for transmitting the first file to the second device 2000 and selecting the first file to be transmitted to the second device 2000 through the executed application.

In operation S310, the first device 1000 may acquire biometric information of the second user. The first device 1000 may acquire biometric information of the second user by acquiring content including the biometric information of the second user. The first device 1000 may extract biometric information of the second user from the content including the biometric information of the second user, although it is understood that exemplary embodiments are not limited thereto. For example, according to another exemplary embodiment, the first device 1000 may use the content including the biometric information of the second user as the biometric information of the second user.

In further detail, and by way of example, the first device 1000 may acquire a face image of the second user from a picture including a face of the second user from among pictures stored in the first device 1000. Alternatively, the first device 1000 may request the server 3000 for a picture including a face of the second user from among pictures stored in the server 3000, receive the picture including the face of the second user from the server 3000, and acquire a face image of the second user from the received picture. Furthermore, the first device 1000 may request the second device 2000 for a picture including a face of the second user, receive the picture including the face of the second user from the second device 2000, and acquire a face image of the second user from the received picture. The first device 1000 may extract biometric information of the second user from the content including the biometric information of the second user. According to another exemplary embodiment, the first device 1000 may directly acquire the biometric information of the second user, e.g., by capturing an image of the second user.

In operation S320, the first device 1000 may generate a second file including the first file and the biometric information of the second user. The first device 1000 may set the acquired biometric information of the second user as authentication information for execution of the first file. Also, the first device 1000 may generate the second file including the first file and the acquired biometric information of the second user by packaging the first file and the biometric information of the second user. For example, the first device 1000 may package the first file and the acquired biometric information of the second user by combining the first file and the acquired biometric information of the second user (e.g., by combining into a single file, by combining information regarding the biometric information as metadata of the first file, etc.). However, it is understood that exemplary embodiments are not limited thereto. Further, and by way of example, information indicating that biometric information for execution of the first file is to be authenticated and information about a type of biometric information for authentication, a subject of biometric information for authentication, a storage position of biometric information for authentication, and a storage position of a decryption key may be included in the packaged second file or recorded in metadata of the packaged second file, although it is understood that exemplary embodiments are not limited thereto.

Figure 4:
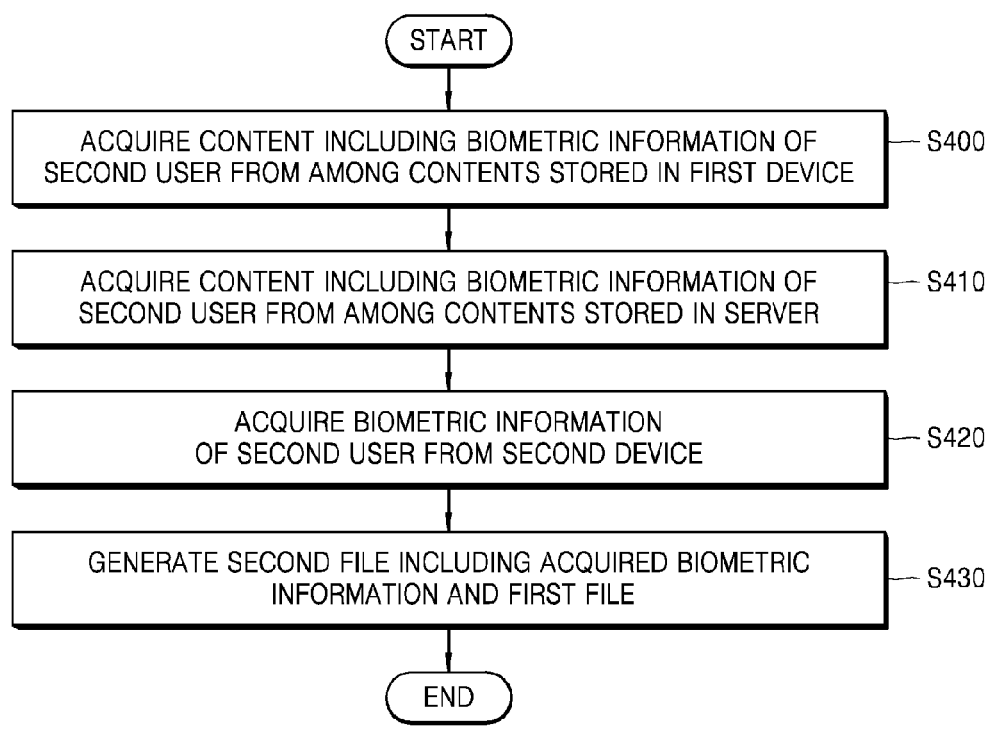
FIG. 4 is a flowchart of a method in which the first device acquires biometric information of the second user, according to an exemplary embodiment.

FIG. 4 is a flowchart of a method in which the first device 1000 acquires biometric information of the second user, according to an exemplary embodiment.

Referring to FIG. 4, in operation S400, the first device 1000 may acquire content including biometric information of the second user from among contents stored in the first device 1000. The first device 1000 may acquire the content including biometric information of the second user from among the contents stored in the first device 1000 by using an identification value (e.g., a name, a nickname, or an ID) of the second user. For example, the first device 1000 may acquire a picture including a face image of the second user by determining whether the identification value of the second user is included in metadata of a picture stored in the first device 1000. Also, the first device 1000 may acquire an audio file including a voice of the second user by determining whether the identification value of the second user is included in metadata of an audio file stored in the first device 1000. Furthermore, the first device 1000 may acquire a fingerprint image of the second user by determining whether the identification value of the second user is included in metadata of a fingerprint image stored in the first device 1000.

Moreover, the first device 1000 may determine the content including biometric information of the second user by displaying a list of acquired contents and receiving a selection input from the first user. In this case, the first device 1000 may extract the biometric information of the second user from the determined content.

However, exemplary embodiments are not limited thereto. For example, according to another exemplary embodiment, the first device 1000 may display a list of contents stored in the first device 1000 and the first user may directly select the content including the biometric information of the second user from the displayed list of contents. In this case, by way of example, the first device 1000 may execute a contact address application and display a user list including an image of the second user on an execution screen of the contact address application, and the first user may select the image of the second user from the displayed user list. For example, the first device 1000 may execute an image viewer application and display a picture list on an execution screen of the image viewer application, and the first user may select an image of the second user from the displayed picture list. Also, the first device 1000 may record a voice of the second user during a voice call or a video call with the device of the second user. Furthermore, the first device 1000 may capture an image of the second user during a video call with the device of the second user.

In operation S410, the first device 1000 may acquire content including biometric information of the second user from among contents stored in the server 3000. The first device 1000 may request the server 3000 for the content including the biometric information of the second user by transmitting the identification value of the second user to the server 3000. Also, the server 3000 may acquire the content including the biometric information of the second user from among the contents stored in the server 3000 by using the identification value of the second user and may transmit the acquired content to the first device 1000.

However, exemplary embodiments are not limited thereto. For example, according to another exemplary embodiment, the server 3000 may provide a list of contents stored in the server 3000 to the first device 1000, the first device 1000 may display the provided list of contents, and the first user may directly select the content including the biometric information of the second user from the displayed list of contents. In this case, by way of example, the first device 1000 may receive contact address information including a user image from the server 3000, display the received contact address information, and select an image of the second user from the displayed contact address information based on a user input of the first user.

In operation S420, the first device 1000 may acquire biometric information of the second user from the second device 2000. The first device 1000 may request the second device 2000 to transmit content including biometric information of the second user and receive the content including the biometric information of the second user from the second device 2000. For example, the first device 1000 may transmit a push message for requesting the content including the biometric information of the second user to the second device 2000. Also, the first device 1000 may execute a messenger application and transmit a message for requesting the content including the biometric information of the second user to the second device 2000 through the executed messenger application.

Furthermore, in response to the request of the first device 1000, the second device 2000 may acquire the content including the biometric information of the second user from among the contents stored in the second device 2000 and transmit the acquired content to the first device 1000. Alternatively, by way of example, in response to the request of the first device 1000, the second device 2000 may acquire the content including the biometric information of the second user from among the contents stored in the server 3000 and transmit the acquired content to the first device 1000.

In response to the request of the first device 1000, the second device 2000 may generate the content including the biometric information of the second user in real time and transmit the generated content to the first device 1000. In this case, in response to the request of the first device 1000, the second device 2000 may automatically perform an operation for generating the content including the biometric information of the second user in real time. For example, in response to the request of the first device 1000, the second device 2000 may automatically activate a photographing function or a recording function of the second device 2000. However, exemplary embodiments are not limited thereto.

In operation S430, the first device 1000 may generate a second file including the first file and the acquired biometric information.

Figure 5:
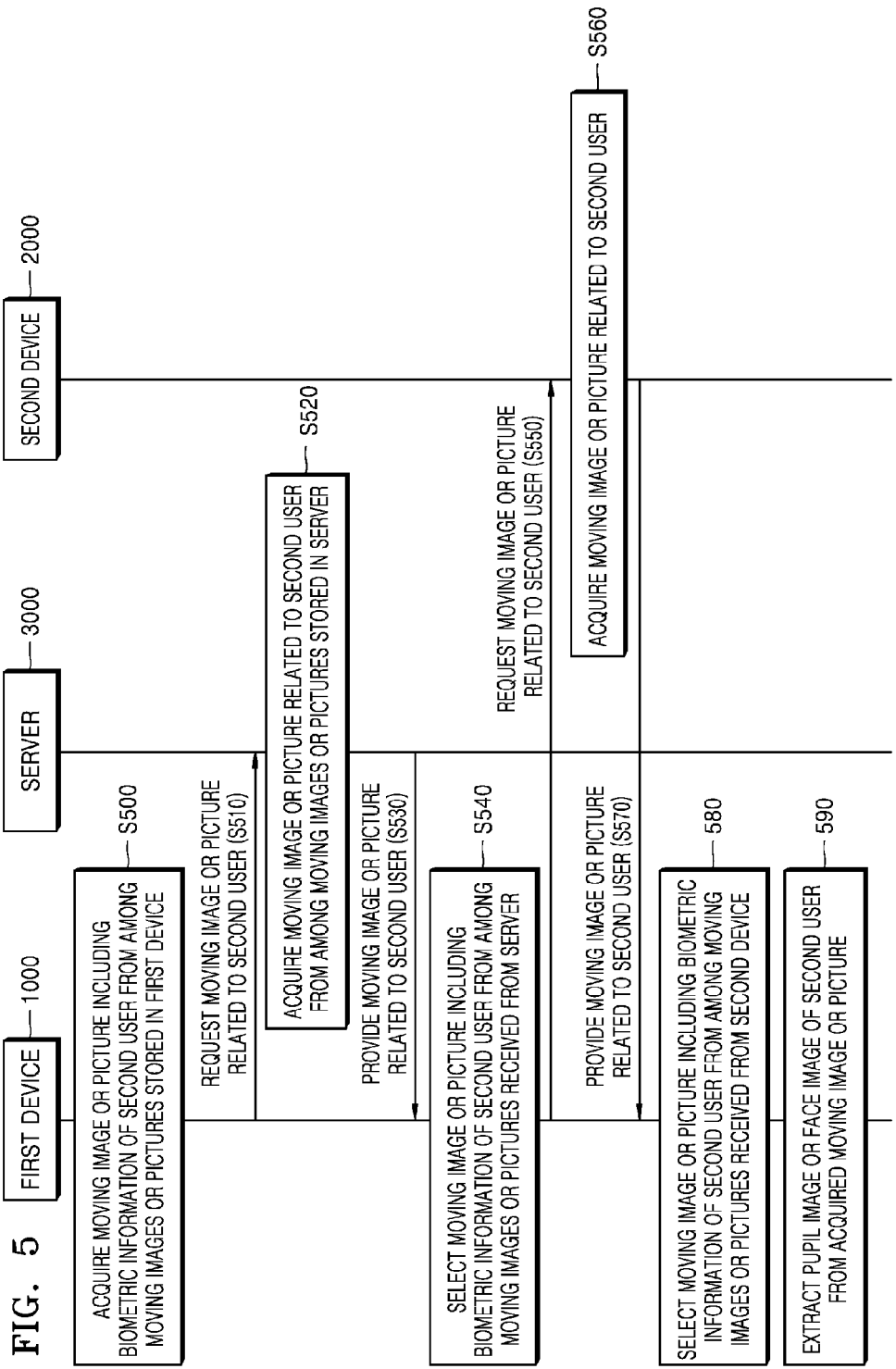
FIG. 5 is a flowchart of a method in which the first device acquires a moving image or a picture including a pupil image or a face image of the second user from a server and the second device, according to an exemplary embodiment.

FIG. 5 is a flowchart of a method in which the first device 1000 acquires a moving image or a picture including a pupil image or a face image of the second user from the server 3000 and the second device 2000, according to an exemplary embodiment.

Referring to FIG. 5, in operation S500, the first device 1000 may acquire a moving image or a picture including biometric information of the second user from among moving images or pictures stored in the first device 1000. The first device 1000 may display a list of moving images or pictures stored in the first device 1000. In this case, the first device 1000 may display a list of moving images or pictures related to the second user by comparing the identification value of the second user with metadata of a moving image or a picture stored in the first device 1000, although it is understood that exemplary embodiments are not limited thereto. The moving image or picture related to the second user may be a moving image or picture including an image of the second user. For example, according to another exemplary embodiment, the first device 1000 may select a moving image or a picture including biometric information of the second user from among a list of moving images or pictures based on a selection input of the first user.

For example, when a file for setting authentication information is selected, the first device 1000 may display an execution screen of the contact address application on a screen of the first device 1000. Also, the first device 1000 may acquire a face image of the second user by selecting the second user from a user list displayed in the execution screen of the contact address application.

In operation S510, the first device 1000 may request the server 3000 for a moving image or a picture related to the second user. In this case, the first device 1000 may transmit the identification value of the second user to the server 3000. For example, the first device 1000 may transmit at least one of a name of the second user, a service ID of the second user, etc., to the server 3000.

In operation S520, the server 3000 may acquire a moving image or a picture related to the second user from among moving images or pictures stored in the server 3000. For example, the server 3000 may acquire a moving image or a picture stored in the server 3000 by the second user. Also, the server 3000 may acquire a moving image or a picture having metadata including the identification value of the second user. Furthermore, the server 3000 may acquire a moving image or a picture including a face or pupil of the second user.

The server 3000 may acquire a moving image or a picture related to the second user from among moving images or pictures stored in another server, in another device, or in the second device 2000.

In operation S530, the server 3000 may provide the first device 1000 with one or more moving images or pictures related to the second user. Here, the server 3000 may provide the first device 1000 with a thumbnail image or partial image of a moving image or a picture related to the second user. However, it is understood that exemplary embodiments are not limited thereto, and the server 3000 may provide the first device 1000 with original data of a moving image or a picture related to the second user.

In operation S540, the first device 1000 may select a moving image or a picture including biometric information of the second user from among moving images or pictures received from the server 3000. For example, the first device 1000 may display a list of moving images or pictures received from the server 3000 on the screen of the first device 1000 and select a moving image or a picture including biometric information of the second user based on a selection input of the first user.

In a case where the server 3000 has provided the first device 1000 with a thumbnail image of a moving image or a picture related to the second user, when the first device 1000 selects a moving image or picture, the first device 1000 may receive original data of the selected moving image or picture from the server 3000.

In operation S550, the first device 1000 may request the second device 2000 for a moving image or a picture including biometric information of the second user. For example, the first device 1000 may transmit the identification value of the second user to the second device 2000.

In operation S560, the second device 2000 may acquire a moving image or a picture related to the second user from among moving images or pictures stored in the second device 2000. For example, the second device 2000 may acquire a moving image or a picture having metadata including the identification value of the second user. Also, the second device 2000 may acquire a moving image or a picture including a face or fingerprint of the second user.

The second device 2000 may acquire a moving image or a picture related to the second user from among moving images or pictures stored in another server or in another device.

In operation S570, the second device 2000 may provide the first device 1000 with one or more moving images or pictures related to the second user. Here, the second device 2000 may provide the first device 1000 with a thumbnail image of a moving image or a picture related to the second user. However, it is understood that exemplary embodiments are not limited thereto, and the second device 2000 may provide the first device 1000 with original data of a moving image or a picture related to the second user.

In operation S580, the first device 1000 may select a moving image or a picture including biometric information of the second user from among moving images or pictures received from the second device 2000. The first device 1000 may display a list of moving images or pictures received from the server 2000 on the screen of the first device 1000 and select a moving image or a picture including biometric information of the second user based on a selection input of the first user.

In a case where the second device 2000 has provided the first device 1000 with a thumbnail image of a moving image or a picture related to the second user, when the first device 1000 selects a moving image or picture, the first device 1000 may receive original data of the selected moving image or picture from the second device 2000.

In operation S590, the first device 1000 may extract a pupil image or a face image of the second user from the moving image or the picture including the biometric information of the second user. The first device 1000 may select at least one moving image or picture from among the one or more moving images or pictures including the biometric information of the second user and extract a pupil image or face image of the second user from the selected moving image or picture.

Figure 6:
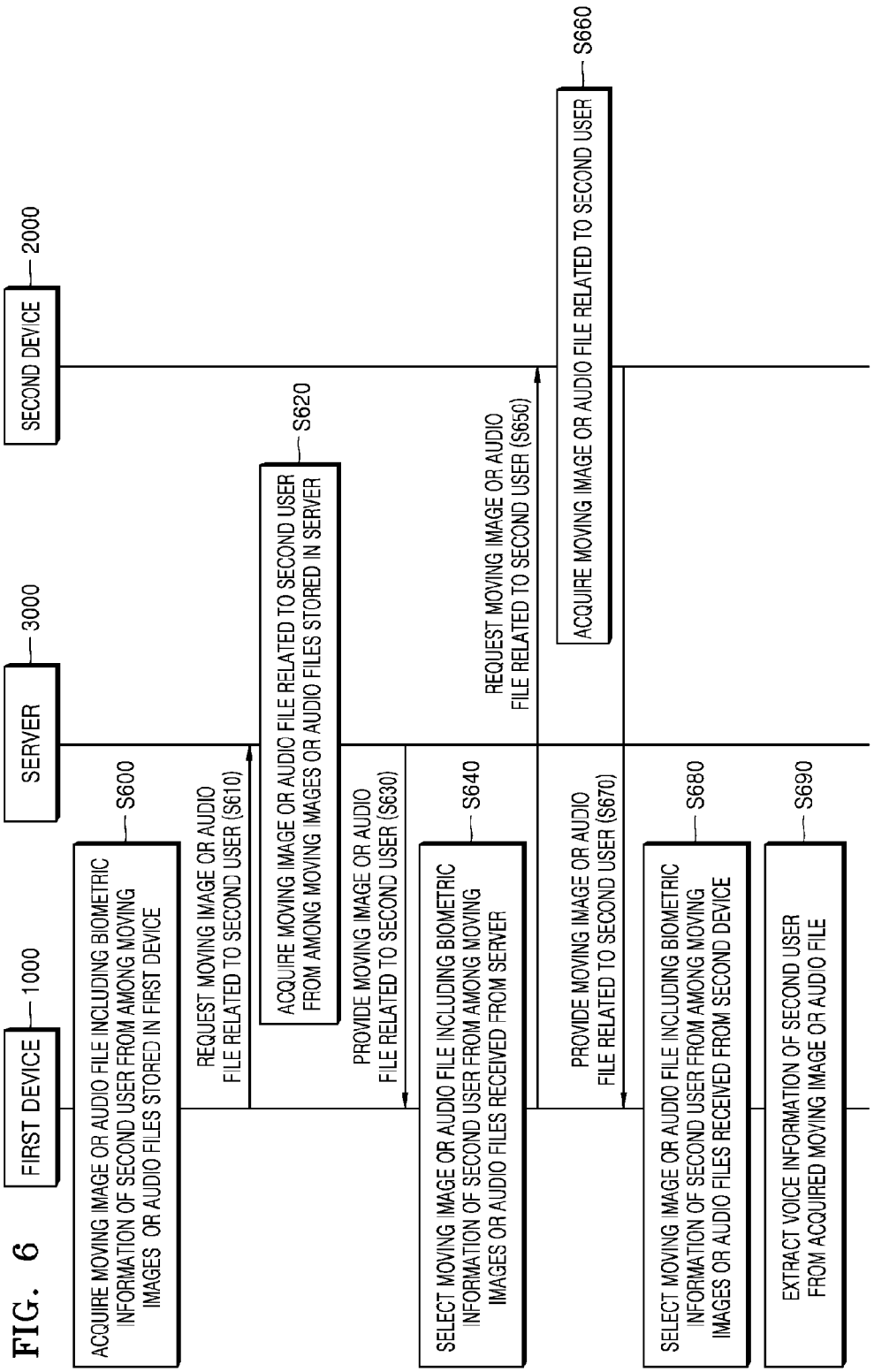
FIG. 6 is a flowchart of a method in which the first device acquires a moving image or an audio file including voice information of the second user from the server and the second device, according to an exemplary embodiment.

FIG. 6 is a flowchart of a method in which the first device 1000 acquires a moving image or an audio file including voice information of the second user from the server 3000 and the second device 2000, according to an exemplary embodiment. In FIG. 6, a video file may be a file corresponding to a recorded video call, and an audio file may be a file corresponding to a recorded voice call, although it is understood that exemplary embodiments are not limited thereto.

Referring to FIG. 6, in operation S600, the first device 1000 may acquire a moving image or an audio file including biometric information of the second user from among moving images or audio files stored in the first device 1000. The first device 1000 may display a list of moving images or audio files stored in the first device 1000. In this case, the first device 1000 may display a list of moving images or audio files related to the second user by comparing the identification value of the second user with metadata of a moving image or an audio file stored in the first device 1000, although it is understood that exemplary embodiments are not limited thereto. The moving image or picture related to the second user may be a moving image or picture including an image of the second user. For example, according to another exemplary embodiment, the first device 1000 may select a moving image or an audio file including biometric information of the second user from among a list of moving images or audio files based on a selection input of the first user.

In operation S610, the first device 1000 may request the server 3000 for a moving image or an audio file related to the second user. In this case, the first device 1000 may transmit the identification value of the second user to the server 3000. For example, the first device 1000 may transmit at least one of a name of the second user, a service ID of the second user, etc., to the server 3000.

In operation S620, the server 3000 may acquire a moving image or an audio file related to the second user from among moving images or audio files stored in the server 3000. For example, the server 3000 may acquire a moving image or an audio file stored in the server 3000 by the second user. Also, the server 3000 may acquire a moving image or an audio file having metadata including the identification value of the second user.

The server 3000 may acquire a moving image or an audio file related to the second user from among moving images or audio files stored in another server, in another device, or in the second device 2000.

In operation S630, the server 3000 may provide the first device 1000 with one or more moving images or audio files related to the second user. Here, the server 3000 may provide the first device 1000 with preview data or sample audio data of a moving image or an audio file related to the second user. However, it is understood that exemplary embodiments are not limited thereto, and the server 3000 may provide the first device 1000 with original data of a moving image or audio file related to the second user.

In operation S640, the first device 1000 may select a moving image or an audio file including biometric information of the second user from among moving images or audio files received from the server 3000. For example, the first device 1000 may display a list of moving images or audio files received from the server 3000 on the screen of the first device 1000 and select a moving image or an audio file including biometric information of the second user based on a selection input of the first user.

In a case where the server 3000 has provided the first device 1000 with preview data or sample audio data of a moving image or an audio file related to the second user, when the first device 1000 selects a moving image or audio file, the first device 1000 may receive original data of the selected moving image or audio file from the server 3000.

In operation S650, the first device 1000 may request the second device 2000 for a moving image or an audio file including biometric information of the second user. For example, the first device 1000 may transmit the identification value of the second user to the second device 2000.

In operation S660, the second device 2000 may acquire a moving image or an audio file related to the second user from among moving images or audio files stored in the second device 2000. For example, the second device 2000 may acquire a moving image or an audio file having metadata including the identification value of the second user.

The second device 2000 may acquire a moving image or an audio file related to the second user from among moving images or audio files stored in another server or in another device.

In operation S670, the second device 2000 may provide the first device 1000 with one or more moving images or audio files related to the second user. Here, the second device 2000 may provide the first device 1000 with preview data or sample audio data of a moving image or an audio file related to the second user. However, it is understood that exemplary embodiments are not limited thereto, and the second device 2000 may provide the first device 1000 with original data of a moving image or an audio file related to the second user.

In operation S680, the first device 1000 may acquire a moving image or an audio file including biometric information of the second user from among moving images or audio files received from the second device 2000. The first device 1000 may display a list of moving images or audio files received from the second device 2000 on the screen of the first device 1000 and select a moving image or an audio file including biometric information of the second user based on a selection input of the first user.

In a case where the second device 2000 has provided the first device 1000 with preview data or sample audio data of a moving image or an audio file related to the second user, when the first device 1000 selects a moving image or audio file, the first device 1000 may receive original data of the selected moving image or audio file from the second device 2000.

In operation S690, the first device 1000 may extract voice information of the second user from the moving image or audio file including the biometric information of the second user. The first device 1000 may select at least one moving image or audio file from among the one or more moving images or audio files including the biometric information of the second user and extract voice information of the second user from the selected moving image or audio file.

FIG. 7 is a flowchart of a method in which the first device 1000 selects the server 3000 that requests biometric information of the second user and acquires content including the biometric information of the second user from among one or more contents shared between the first user and the second user, according to an exemplary embodiment.

Referring to FIG. 7, in operation S700, the first device 1000 may select the server 3000 from which biometric information of the second user is to be requested. The first device 1000 may display a list of one or more servers and select the server 3000, from which the biometric information of the second user is to be requested, based on a selection input of the first user with respect to the displayed list.

In operation S710, the first device 1000 may execute an application for providing a service of the server 3000. For example, the server 3000 may be a server providing an SNS service, and the first device 1000 may execute an application for providing an SNS service.

In operation S720, the first device 1000 may request the server 3000 for content including biometric information of the second user. For example, the first device 1000 may transmit the identification value of the second user to the server 3000 through the executed application. In particular, the first device 1000 may transmit a name of the second user and a service ID of the second user to the server 3000. Also, the first device 1000 may transmit information indicating a type of the biometric information to the server 3000.

In operation S730, the server 3000 may identify content sharable with the first user from among contents stored in the server 3000. The server 3000 may identify the content sharable between the first user and the second user from among the contents of the second user based on a service ID of the first user and a service ID of the second user.

In operation S740, the server 3000 may acquire the content including the biometric information of the second user from among the contents sharable with the first user. The server 3000 may acquire the content including the biometric information of the second user from among the contents sharable with the first user by comparing the identification value of the second user with the metadata of the content sharable with the first user.

In operation S750, the server 3000 notifies the second device 2000 of the transmission of the acquired content to the first device 1000. The server 3000 may provide the second device 2000 with a list of contents including the biometric information of the second user and inquire from the second device 2000 whether the content including the biometric information of the second user may be provided the first device 1000.

In operation S760, the second device 2000 may allow the server 3000 to transmit the acquired content to the first device 1000. The second device 2000 may select at least one content from among a list of one or more contents including the biometric information of the second user and allow the server 3000 to transmit the selected content to the first device 1000.

In operation S770, the server 3000 may transmit the content including the biometric information of the second user to the first device 1000. The server 3000 may transmit a list of one or more contents including the biometric information of the second user to the first device 1000. Also, for example, the server 3000 may transmit a thumbnail image, a preview image, or a sample audio file of the content including the biometric information of the second user to the first device 1000. However, it is understood that exemplary embodiments are not limited thereto, and the server 3000 may transmit original data of the content including the biometric information of the second user to the first device 1000.

In operation S780, the first device 1000 may extract the biometric information of the second user from the content received from the server 3000. For example, the first device 1000 may extract a face image, a pupil image, a fingerprint image, or a voice of the second user from the content received from the server 3000. However, it is understood that exemplary embodiments are not limited thereto.

FIG. 8 is a flowchart of a method in which the first device 1000 acquires biometric information of the second user from the second device 2000, according to an exemplary embodiment.

Referring to FIG. 8, in operation S800, the first device 1000 may determine to request the second device 2000 for biometric information of the second user. In order to request the biometric information of the second user, the first device 1000 may display a device list and select the second device 2000 from among one or more devices in the device list based on a selection input of the first user.

In operation S810, the first device 1000 may execute a communication application, e.g., a message application. The first device 1000 may execute a message application for communication with the second device 2000 in order to request the biometric information of the second user from the second device 2000. In this case, the executed message application may be, for example, a message application that is identical or similar to a message application installed in the second device 2000. However, it is understood that exemplary embodiments are not limited thereto. For example, according to another exemplary embodiment, the executed message application may be another message application that may communicate data with a message application installed in the second device 2000.

In operation S820, the first device 1000 may request the second device 2000 for the content including the biometric information of the second user. In this case, the first device 1000 may request the second device 2000 for the content including the biometric information of the second user through the executed message application. Also, the first device 1000 may transmit information indicating a type of the biometric information to the second device 2000.

In operation S830, the second device 2000 may acquire the content including the biometric information of the second user from among one or more contents stored in the second device 2000. The second device 2000 may acquire the content including the identification value of the second user from among the one or more contents stored in the second device 2000.

In operation S840, the second device 2000 may generate the content including the biometric information of the second user by using a sensor included in the second device 2000. For example, when the type of biometric information is a pupil image, the second device 2000 may activate a camera included in the second device 2000 and display a user interface for capturing a pupil image of the second user on the screen of the second device 2000. Also, the second device 2000 may photograph a pupil of the second user based on a user input of the second user through a user interface.

According to another example, when the type of biometric information is a face image, the second device 2000 may activate the camera included in the second device 2000 and display a user interface for capturing a face image of the second user on the screen of the second device 2000. Also, the second device 2000 may photograph a face of the second user based on a user input of the second user received through a user interface.

Furthermore, by way of example, when the type of biometric information is a fingerprint image, the second device 2000 may activate a fingerprint detection sensor included in the second device 2000 and display a user interface for detecting a fingerprint of the second user on the screen of the second device 2000. Also, the second device 2000 may generate a fingerprint image of the second user based on a user input of the second user received through a user interface.

Moreover, by way of example, when the type of biometric information is a user voice, the second device 2000 may activate a microphone included in the second device 2000 and display a user interface for recording a voice of the second user on the screen of the second device 2000. However, it is understood that exemplary embodiments are not limited thereto. For example, according to another exemplary embodiment, the second device 2000 may display a predetermined word through a user interface and record a voice of the second user uttering the displayed word based on a user input of the second user through a user interface.

In operation S850, the second device 2000 may request the server 3000 for the content including the biometric information of the second user from among one or more contents stored in the server 3000. In this case, the second device 2000 may transmit the identification value of the second user to the server 3000. For example, the second device 2000 may transmit a name of the second user and a service ID of the second user to the server 3000. Also, the second device 2000 may transmit information indicating a type of the biometric information to the server 3000.

In operation S860, the server 3000 may transmit the content including the biometric information of the second user from among the one or more contents stored in the server 3000 to the second device 2000. In response to the request of the second device 2000, the server 3000 may extract the content including the biometric information of the second user from among the one or more contents stored in the server 3000 based on the identification value of the second user. Also, the server 3000 may transmit the extracted content to the second device 2000.

In operation S870, the second device 2000 may transmit the content including the biometric information of the second user to the first device 1000. In operation S880, the first device 1000 may extract the biometric information of the second user from the content received from the second device 2000.

FIGS. 9A to 9D illustrate examples of a second file including a first file and biometric information, according to one or more exemplary embodiments.

Figure 9A:
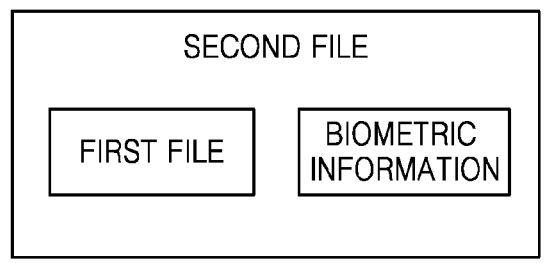
FIGS. 9A to 9D illustrate examples of a second file including a first file and biometric information, according to one or more exemplary embodiments.

Referring to FIG. 9A, the second file may include a first file and biometric information. In this case, the first device 1000 may generate the second file by packaging the first file and the biometric information. For example, the first device 1000 may generate the second file by combining the first file and the biometric information. Also, the first device 1000 may generate the second file by associating the first file and the biometric information. Further, the first device 1000 may generate the second file by compressing the first file and the biometric information together. In this case, execution information for decompressing a compressed file may be included in the second file, although it is understood that exemplary embodiments are not limited thereto.

Figure 9B:
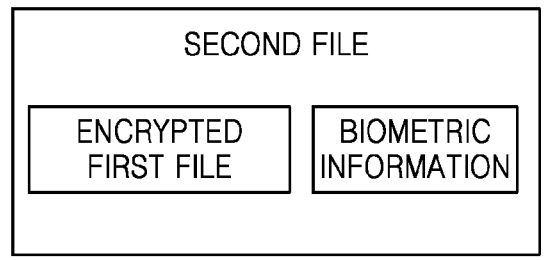

Referring to FIG. 9B, the second file may include an encrypted first file and biometric information. In this case, the first device 1000 may encrypt the first file according to a predetermined method. For example, the first device 1000 may encrypt the first file by using a predetermined encryption key. Also, the first device 1000 may generate an encryption key from the biometric information and encrypt the first file by using the generated encryption key. However, it is understood that exemplary embodiments are not limited thereto.

In this case, the first device 1000 may generate the second file by packaging the encrypted first file and the biometric information. For example, the first device 1000 may generate the second file by combining the encrypted first file and the biometric information. Furthermore, the first device 1000 may generate the second file by associating the encrypted first file and the biometric information. Moreover, the first device 1000 may generate the second file by compressing the encrypted first file and the biometric information together. In this case, execution information for decompressing a compressed file may be included in the second file, although it is understood that exemplary embodiments are not limited thereto.

Figure 9C:
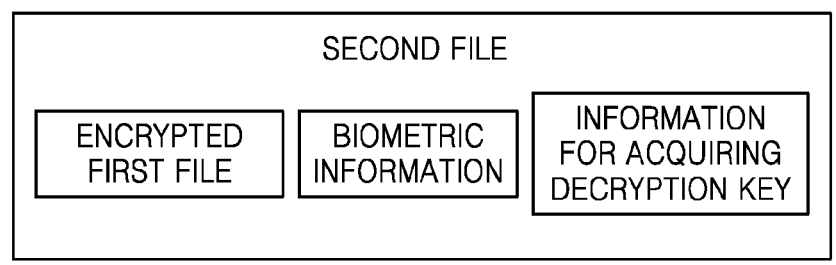

Referring to FIG. 9C, the second file may include biometric information, an encrypted first file, and information for acquiring a decryption key. The information for acquiring the decryption key may include, for example, information about the storage position of the decryption key and information for generating the decryption key. Also, the encryption key of the first file may be identical to or different from the decryption key of the first file.

The first device 1000 may generate the second file by packaging the biometric information, the encrypted first file, and the information for acquiring the decryption key. For example, the first device 1000 may generate the second file by combining the biometric information, the encrypted first file, and the information for acquiring the decryption key. Further, the first device 1000 may generate the second file by associating the biometric information, the encrypted first file, and the information for acquiring the decryption key. Moreover, the first device 1000 may generate the second file by compressing the biometric information, the encrypted first file, and the information for acquiring the decryption key together. In this case, execution information for decompressing a compressed file may be included in the second file, although it is understood that exemplary embodiments are not limited thereto.

Figure 9D:
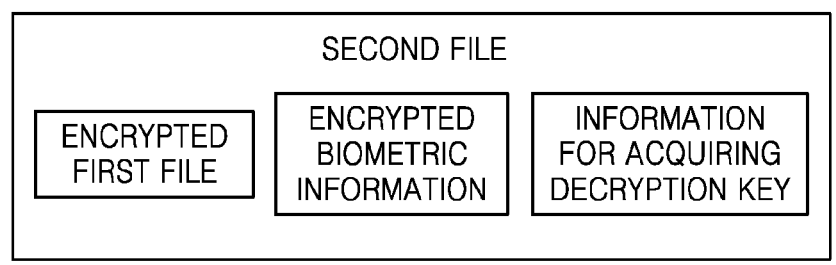

Referring to FIG. 9D, the second file may include encrypted biometric information, an encrypted first file, and information for acquiring one or more decryption keys for the encrypted biometric information and the encrypted first file. The information for acquiring the decryption key may include, for example, information about the storage position of the decryption key and information for generating the decryption key. Also, the information for acquiring the decryption key may include information for acquiring a decryption key of the encrypted biometric information and information for acquiring a decryption key of the encrypted first file. The decryption key of the encrypted biometric information may be identical to or different from the decryption key of the encrypted first file.

Also, the first device 1000 may generate the second file by packaging the encrypted biometric information, the encrypted first file, and the information for acquiring the decryption key. For example, the first device 1000 may generate the second file by combining the encrypted biometric information, the encrypted first file, and the information for acquiring the decryption key. Furthermore, the first device 1000 may generate the second file by associating the encrypted biometric information, the encrypted first file, and the information for acquiring the decryption key. Moreover, the first device 1000 may generate the second file by compressing the encrypted biometric information, the encrypted first file, and the information for acquiring the decryption key together. In this case, execution information for decompressing a compressed file may be included in the second file, although it is understood that exemplary embodiments are not limited thereto.

Although FIGS. 9A to 9D illustrate that the encrypted first file and/or the encrypted biometric information are included in the second file, it is understood that exemplary embodiments are not limited thereto. For example, according to another exemplary embodiment, the first file hashed according to a predetermined criterion and/or the biometric information hashed according to a predetermined criterion may be included in the second file. Furthermore, according to another exemplary embodiment, the second file may include a first file that is not encrypted in addition to encrypted biometric information. In this case, the first file may also include information for acquiring the decryption key.

Figure 10:
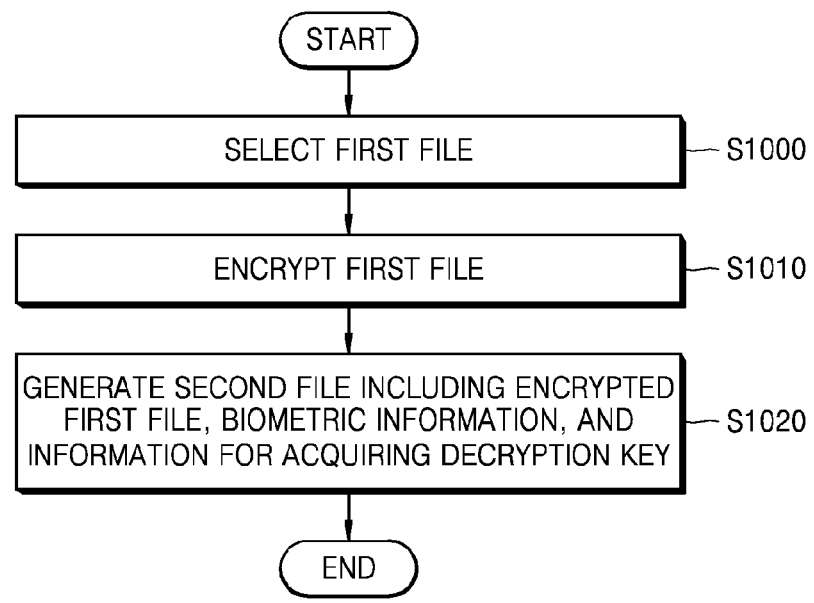
FIG. 10 is a flowchart of a method in which the first device generates a second file including an encrypted first file, according to an exemplary embodiment.

FIG. 10 is a flowchart of a method in which the first device 1000 generates a second file including an encrypted first file, according to an exemplary embodiment.

Referring to FIG. 10, in operation S1000, the first device 1000 may select a first file. The first device 1000 may select the first file from among one or more files stored in the first device 1000. However, it is understood that exemplary embodiments are not limited thereto. For example, according to another exemplary embodiment, the first device 1000 may select a first file for setting of authentication information from among one or more files stored in the server 3000. Also, the first device 1000 may select a first file for setting of authentication information from among files stored in the second device 2000.

The selected first file may be a file to be transmitted to the second device 2000 of the second user. In this case, the first device 1000 may select the first file for setting of authentication information by executing an application for transmitting the first file to the second device 2000 and selecting the first file to be transmitted to the second device 2000 through the executed application.

In operation S1010, the first device 1000 may encrypt the first file. The first device 1000 may encrypt the first file by using a predetermined encryption key. The first device 1000 may encrypt the first file such that the encrypted first file may be decrypted by a decryption key that may be used by an application executing the second file. The application executing the second file may be a program that is downloaded and installed in the first device 1000, or a program that is installed in the first device 1000 when the first device 1000 is manufactured, although it is understood that exemplary embodiments are not limited thereto. In this case, the first device 1000 may acquire information about the application executing the second file from the server or a memory included in the first device 1000 and determine, by using the acquired information, an attribute of a decryption key that may be used by the application executing the second file. For example, the first device 1000 may detect a decryption method and a type of the decryption key supported by the application executing the second file. Based on the determined attribute of the decryption key, the first device 1000 may encrypt the first file such that the encrypted first file may be decrypted by the application executing the second file.

Furthermore, the first device 1000 may generate information for acquiring a decryption key of the encrypted first file. Also, the first device 1000 may generate an encryption key from the biometric information and encrypt the first file by using the generated encryption key. In this case, the first device 1000 may process the biometric information and generate an encryption key by using the processed biometric information. The decryption key of the first file may be identical to or different from the encryption key of the first file.

The information for acquiring the decryption key of the first file may include, for example, at least one of information about the storage position of the decryption key and information for generating the decryption key. For example, the decryption key may be stored in the memory of the first device 1000, a database (DB) of the server 3000, or the second file to be generated, although it is understood that exemplary embodiments are not limited thereto. Furthermore, the information for generating the decryption key may include, for example, at least one of source data for generating the decryption key and information about a generation method of the decryption key.

In operation S1020, the first device 1000 may generate a second file including biometric information, an encrypted first file, and information for acquiring a decryption key. The first device 1000 may generate the second file by packaging the biometric information, the encrypted first file, and the information for acquiring a decryption key. For example, the first device 1000 may generate the second file by combining or associating the biometric information, the encrypted first file, and the information for acquiring the decryption key. Also, the first device 1000 may generate the second file by compressing the biometric information, the encrypted first file, and the information for acquiring the decryption key together. In this case, execution information for decompressing a compressed file may be included in the second file, although it is understood that exemplary embodiments are not limited thereto. Moreover, the first device 1000 may hash the biometric information, the encrypted first file, and the information for acquiring the decryption key, and package the hashed biometric information, the hashed encrypted first file, and the hashed information for acquiring the decryption key.

Figure 11:
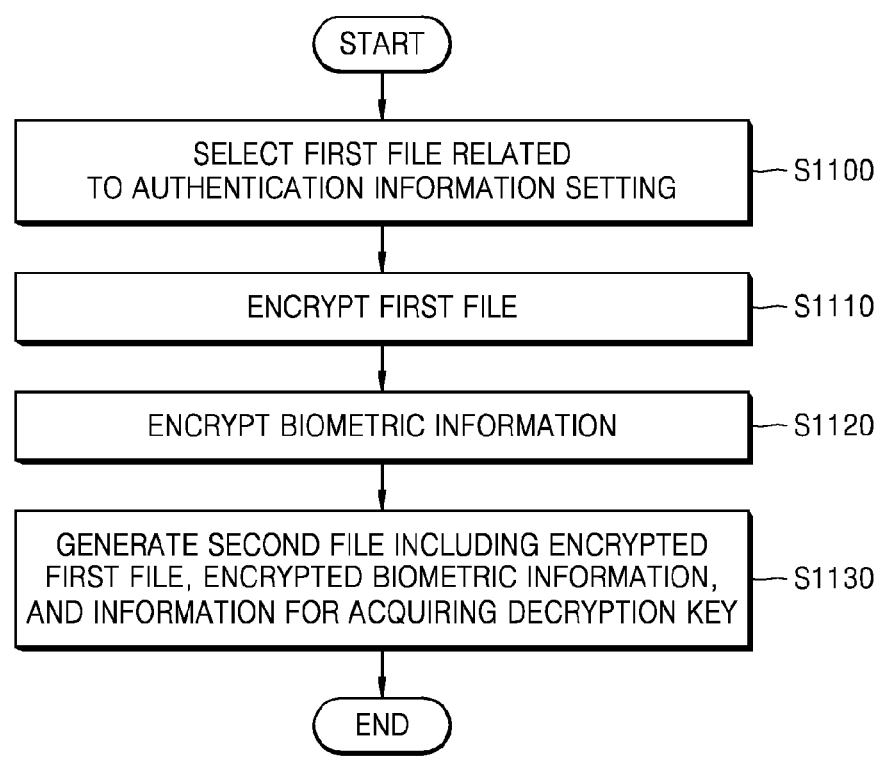
FIG. 11 is a flowchart of a method in which the first device generates a second file including an encrypted first file and encrypted biometric information, according to an exemplary embodiment.

FIG. 11 is a flowchart of a method in which the first device 1000 generates a second file including an encrypted first file and encrypted biometric information, according to an exemplary embodiment.

Referring to FIG. 11, in operation S1100, the first device 1000 may select a first file. The selected first file may be a file to be transmitted to the second device 2000 of the second user.

In operation S1110, the first device 1000 may encrypt the first file. The first device 1000 may encrypt the first file by using a predetermined encryption key. Also, the first device 1000 may generate an encryption key from the biometric information and encrypt the first file by using the generated encryption key. In this case, the first device 1000 may process the biometric information and generate an encryption key by using the processed biometric information.

Furthermore, the first device 1000 may generate information for acquiring a decryption key of the encrypted first file. The decryption key of the first file may be identical to or different from the encryption key of the first file.

In operation S1120, the first device 1000 may encrypt the biometric information. The first device 1000 may encrypt the biometric information to be included in the second file by using a predetermined encryption key. Also, the first device 1000 may generate an encryption key from the biometric information and encrypt the biometric information by using the generated encryption key. In this case, the first device 1000 may process the biometric information and generate an encryption key by using the processed biometric information.

Moreover, the first device 1000 may generate information for acquiring a decryption key of the encrypted biometric information. The decryption key of the biometric information may be identical to or different from the encryption key of the biometric information. Also, the encryption key of the biometric information may be identical to or different from the encryption key of the first file.

In operation S1130, the first device 1000 may generate a second file including encrypted biometric information, an encrypted first file, and information for acquiring one or more decryption keys for the encrypted biometric information and the encrypted first file. The first device 1000 may generate the second file by packaging the encrypted biometric information, the encrypted first file, and the information for acquiring a decryption key. For example, the first device 1000 may generate the second file by combining or associating the encrypted biometric information, the encrypted first file, and the information for acquiring the decryption key. Also, the first device 1000 may generate the second file by compressing the encrypted biometric information, the encrypted first file, and the information for acquiring the decryption key together. In this case, execution information for decompressing a compressed file may be included in the second file, although it is understood that exemplary embodiments are not limited thereto. Moreover, the first device 1000 may hash the encrypted biometric information, the encrypted first file, and the information for acquiring the decryption key, and package the hashed encrypted biometric information, the hashed encrypted first file, and the hashed information for acquiring the decryption key.

Figure 12:
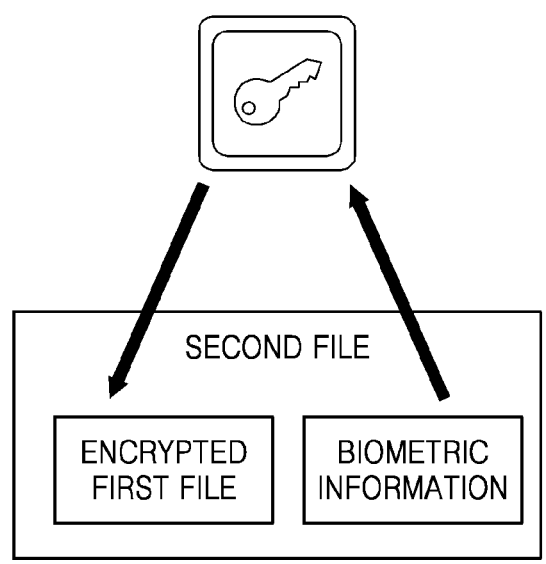
FIG. 12 is a flowchart of a method in which the first device generates a second file by encrypting a first file by using biometric information, according to an exemplary embodiment.

FIG. 12 is a flowchart of a method in which the first device 1000 generates a second file by encrypting a first file by using biometric information, according to an exemplary embodiment.

Referring to FIG. 12, the first device 1000 may generate an encryption key from the biometric information and encrypt the first file by using the generated encryption key. Also, the first device 1000 may generate the second file by packaging the encrypted first file and the biometric information.

Figure 13:
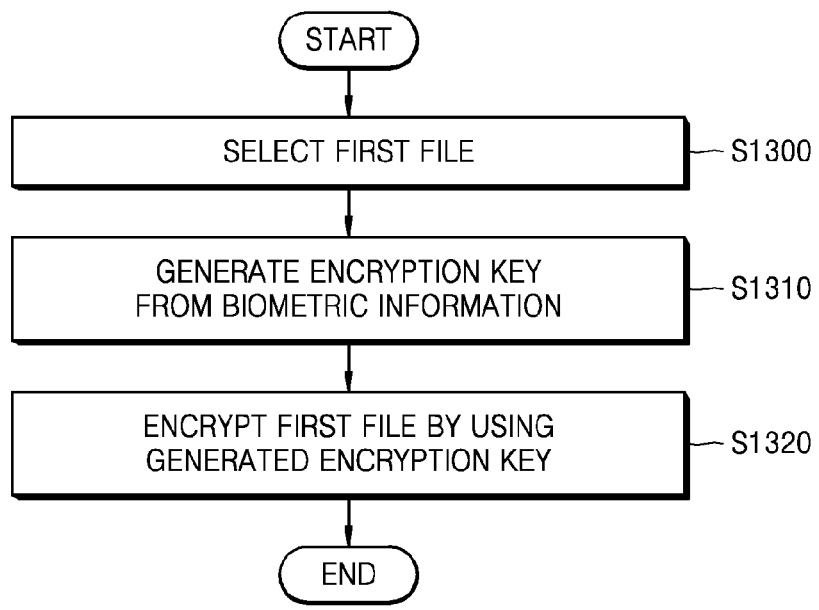
FIG. 13 is a flowchart of a method in which the first device encrypts a first file by using biometric information, according to an exemplary embodiment.

FIG. 13 is a flowchart of a method in which the first device 1000 encrypts a first file by using biometric information, according to an exemplary embodiment.

Referring to FIG. 13, in operation S1300, the first device 1000 may select a first file. The first device 1000 may select a first file for setting of authentication information from among one or more files stored in the first device 1000. However, it is understood that exemplary embodiments are not limited thereto. For example, according to another exemplary embodiment, the first device 1000 may select a first file for setting of authentication information from among one or more files stored in the server 3000. Also, the first device 1000 may select a first file for setting of authentication information from among one or more files stored in the second device 2000.

In operation S1310, the first device 1000 may generate an encryption key from biometric information. Here, the first device 1000 may acquire biometric information of the user that is to execute a file. For example, the first device 1000 may acquire biometric information of the second user. The first device 1000 may acquire biometric information of the second user by acquiring content including the biometric information of the second user. For example, the first device 1000 may acquire a face image of the second user from a picture including a face of the second user from among pictures stored in the first device 1000. Also, the first device 1000 may request the server 3000 for a picture including a face of the second user from among pictures stored in the server 3000, receive the picture including the face of the second user from the server 3000, and acquire a face image of the second user from the received picture. Further, the first device 1000 may request the server 3000 for a picture including a face of the second user, receive the picture including the face of the second user from the server 3000, and acquire a face image of the second user from the received picture. The first device 1000 may extract biometric information of the second user from the content including the biometric information of the second user.

The first device 1000 may generate an encryption key according to a predetermined method by using the biometric information. For example, the first device 1000 may process the biometric information and generate an encryption key by using the processed biometric information. The first device 1000 may extract feature information from the biometric information, correct the extracted feature information, and generate an encryption key by using the corrected feature information. In this case, a criterion for extracting the feature information, a criterion for correcting the feature information, and a method for generating the encryption key from the feature information may be predetermined.

In operation S1320, the first device 1000 may encrypt the first file by using the generated encryption key. The first device 1000 may encrypt the first file according to a predetermined encryption method by using the generated encryption key. Also, for example, information related to the encryption key may be included in the second file or metadata of the encrypted first file. The information related to the encryption key may include, at least one of information about a type of the biometric information used to generate the encryption key, a subject of the biometric information, and a generation method of the encryption key.

The method of encrypting the first file by the first device 1000 by using the biometric information may correspond methods described below with reference to FIGS. 33 to 40.

Figure 14A:
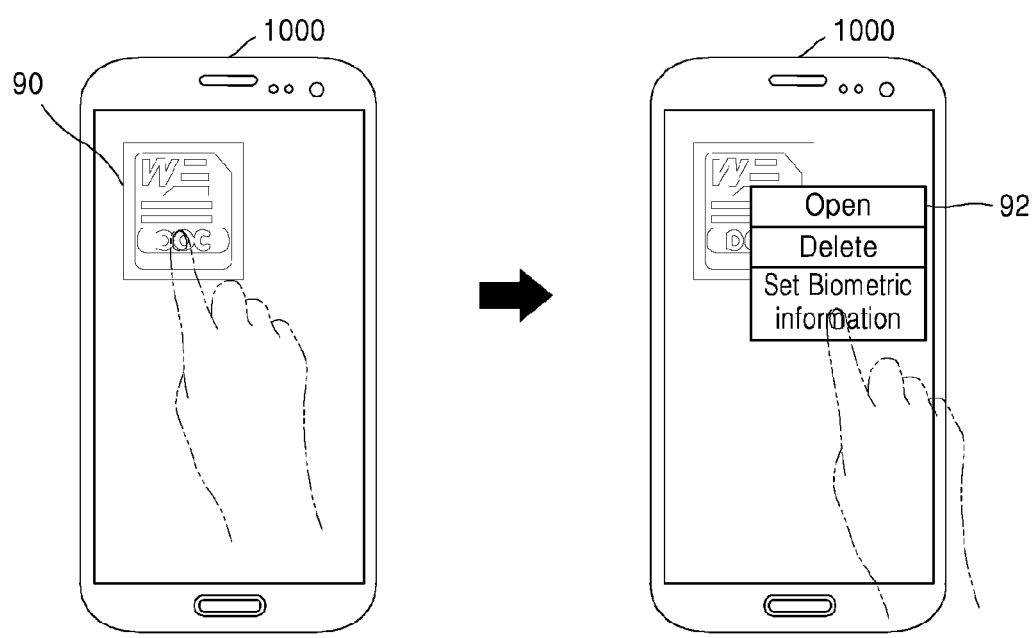
FIG. 14A illustrates an example in which the first device selects a first file in order to set authentication information, according to an exemplary embodiment.

FIG. 14A illustrates an example in which the first device 1000 selects a first file in order to set authentication information, according to an exemplary embodiment.

Referring to FIG. 14A, the first user may touch a file 90 displayed on the screen of the first device 1000, and in response, the first device 1000 may display a list 92 of operations related to the file 90.

The first user may select "Set Biometric Information" from the list 92, and thus, the first device 1000 may perform an operation for setting biometric information related to the file 90.

Figure 14B:
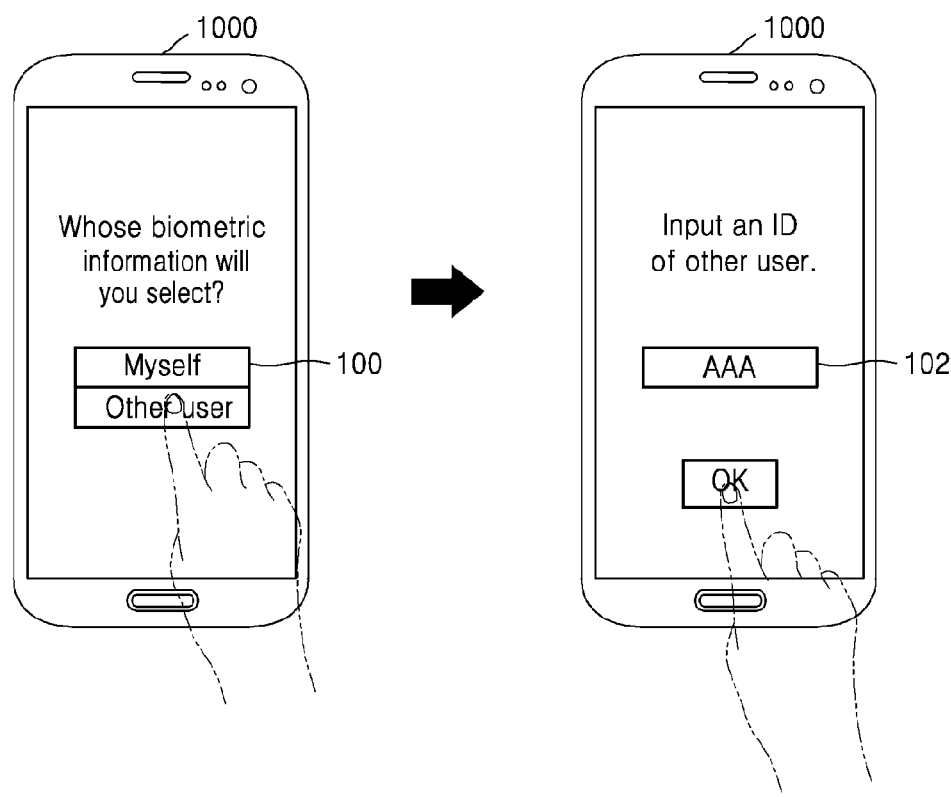
FIG. 14B illustrates an example in which the first device determines a subject of biometric information to be included in a first file, according to an exemplary embodiment.

FIG. 14B illustrates an example in which the first device 1000 determines a subject of biometric information to be included in a first file, according to an exemplary embodiment.

Referring to FIG. 14B, when "Set Biometric Information" is selected from the list 92 of FIG. 14A, the first device 1000 may display a selection list 100 for selecting a subject of the biometric information on the screen of the first device 1000. In this case, when the first user selects "Other User" from the selection list 100, the first device 1000 may display an input window 102 for inputting the identification value of the second user. As shown, the first user may input an identification value, e.g., the identification value "AAA", of the second user into the input window 102.

Figure 15:
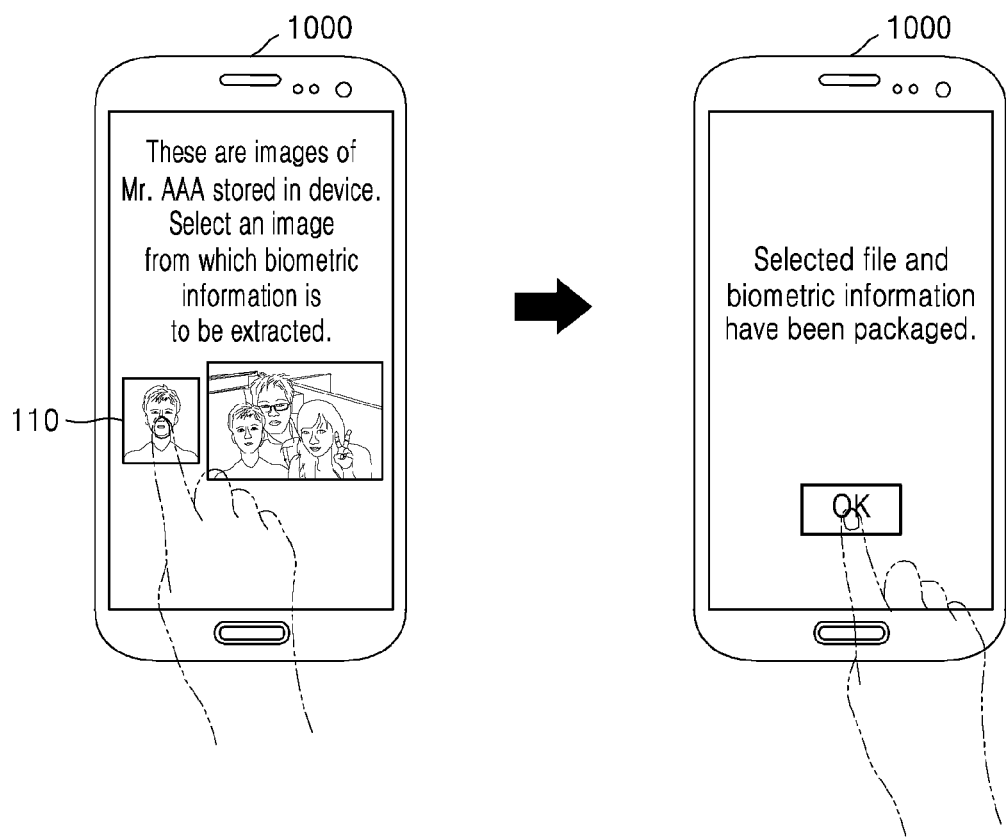
FIG. 15 illustrates an example in which the first device displays a list of images including biometric information of the second user and sets authentication information for execution of a first file, according to an exemplary embodiment.

FIG. 15 illustrates an example in which the first device 1000 displays a list of images including biometric information of the second user and sets authentication information for execution of a first file, according to an exemplary embodiment.

Referring to FIG. 15, when the identification value, e.g., the identification value "AAA", of the second user is input into the input window 102 illustrated in FIG. 14B, the first device 1000 may display a list of images including a face of the second user "AAA" on the screen of the first device 1000. Accordingly, the first user may select an image 110 from the displayed list of images.

When the image 110 is selected, the first device 1000 may extract a face image of the second user from the image 110 and set the extracted face image as authentication information for executing the file 90.

Figure 16A:
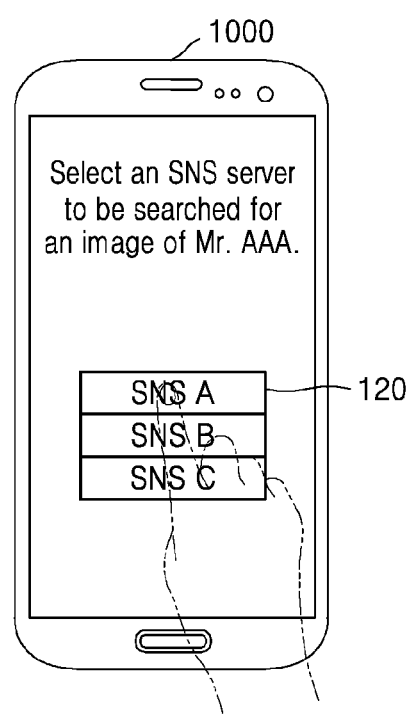
FIG. 16A illustrates an example in which the first device selects the server to be searched for content including biometric information of the second user, according to an exemplary embodiment.

FIG. 16A illustrates an example in which the first device 1000 selects the server 3000 to be searched for content including biometric information of the second user, according to an exemplary embodiment.

Referring to FIG. 16A, when the identification value, e.g., the identification value "AAA", of the second user is input into the input window 102 illustrated in FIG. 14B, the first device 1000 may display a selection list 120 for selecting the server 3000 to be searched for the content including the biometric information of the second user.

For example, SNS services "SNS A", "SNS B", and "SNS C" provided to the first user may be included in the selection list 120. Here, the first user may select "SNS A" from the displayed selection list 120.

Figure 16B:
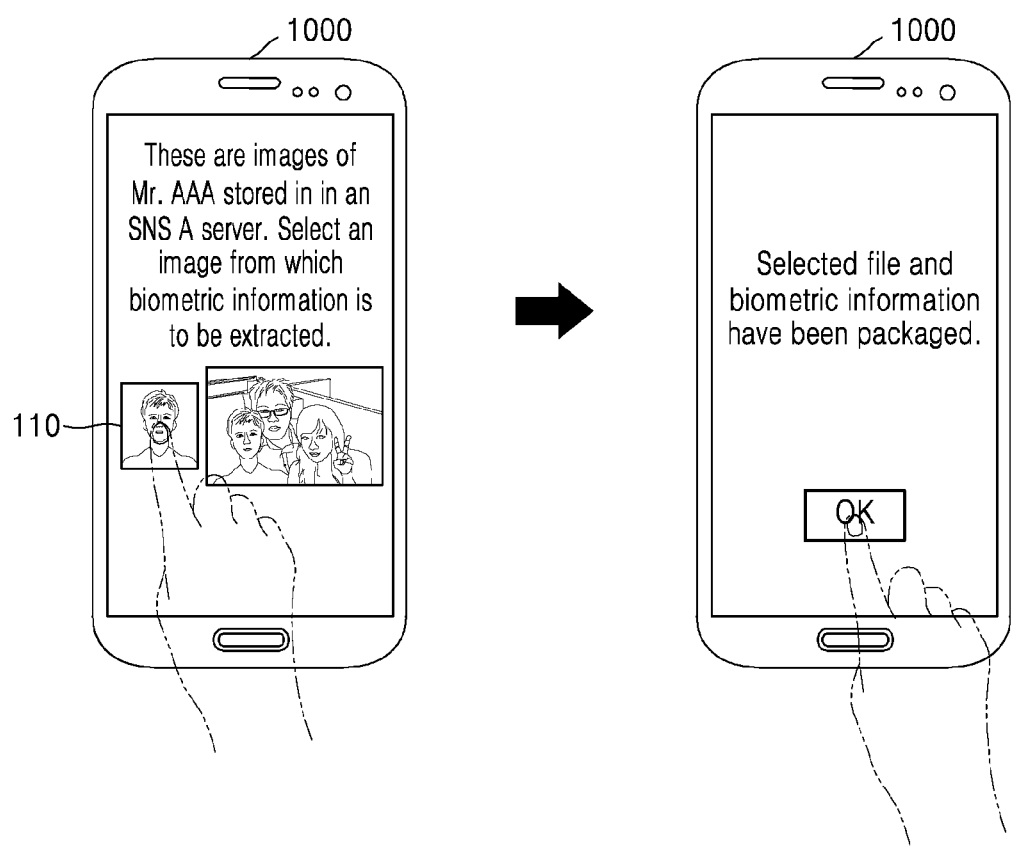
FIG. 16B illustrates an example in which the first device displays a list of images including biometric information of the second user from among images stored in the server and sets authentication information for execution of a first file, according to an exemplary embodiment.

FIG. 16B illustrates an example in which the first device 1000 displays a list of images including biometric information of the second user from among images stored in the server 3000 and sets authentication information for execution of a first file, according to an exemplary embodiment.

Referring to FIG. 16B, when "SNS A" is selected from the selection list 120 illustrated in FIG. 16A, the first device 1000 may request a server of "SNS A" for an image including a pupil image of the second user and receive the image including the pupil image of the second user from the server of "SNS A". Also, the first device 1000 may display a list of images received from the server of "SNS A" on the screen of the first device 1000. In this case, the first user may select an image 130 from the displayed list of images.

Furthermore, when the image 130 is selected, the first device 1000 may extract a pupil image of the second user from the image 130 and set the extracted pupil image as authentication information for executing the file 90.

Figure 17A:
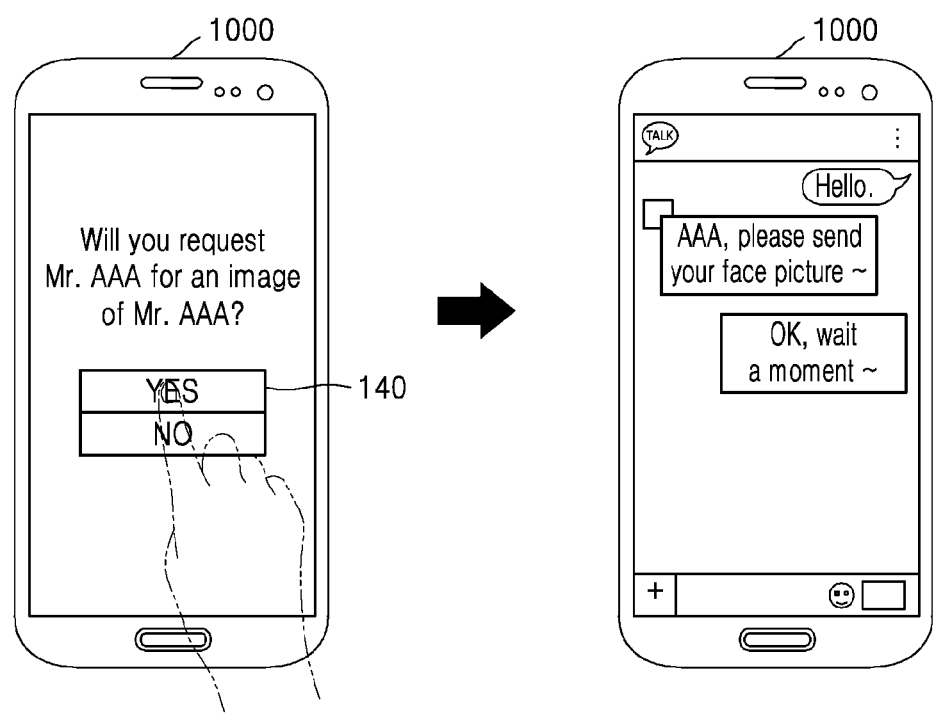
FIG. 17A illustrates an example in which the first device requests the second device of the second user for biometric information of the second user, according to an exemplary embodiment.

FIG. 17A illustrates an example in which the first device 1000 requests the second device 2000 of the second user for biometric information of the second user, according to an exemplary embodiment.

Referring to FIG. 17A, when the identification value, e.g., the identification value "AAA", of the second user is input into the input window 102 illustrated in FIG. 14B, the first device 1000 may display a selection list 140 for determining to request the second user "AAA" for the biometric information of the second user. Here, the first user may select "YES" from the selection list 140.

When "YES" is selected from the selection list 140, the first device 1000 may execute a communication application or message application for communication messages with the second device 2000 and automatically transmit a message, e.g., "AAA, please send your face picture ~", through the executed message application. In this case, the first device 1000 may receive a face image of the second user from the second device 2000 through the executed message application.

Figure 17B:
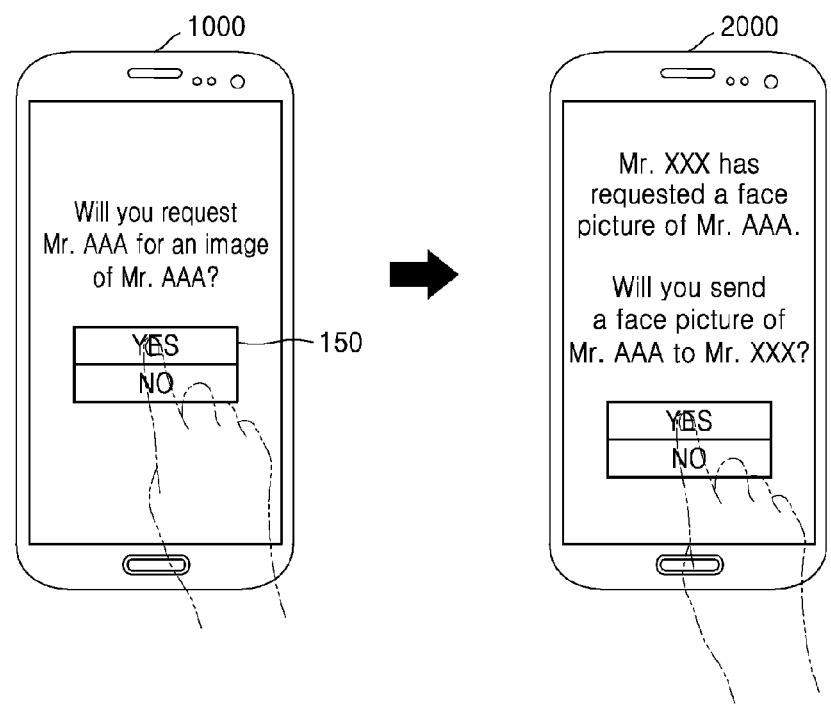
FIG. 17B illustrates an example in which the first device pushes a request for biometric information of the second user to the second device of the second user, according to an exemplary embodiment.

FIG. 17B illustrates an example in which the first device 1000 pushes a request for biometric information of the second user to the second device 2000 of the second user, according to an exemplary embodiment.

Referring to FIG. 17B, when the identification value, e.g., the identification value "AAA", of the second user is input into the input window 102 illustrated in FIG. 14B, the first device 1000 may display a selection list 150 for determining to request the second user "AAA" for the biometric information of the second user. In this case, the first user may select "YES" from the selection list 150.

Also, when "YES" is selected from the selection list 150, the first device 1000 may push a message for requesting a face image of the second user to the second device 2000. Accordingly, a push message (e.g., "Mr. XXX has requested a face picture of Mr. AAA. Will you send a face picture of Mr. AAA to Mr. XXX?") may be displayed on the screen of the second device 2000. In response, the second user may select "YES" from the screen of the second device 2000, and the first device 1000 may receive a face image of the second user from the second device 2000.

Figure 17C:
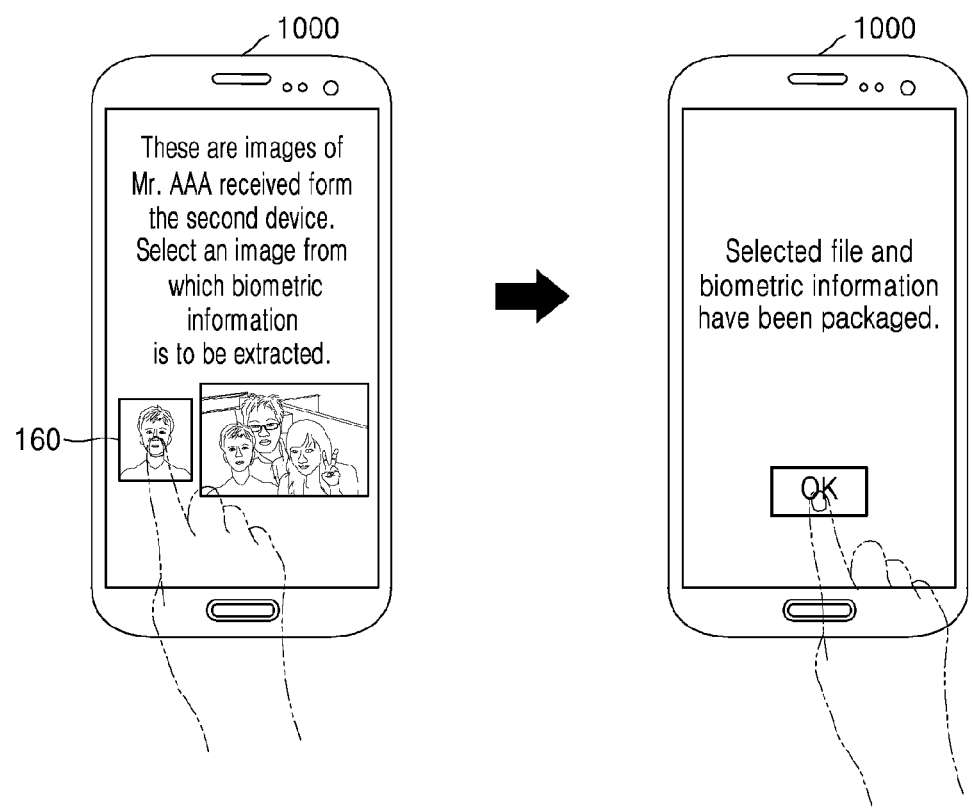
FIG. 17C illustrates an example in which the first device displays a list of images including biometric information of the second user received from the second device and sets authentication information for execution of a first file, according to an exemplary embodiment.

FIG. 17C illustrates an example in which the first device 1000 displays a list of images including biometric information of the second user received from the second device 2000 and sets authentication information for execution of a first file, according to an exemplary embodiment.

Referring to FIG. 17C, when receiving an image including a face of the user from the second device 2000, the first device 1000 may display a list of images received from the second device 2000 on the screen of the first device 1000. Accordingly, the first user may select an image 160 from the displayed list of images.

When the image 160 is selected, the first device 1000 may extract a pupil image of the second user from the image 160 and set the extracted pupil image as authentication information for executing the file 90.

Figure 18A:
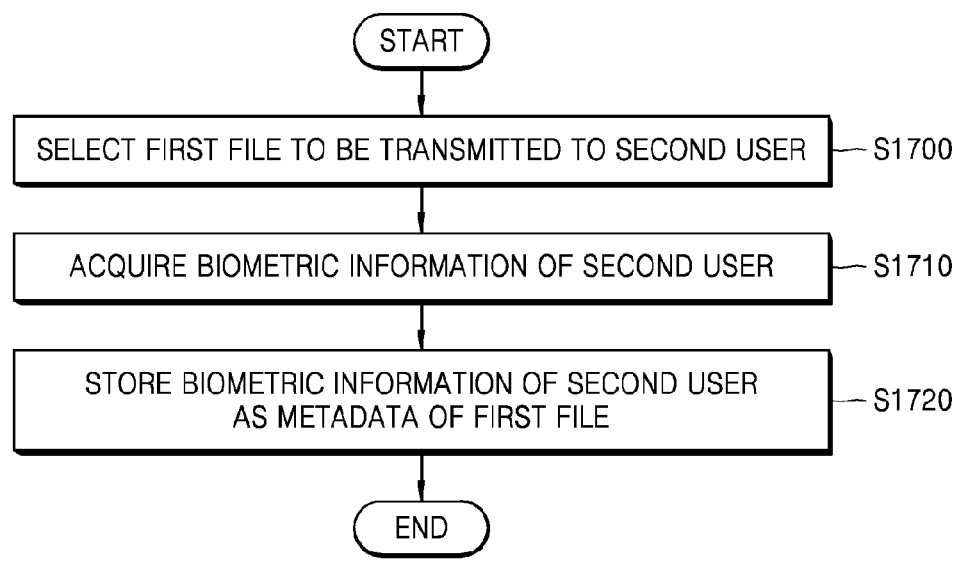
FIG. 18A is a flowchart of a method in which the first device stores biometric information of the second user as metadata of a first file, according to an exemplary embodiment.

FIG. 18A is a flowchart of a method in which the first device 1000 stores biometric information of the second user as metadata of a first file, according to an exemplary embodiment.

Referring to FIG. 18A, in operation S1700, the first device 1000 may select a first file. The first device 1000 may select a first file for setting of authentication information from among one or more files stored in the first device 1000. However, it is understood that exemplary embodiments are not limited thereto. For example, according to another exemplary embodiment, the first device 1000 may select a first file for setting of authentication information from among one or more files stored in the server 3000. Also, the first device 1000 may select a first file for setting of authentication information from among one or more files stored in the second device 2000.

The selected first file may be a file to be transmitted to the second device 2000 of the second user. In this case, the first device 1000 may select the first file for setting of authentication information by executing an application for transmitting the first file to the second device 2000 and selecting the first file to be transmitted to the second device 2000 through the executed application.

In operation S1710, the first device 1000 may acquire biometric information of the second user. The first device 1000 may acquire biometric information of the second user by acquiring content including the biometric information of the second user. For example, the first device 1000 may acquire a face image of the second user from a picture including a face of the second user from among pictures stored in the first device 1000. Furthermore, the first device 1000 may request the server 3000 for a picture including a face of the second user from among pictures stored in the server 3000, receive the picture including the face of the second user from the server 3000, and acquire a face image of the second user from the received picture. Moreover, the first device 1000 may request the server 3000 for a picture including a face of the second user, receive the picture including the face of the second user from the server 3000, and acquire a face image of the second user from the received picture. The first device 1000 may extract biometric information of the second user from the content including the biometric information of the second user.

In operation S1720, the first device 1000 may store the acquired biometric information of the second user as metadata of the first file. For example, the first device 1000 may convert a format of the biometric information of the second user into a format that may be stored as the metadata of the first file. In this case, the first device 1000 may adjust the size of the converted biometric information within a range that may be stored as metadata.

The biometric information stored in the metadata of the first file in FIG. 18A may be used by the device when the first file included in the second file or the first file not included in the second file is executed.

Figure 18B:
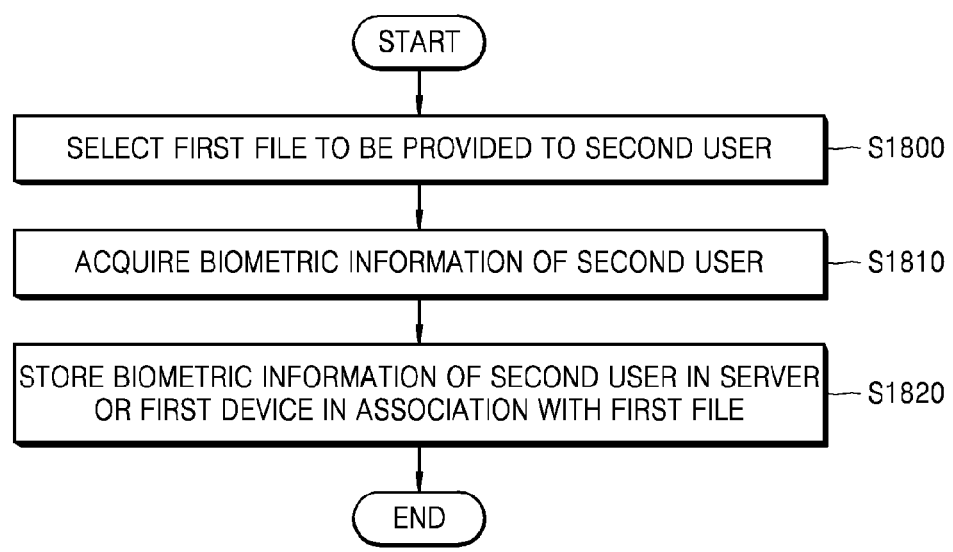
FIG. 18B is a flowchart of a method in which the first device separately stores biometric information of the second user in association with a first file, according to an exemplary embodiment.

FIG. 18B is a flowchart of a method in which the first device 1000 separately stores biometric information of the second user in association with a first file, according to an exemplary embodiment.

Referring to FIG. 18B, in operation S1800, the first device 1000 may select a first file. The first device 1000 may select a file for setting of authentication information from among one or more files stored in the first device 1000. However, it is understood that exemplary embodiments are not limited thereto. For example, according to another exemplary embodiment, the first device 1000 may select a file for setting of authentication information from among one or more files stored in the server 3000. Also, the first device 1000 may select a file for setting of authentication information from among one or more files stored in the second device 2000.

The selected file may be a file to be transmitted to the second device 2000 of the second user. In this case, the first device 1000 may select the file for setting of authentication information by executing an application for transmitting the file to the second device 2000 and selecting the file to be transmitted to the second device 2000 through the executed application.

In operation S1810, the first device 1000 may acquire biometric information of the second user. The first device 1000 may acquire biometric information of the second user by acquiring content including the biometric information of the second user. For example, the first device 1000 may acquire a face image of the second user from a picture including a face of the second user from among pictures stored in the first device 1000. Furthermore, the first device 1000 may request the server 3000 for a picture including a face of the second user from among pictures stored in the server 3000, receive the picture including the face of the second user from the server 3000, and acquire a face image of the second user from the received picture. Moreover, the first device 1000 may request the server 3000 for a picture including a face of the second user, receive the picture including the face of the second user from the server 3000, and acquire a face image of the second user from the received picture. The first device 1000 may extract biometric information of the second user from the content including the biometric information of the second user.

In operation S1820, the first device 1000 may store the biometric information of the second user in the server 3000 or the first device 1000 in association with the first file. In this case, at least one of information indicating the existence of the biometric information of the second user related to the content and information about the storage position of the biometric information of the second user may be stored in the metadata of the content.

The biometric information stored in association with the first file in FIG. 18B may be used by the device when the first file included in the second file or the first file not included in the second file is executed.

FIG. 19 illustrates an example of a packaging information table according to an exemplary embodiment. When the second file is generated, a packaging information table may be stored in at least one of the first device 1000 and the server 3000.

Referring to FIG. 19, an authentication information setting table may include a first file name field 190, a biometric information type field 192, a biometric information subject field 194, a biometric information field 196, and a second file name field 198.

A name of the first file may be included in the first file name field 190. For example, a name of the first file selected by the first device to be transmitted to the second device 2000 may be included in the first file name field 190. However, it is understood that exemplary embodiments are not limited thereto.

A type of the biometric information included in the second file may be included in the biometric information type field 192. For example, at least one of a pupil image, a face image, a fingerprint image, a voice, and a pulse may be indicated as the type of the biometric information in the biometric information type field 192. However, it is understood that exemplary embodiments are not limited thereto. For example, according to another exemplary embodiment, when a voice is indicated as the type of the biometric information in the biometric information type field 192, a word, e.g., "ABC", uttered by the user may also be included in the biometric information type field 192.

A subject of the biometric information included in the second file may be included in the biometric information subject field 194. For example, user A, user B, user C, or user D may be included in the biometric information subject filed 194.

A file name of the biometric information included in the second file may be included in the biometric information field 196.

A name of the second file may be included in the second file name field 198.

The values included in the first file name field 190, the biometric information type field 192, the biometric information subject field 194, the biometric information field 196, and the second file name field 198 in the authentication information setting table of FIG. 19 in association with the first file may be stored in at least one of the metadata of the first file and the second file. For example, "file A-1", "pupil image", "user A", "aaa.jpg", and "file A-2" may be recorded in the metadata of a file A-1 or a file A-2.

Furthermore, according to one or more other exemplary embodiments, information about at least one of a method of encrypting the first file, a method of generating the encryption key of the first file, a method of acquiring the decryption key of the first file, a method of encrypting the biometric information, a method of generating the encryption key of the biometric information, and a method of acquiring the decryption key of the biometric information may be further included in the packaging information table.

Also, according to one or more other exemplary embodiments, information included in a predetermined row of the packaging information table may be included in the second file or may be included in at least one of the metadata of the first file and the metadata of the second file.

Figure 20:
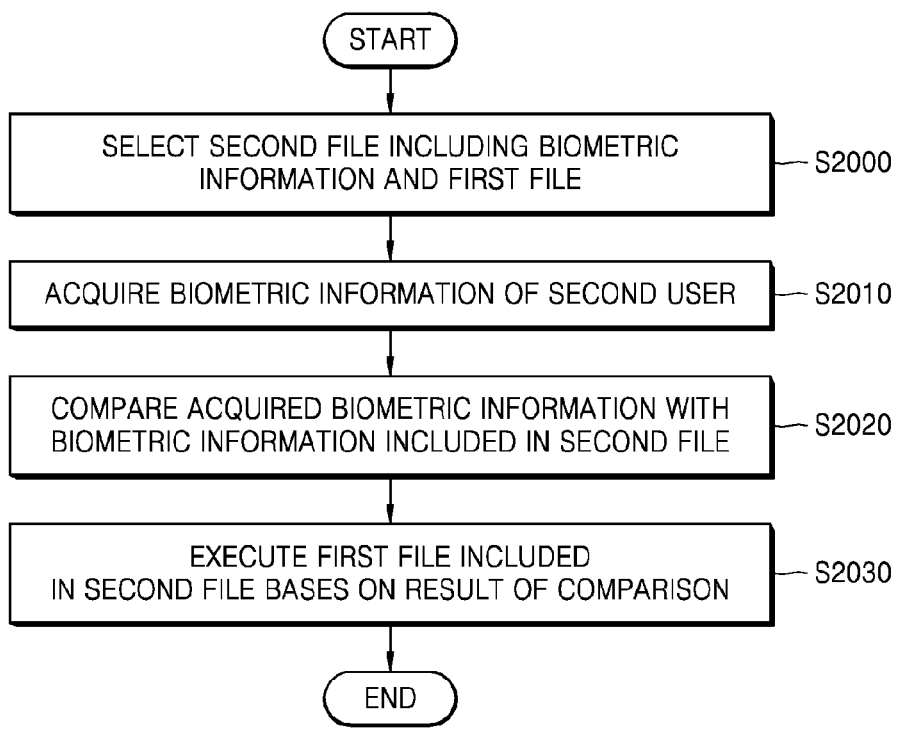
FIG. 20 is a flowchart of a method in which the second device executes a first file included in a second file, according to an exemplary embodiment.

FIG. 20 is a flowchart of a method in which the second device 2000 executes a first file included in a second file, according to an exemplary embodiment.

Referring to FIG. 20, in operation S2000, the second device 2000 may select a second file including a first file and biometric information. For example, the second device 2000 may receive the second file from the first device 1000 and select the received second file. Also, the second device 2000 may receive the second file from the server 3000 and select the received second file.

When the second file is selected or received, the second device 2000 may unpackage the second file and acquire data included in the second file. For example, the second device 2000 may acquire data included in the second file as illustrated in FIGS. 9A to 9D, although it is understood exemplary embodiments are not limited thereto.

In operation S2010, the second device 2000 may acquire biometric information of the second user. When the second file is selected or received, the second device 2000 may display a user interface for guiding the input of biometric information and may acquire biometric information of the second user based on a user input received through the displayed user interface. Also, when the second file is selected, the second device 2000 may display information indicating a type of biometric information and a subject of biometric information, which is used to execute the first file, on the screen of the second device 2000. For example, the second device 2000 may display a text (such as "A face image of Mr. AAA is necessary to execute the selected file. Will you take a photograph?") on the screen of the second device 2000. In this case, the second device 2000 may identify the type of biometric information and the subject of biometric information from information included in the second file. However, it is understood that exemplary embodiments are not limited thereto. For example, according to another exemplary embodiment, the second device 2000 may identify the type of biometric information and the subject of biometric information from the packaging information table stored in the server 3000 or the first device 1000.

The second device 2000 may activate a sensor included in the second device 2000 and acquire biometric information of the second user based on a user input received through a displayed user interface. For example, when the type of biometric information is a pupil image, the second device 2000 may activate a camera included in the second device 2000 and display a user interface for capturing a pupil image of the second user on the screen of the second device 2000. The second device 2000 may photograph a pupil of the second user based on a user input of the second user received through a user interface.

Furthermore, when the type of biometric information is a face image, the second device 2000 may activate the camera included in the second device 2000 and display a user interface for capturing a face image of the second user on the screen of the second device 2000. The second device 2000 may photograph a face of the second user based on a user input of the second user received through a user interface.

Meanwhile, by way of another example, when the type of biometric information is a fingerprint image, the second device 2000 may activate a fingerprint detection sensor included in the second device 2000 and display a user interface for detecting a fingerprint of the second user on the screen of the second device 2000. The second device 2000 may generate a fingerprint image of the second user based on a user input of the second user received through a user interface.

Also, when the type of biometric information is a user voice, the second device 2000 may activate a microphone included in the second device 2000 and display a user interface for recording a voice of the second user on the screen of the second device 2000. Here, the second device 2000 may display a predetermined word through a user interface and record a voice of the second user uttering the displayed word based on a user input of the second user through a user interface.

According to another exemplary embodiment, the second device 2000 may acquire the content including the biometric information of the second user from the server 3000.

In operation S2020, the second device 2000 may compare the biometric information acquired in operation S2010 with the biometric information included in the second file. In this case, the second device 2000 may determine whether the biometric information acquired in operation S2010 is identical to the biometric information included in the second file.

In operation S2030, the second device 2000 may execute the first file based on a result of the comparison in operation S2020. When determining that the biometric information acquired in operation S2010 is identical to the biometric information included in the second file, the second device 2000 may execute the first file. Where the first file is encrypted, the second device 2000 may decrypt the first file and execute the decrypted first file.

Figure 21:
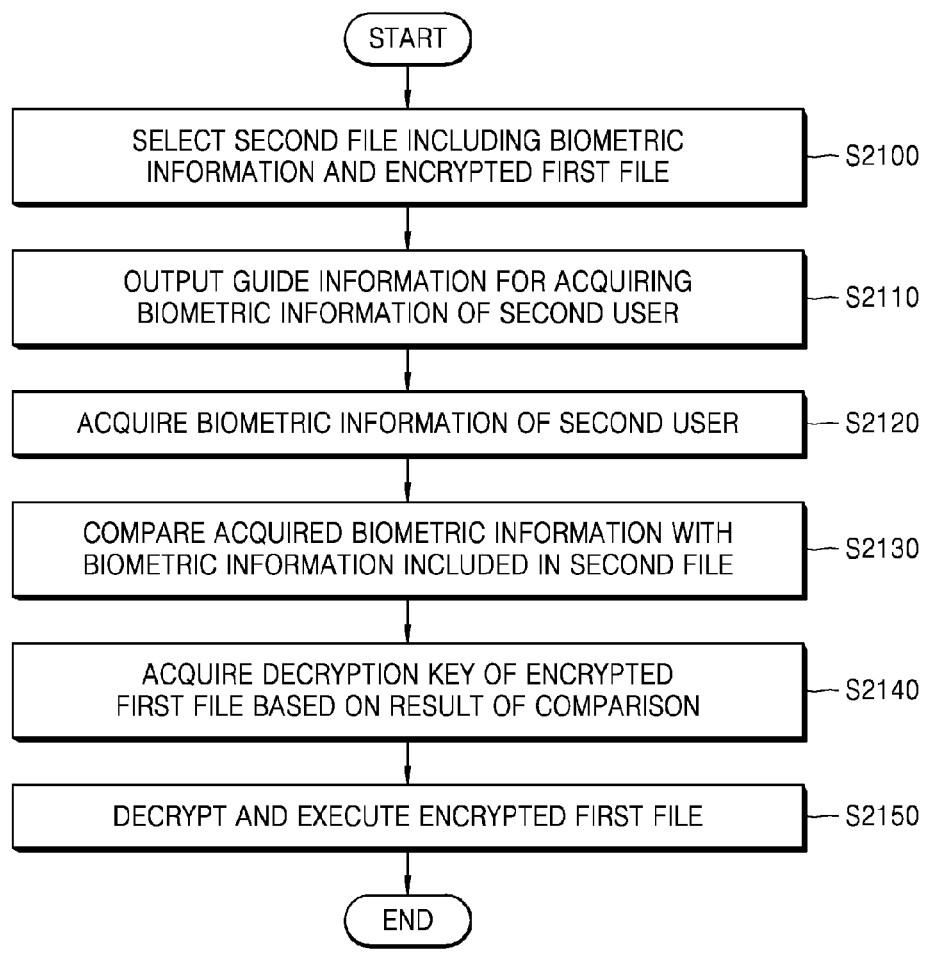
FIG. 21 is a flowchart of a method in which the second device executes an encrypted first file included in a second file, according to an exemplary embodiment.

FIG. 21 is a flowchart of a method in which the second device 2000 executes an encrypted first file included in a second file, according to an exemplary embodiment.

Referring to FIG. 21, in operation S2100, the second device 2000 may select a second file including a first file and biometric information. For example, the second device 2000 may receive the second file from the first device 1000 and select the received second file. Also, the second device 2000 may receive the second file from the server 3000 and select the received second file. When the second file is selected or received, the second device 2000 may unpackage the second file and acquire data included in the second file.

In operation S2110, the second device 2000 may output guide information for acquiring biometric information of the second user. When the second file is selected or received, the second device 2000 may display a user interface for guiding the input of biometric information. The guide information included in the user interface for guiding the input of biometric information may include, for example, information about a type of biometric information, a subject of biometric information, and an acquisition method of biometric information.

In operation S2120, the second device 2000 may acquire biometric information of the second user. The second device 2000 may acquire biometric information of the second user based on a user input received through a displayed user interface.

The second device 2000 may activate a sensor included in the second device 2000 and acquire biometric information of the second user based on a user input received through a displayed user interface. According to another exemplary embodiment, the second device 2000 may acquire the content including the biometric information of the second user from the server 3000.

In operation S2130, the second device 2000 may compare the biometric information acquired in operation S2120 with the biometric information included in the second file. In this case, the second device 2000 may determine whether the biometric information acquired in operation S2120 is identical to the biometric information included in the second file.

In operation S2140, the second device 2000 may acquire a decryption key of the encrypted first file based on a result of the comparison in operation S2130. When determining that the biometric information acquired in operation S2120 is identical to the biometric information included in the second file, the second device 2000 may acquire the decryption key of the encrypted first file. For example, the second device 2000 may extract information for acquiring the decryption key included in the second file and acquire the decryption key based on information for acquiring the extracted decryption key. The decryption key of the first file may be stored, for example, in the server 3000 and/or the first device 1000. According to another exemplary embodiment, the decryption key of the first file may be included in the second file.

In operation S2150, the second device 2000 may decrypt the encrypted first file and execute the decrypted first file. The second device 2000 may decrypt the encrypted first file by using the decryption key acquired in operation S2140.

Figure 22:
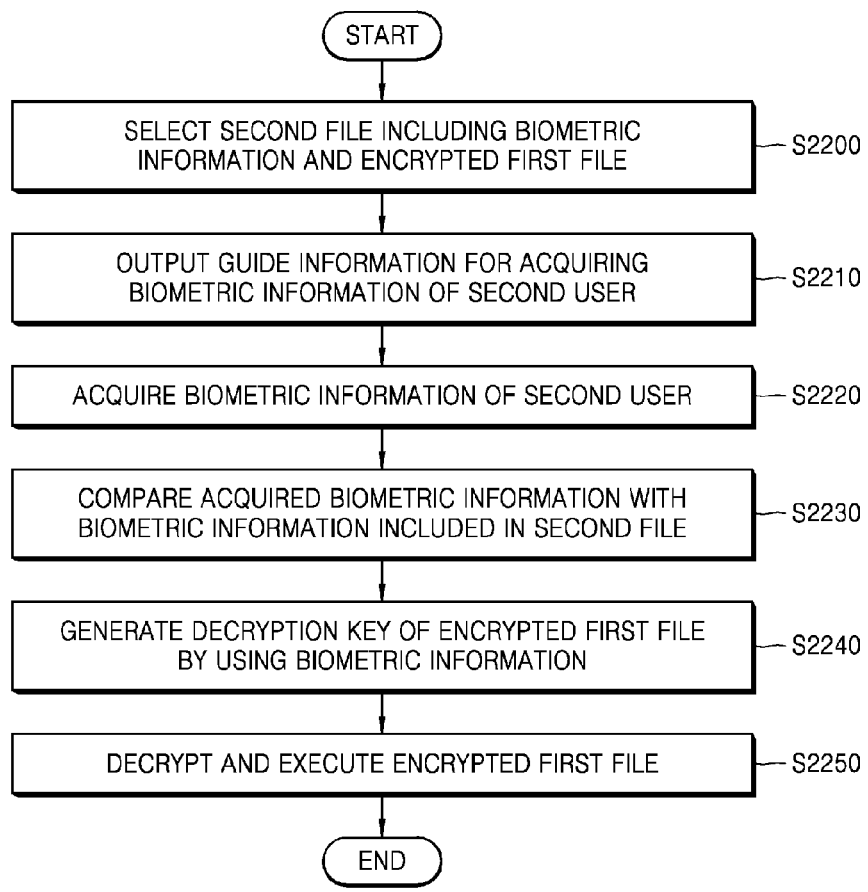
FIG. 22 is a flowchart of a method in which when biometric information and an encrypted first file are included in a second file, the second device generates a decryption key from the biometric information included in the second file and executes the encrypted first file, according to an exemplary embodiment.

FIG. 22 is a flowchart of a method in which when biometric information and an encrypted first file are included in a second file, the second device 2000 generates a decryption key from the biometric information included in the second file and executes the encrypted first file, according to an exemplary embodiment.

Since operations S2200 to S2230 of FIG. 22 correspond to operations S2100 to S2130, descriptions thereof will be omitted herein.

In operation S2240, the second device 2000 may generate a decryption key of the encrypted first file by using the biometric information of the second user. When determining in operation S2230 that the biometric information acquired in operation S2220 is identical to the biometric information included in the second file, the second device 2000 may generate the decryption key of the encrypted first file. For example, the second device 2000 may extract information about a decryption key generation method from the second file and generate the decryption key based on the extracted information. Accordingly, the second device 2000 may extract the biometric information included in the second file information and generate the decryption key based on the extracted biometric information. The second device 2000 may generate the decryption key in the same manner as the encryption key generation method in operation S1320.

In operation S2250, the second device 2000 may decrypt the encrypted first file and execute the decrypted first file. The second device 2000 may decrypt the encrypted first file by using the decryption key generated in operation S2240.

Figure 23:
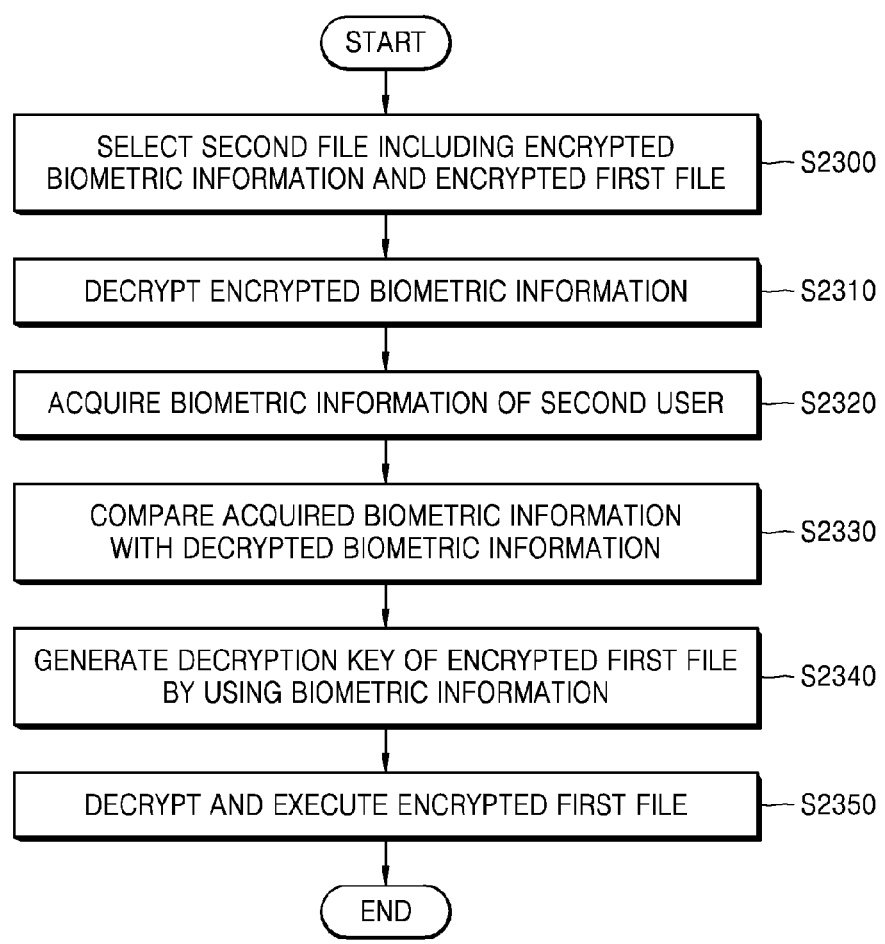
FIG. 23 is a flowchart of a method in which when biometric information and an encrypted first file are included in a second file, the second device generates a decryption key from the biometric information included in the second file and executes the encrypted first file, according to an exemplary embodiment.

FIG. 23 is a flowchart of a method in which when biometric information and an encrypted first file are included in a second file, the second device 2000 generates a decryption key from the biometric information included in the second file and executes the encrypted first file, according to an exemplary embodiment.

Referring to FIG. 23, in operation S2300, the second device 2000 may select a second file including encrypted biometric information and an encrypted first file.

In operation S2310, the second device 2000 may decrypt the encrypted biometric information. For example, information about a method of acquiring a decryption key of the encrypted biometric information included in the second file may be included in the second file, and the second device 2000 may use the information to acquire the decryption key of the encrypted biometric information included in the second file. The second device 2000 may decrypt the encrypted biometric information by using the acquired decryption key. However, it is understood that exemplary embodiments are not limited thereto. For example, according to another exemplary embodiment, the second device 2000 may receive information for acquiring the decryption key of the encrypted biometric information included in the second file from the server 3000.

Since operations S2320 to S2350 correspond to operations S2220 to S2250, descriptions thereof will be omitted herein.

Figure 24:
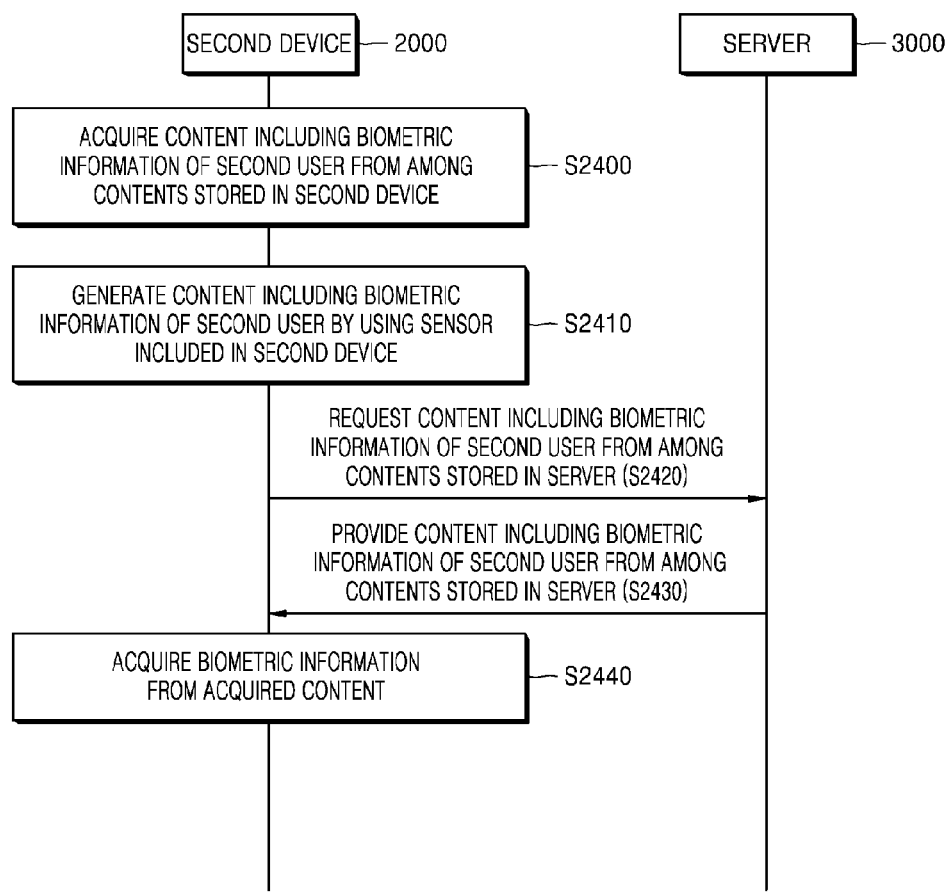
FIG. 24 is a flowchart of a method in which in order to execute a first file, the second device acquires biometric information of the second user that is to be compared with biometric information of the second user included in the second file, according to an exemplary embodiment.

FIG. 24 is a flowchart of a method in which in order to execute a first file, the second device 2000 acquires biometric information of the second user that is to be compared with biometric information of the second user included in the second file, according to an exemplary embodiment.

Referring to FIG. 24, in operation S2400, the second device 2000 may acquire the content including the biometric information of the second user from among the contents stored in the second device 2000. For example, the second device 2000 may acquire the content including the identification value of the second user from among the contents stored in the second device 2000.

In operation S2410, the second device 2000 may generate the content including the biometric information of the second user by using the sensor included in the second device 2000. For example, when the type of biometric information is a pupil image, the second device 2000 may activate a camera included in the second device 2000 and display a user interface for capturing a pupil image of the second user on the screen of the second device 2000. The second device 2000 may photograph a pupil of the second user based on a user input of the second user received through a user interface.

Furthermore, when the type of biometric information is a face image, the second device 2000 may activate the camera included in the second device 2000 and display a user interface for capturing a face image of the second user on the screen of the second device 2000. Also, the second device 2000 may photograph a face of the second user based on a user input of the second user received through a user interface.

Meanwhile, by way of another exemplary embodiment, when the type of biometric information is a fingerprint image, the second device 2000 may activate a fingerprint detection sensor included in the second device 2000 and display a user interface for detecting a fingerprint of the second user on the screen of the second device 2000. The second device 2000 may generate a fingerprint image of the second user based on a user input of the second user received through a user interface.

Moreover, when the type of biometric information is a user voice, the second device 2000 may activate a microphone included in the second device 2000 and display a user interface for recording a voice of the second user on the screen of the second device 2000. Here, the second device 2000 may display a predetermined word through a user interface and record a voice of the second user uttering the displayed word based on a user input of the second user through a user interface.

In operation S2420, the second device 2000 may request the server 3000 for the content including the biometric information of the second user from among the contents stored in the server 3000. For example, the second device 2000 may transmit the identification value of the second user to the server 3000. In this case, the second device 2000 may transmit at least one of a name of the second user and a service ID of the second user to the server 3000. Also, the second device 2000 may transmit information indicating a type of the biometric information to the server 3000.

In operation S2430, the server 3000 may transmit the content including the biometric information of the second user from among the contents stored in the server 3000 to the second device 2000. For example, in response to the request of the second device 2000, the server 3000 may extract the content including the biometric information of the second user from among the contents stored in the server 3000 based on the identification value of the second user. The server 3000 may transmit the extracted content to the second device 2000.

In operation S2440, the second device 2000 may acquire the biometric information of the second user from the acquired content. The second device 2000 may extract the biometric information of the second user from the content acquired or generated in operations S2410 to S2430.

Figure 25:
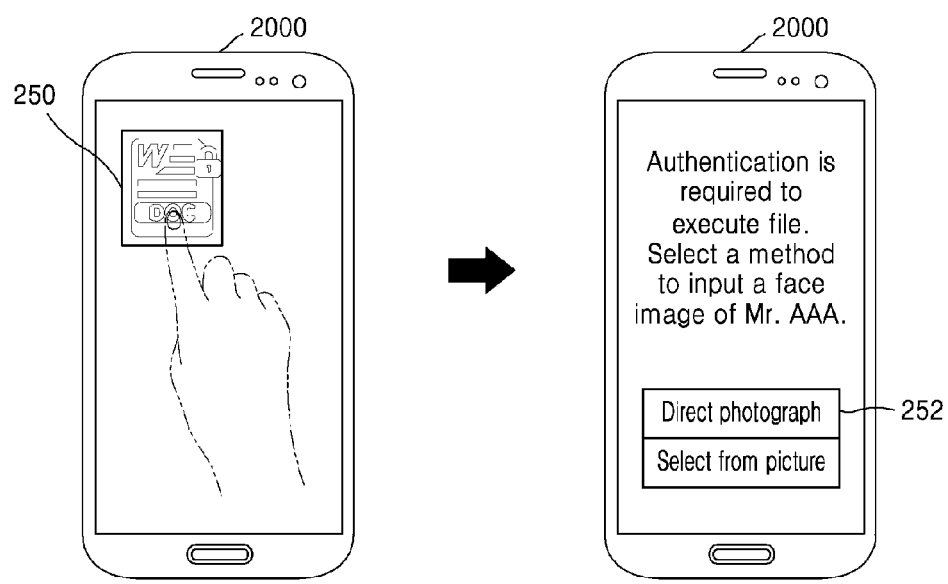
FIG. 25 illustrates an example in which when a second file displayed on the second device is selected, the second device displays a selection list for selecting a method for acquiring biometric information of the second user, according to an exemplary embodiment.

FIG. 25 illustrates an example in which when a second file displayed on the second device 2000 is selected, the second device 2000 displays a selection list for selecting a method for acquiring biometric information of the second user, according to an exemplary embodiment.

Referring to FIG. 25, the second user may select a second file 250 displayed on the screen of the second device 2000. When the second file 250 is selected, the second device 2000 may display, on the screen of the second device 2000, a selection list 252 for selecting the method of acquiring the biometric information of the second user for authentication for execution of the first file included in the second file 250. The second device 2000 may identify the type and the subject of the biometric information from information packaged in the second file 250 or metadata of the second file 250 and display the selection list 252 according to the identified type and subject. For example, when the subject of the biometric information included in the second file is a user "AAA" and the type of the biometric information included in the second file is a face image, the second device 2000 may display a text (such as "Authentication is necessary to execute a file. Please select a method to input a face image of Mr. AAA.") and display the selection list 252 including, e.g., "Direct photograph" and "Select from a picture".

For example, when the second file 250 is selected, the second device 2000 may output the biometric information included in the second file and display a text "Please input biometric information identical to output biometric information" on the screen of the second device 2000.

Figure 26A:
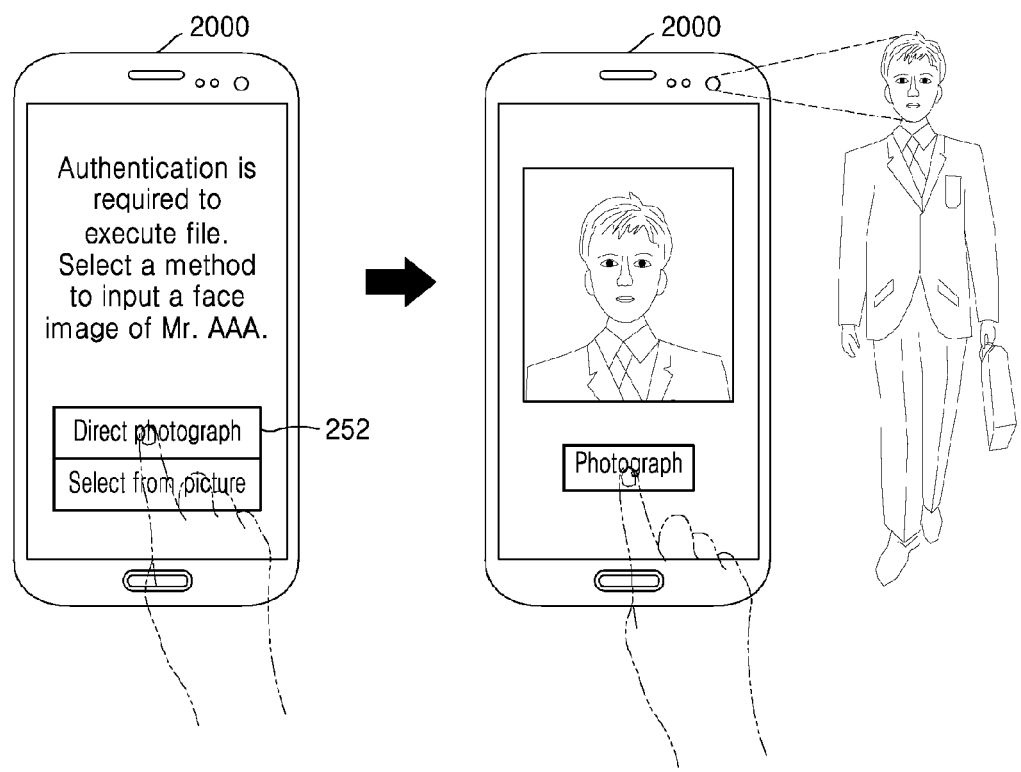
FIGS. 26A and 26B illustrates an example in which the second device photographs a face of the second user for authentication for execution of a first file, according to an exemplary embodiment.
Figure 26B:
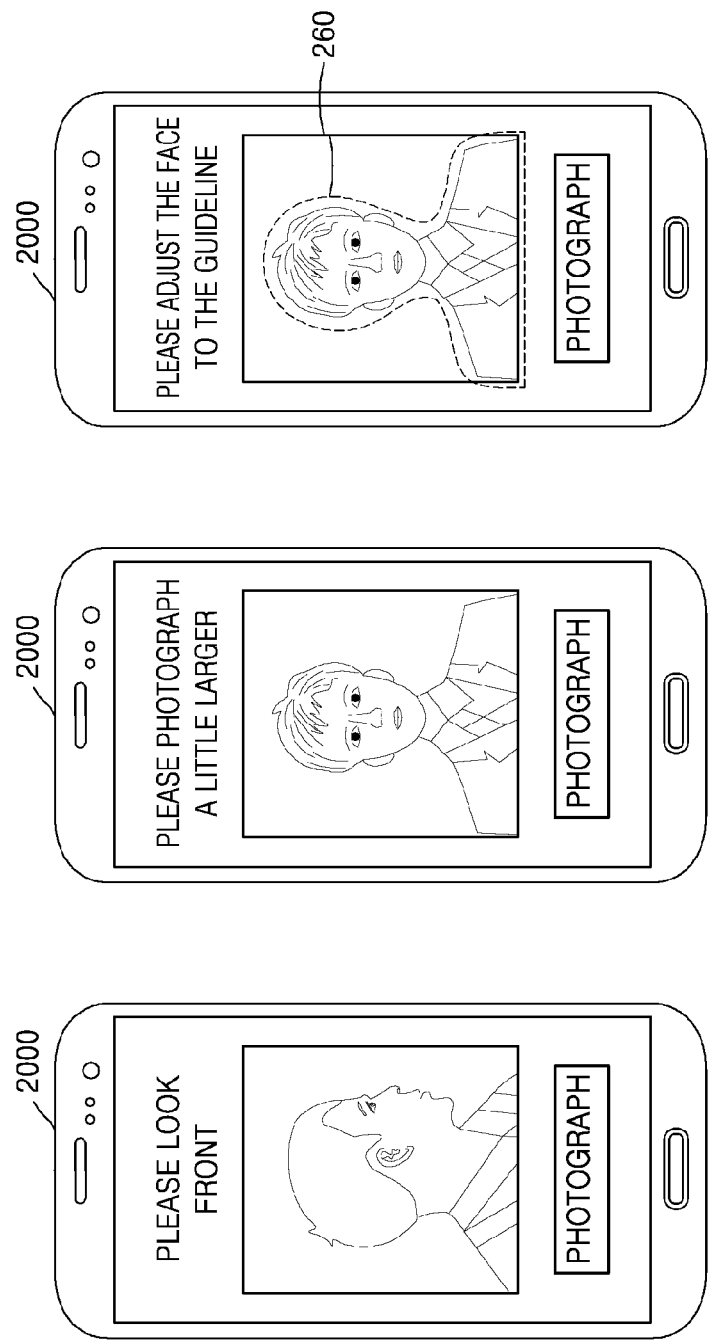

FIGS. 26A and 26B illustrates an example in which the second device 2000 photographs a face of the second user for authentication for execution of a first file, according to an exemplary embodiment.

Referring to FIG. 26A, the second user may select "Direct photograph" from the selection list 252 displayed in the second device 2000. Accordingly, the second device 2000 may activate the camera of the second device 2000 and display a user interface for photographing the second user on the screen of the second device 2000. The second user may touch a "photograph" button, and the second device 2000 may photograph a face of the second user in response to the touch of the second user. When the second user generates the biometric information of the second user in real time through the second device 2000 in order to execute the first file, the security related to the execution of the first file may be further reinforced.

Also, referring to FIG. 26B, the second device 2000 may display information for guiding the photographing of the second user, on the screen of the second device 2000. The second device 2000 may compare a currently-photographed image of the second user with a pre-registered face image of the second user for execution of the first file, and display a guide text for guiding the photographing of the second user according to the comparison results. For example, when the second user does not look front the second device 2000 while the second user is photographed, the second device 2000 may display a guide text "Please look front" on the screen of the second device 2000. Also, for example, when the second user is photographed smaller than a predetermined size, the second device 2000 may display a guide text "Please photograph a little larger" on the screen of the second device 2000.

Also, for execution of the first file, on the basis of the shape and size of the pre-registered face image of the second user, the second device 2000 may display a guideline 260 for guiding the photographing of the second user on the screen of the second device 2000. Also, the second device 2000 may display a guide text "Please adjust the face to the guideline" while displaying the guideline 260.

Figure 27:
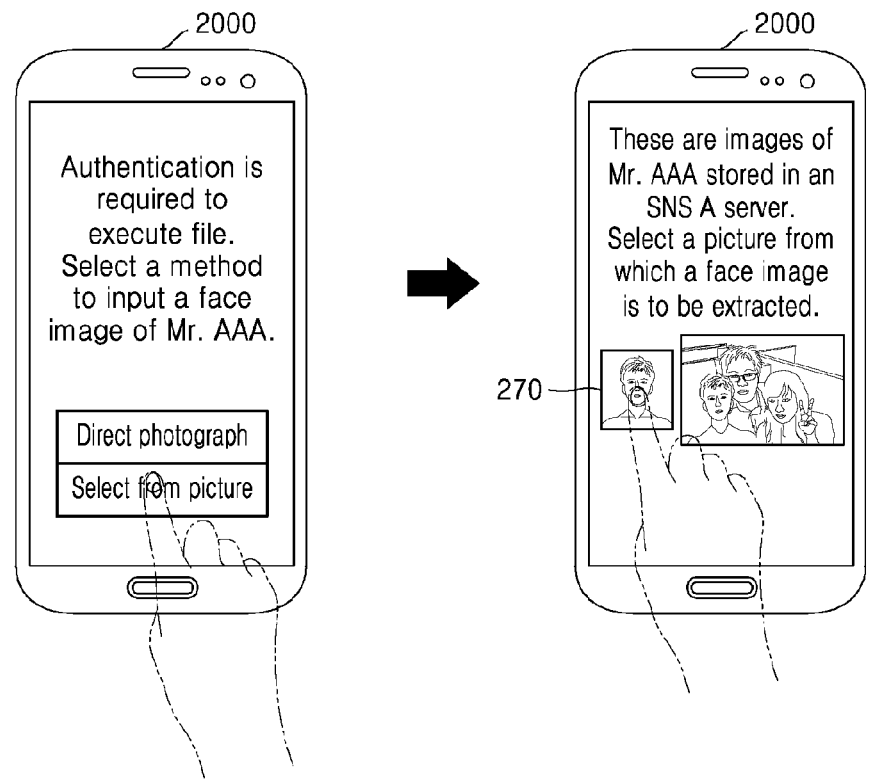
FIG. 27 illustrates an example in which the second device selects a picture including a face image of the second user for authentication for execution of a first file, according to an exemplary embodiment.

FIG. 27 illustrates an example in which the second device 2000 selects a picture including a face image of the second user for authentication for execution of a first file, according to an exemplary embodiment.

Referring to FIG. 27, the second user may select "Select from a picture" from the selection list 252 displayed in the second device 2000. Accordingly, the second device 2000 may receive a picture list including a face image of the second user from the server SNS A provided to the second device and display the received picture list on the screen of the second device 2000.

In order to guide the second user to select a picture, the second device 2000 may display a text, e.g., "This is a picture of Mr. AAA stored in the server SNS A. Please select a picture from which a face image is to be extracted."

Accordingly, the second device 2000 may select a picture 270 based on a user input and extract a face image of the second user from the selected picture 270.

Figure 28:
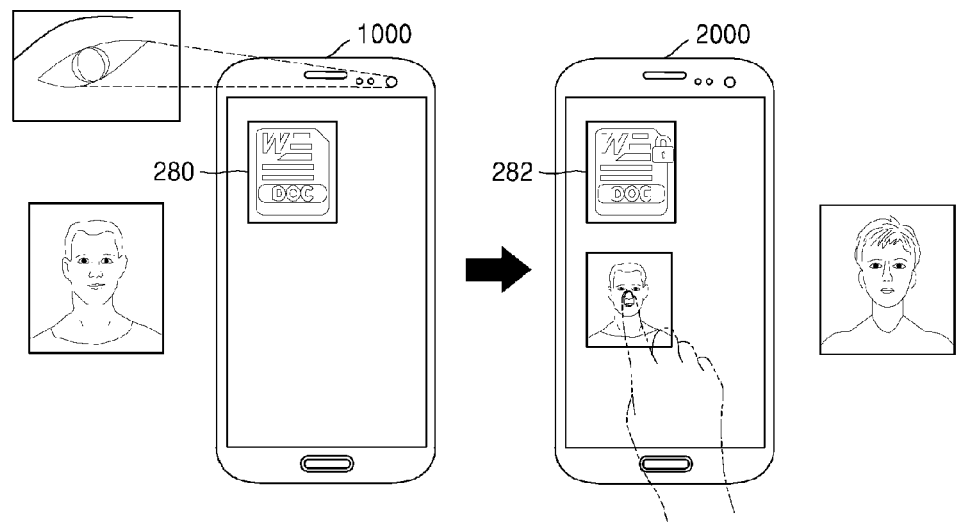
FIG. 28 illustrates an example in which the first device sets authentication information of a file by using biometric information of the first user and the second device receives authentication for execution of the file by using the biometric information of the first user, according to an exemplary embodiment.

FIG. 28 illustrates an example in which the first device 1000 sets authentication information of a file by using biometric information of the first user and the second device 2000 receives authentication for execution of the file by using the biometric information of the first user, according to an exemplary embodiment.

Referring to FIG. 28, the first device 1000 may select a file 280, acquire a pupil image of the first user as biometric information of the first user from a picture of the first user, and set the acquired pupil image of the first user as authentication information for execution of the file 280. Accordingly, the first device 1000 may generate a packaged file 282 by packaging the file 280 and the biometric information of the first user.

The second device 2000 may receive the packaged file 282 from the first device 1000 or the server 3000 and capture or obtain a pupil image of the first user in order to execute the file 280 included in the packaged file 282. The second device 2000 may determine whether to execute the file 280 included in the packaged file 282, by comparing the captured pupil image with the biometric information (authentication information) included in the packaged file 282.

Figure 29:
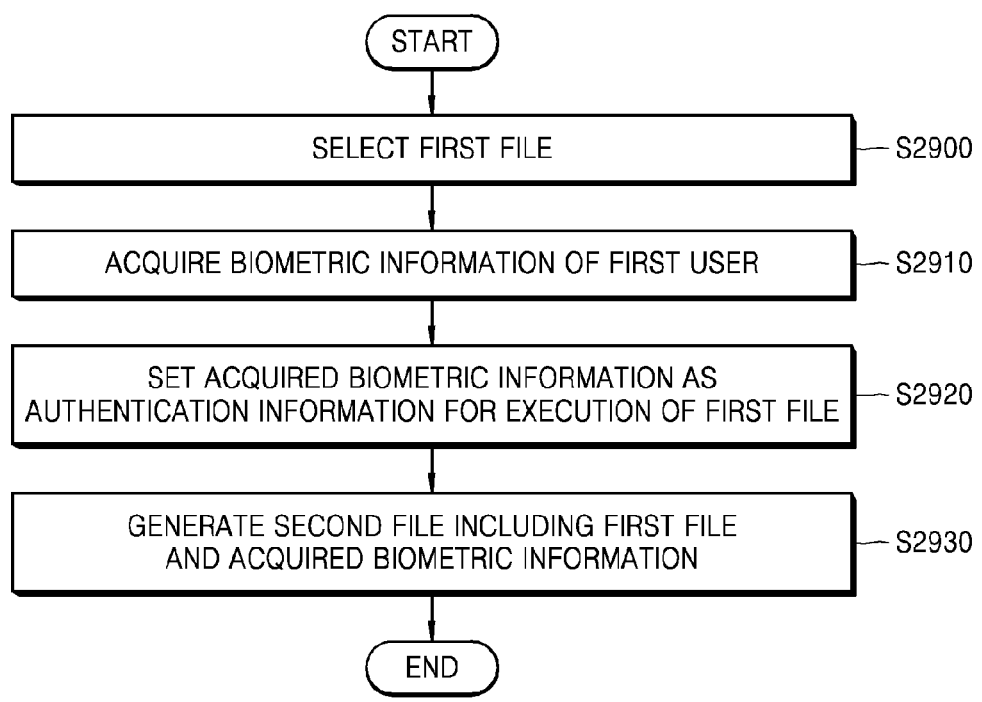
FIG. 29 is a flowchart of a method in which the first device sets biometric information of the first user as authentication information for execution of a file, according to an exemplary embodiment.

FIG. 29 is a flowchart of a method in which the first device 1000 sets biometric information of the first user as authentication information for execution of a file, according to an exemplary embodiment.

Referring to FIG. 29, in operation S2900, the first device 1000 may select a first file related to setting of authentication information. For example, the first device 1000 may select a first file for setting of authentication information from among one or more files stored in the first device 1000. However, it is understood that exemplary embodiments are not limited thereto. For example, according to another exemplary embodiment, the first device 1000 may select a first file for setting of authentication information from among one or more files stored in the server 3000. Also, the first device 1000 may select a first file for setting of authentication information from among one or more files stored in the second device 2000.

Furthermore, the selected first file may be a file to be transmitted to the second device 2000 of the second user. In this case, the first device 1000 may select the first file for setting of authentication information by executing an application for transmitting the first file to the second device 2000 and selecting the first file to be transmitted to the second device 2000 through the executed application.

In operation S2910, the first device 1000 may acquire biometric information of the first user. The first device 1000 may acquire biometric information of the first user by acquiring the content including the biometric information of the first user. For example, the first device 1000 may acquire a face image of the first user from a picture including a face of the first user from among one or more pictures stored in the first device 1000. However, it is understood that exemplary embodiments are not limited thereto. For example, according to another exemplary embodiment, the first device 1000 may request the server 3000 for a picture including a face of the first user from among one or more pictures stored in the server 3000, receive the picture including the face of the first user from the server 3000, and acquire a face image of the first user from the received picture. Also, the first device 1000 may request the second device 2000 for a picture including a face of the first user, receive the picture including the face of the first user from the second device 2000, and acquire a face image of the first user from the received picture. Moreover, the first device 1000 may acquire a face image of the first user by photographing a face of the first user.

Also, the first device 1000 may extract biometric information of the first user from the content including the biometric information of the first user.

In operation S2920, the first device 1000 may set the acquired biometric information of the first user as authentication information for execution of the first file. In operation S2930, the first device 1000 may generate a second file including the first file and the biometric information of the first user. In particular, the first device 1000 may generate the second file including the first file and the acquired biometric information of the first user by packaging the first file and the biometric information of the first user. For example, the first device 1000 may package the first file and the acquired biometric information of the first user by associating or combining the first file and the acquired biometric information of the first user. However, it is understood that exemplary embodiments are not limited thereto. For example, according to another exemplary embodiment, information indicating that biometric information is to be authenticated for execution of the first file and information about at least one of a type of biometric information for authentication, a subject of biometric information for authentication, a storage position of biometric information for authentication, and a storage position of a decryption key may be included in the packaged second file or recorded in metadata of the packaged second file, although it is understood that exemplary embodiments are not limited thereto.

Figure 30:
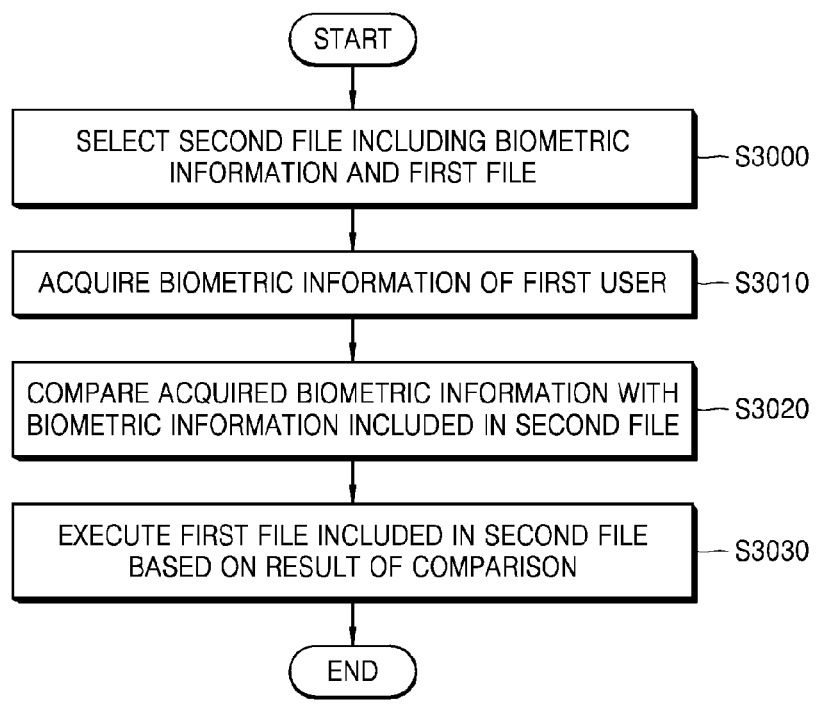
FIG. 30 is a flowchart of a method in which the second device executes a first file included in a second file, according to an exemplary embodiment.

FIG. 30 is a flowchart of a method in which the second device 2000 executes a first file included in a second file, according to an exemplary embodiment.

Referring to FIG. 30, in operation S3000, the second device 2000 may select a second file including a first file and biometric information. For example, the second device 2000 may receive the second file from the first device 1000 and select the received second file. According to another exemplary embodiment, the second device 2000 may receive the second file from the server 3000 and select the received second file.

When the second file is selected, the second device 2000 may unpackage the second file and acquire data included in the second file. The second device 2000 may acquire data included in the second file as illustrated in FIGS. 9A to 9D, although it is understood that exemplary embodiments are not limited thereto.

In operation S3010, the second device 2000 may acquire biometric information of the first user. When the second file is selected, the second device 2000 may display a user interface for guiding the input of biometric information and may acquire biometric information of the first user based on a user input received through the displayed user interface. Also, when the second file is selected, the second device 2000 may display information indicating a type of biometric information and a subject of biometric information, which is used to execute the first file, on the screen of the second device 2000. In this case, the second device 2000 may identify the type of biometric information and the subject of biometric information from information included in the second file. However, it is understood that exemplary embodiments are not limited thereto. For example, according to another exemplary embodiment, the second device 2000 may identify the type of biometric information and the subject of biometric information from the packaging information table stored in the server 3000 or in the first device 1000.

The second device 2000 may acquire the content including the biometric information of the first user from the first device 1000 and/or the server 3000.

In operation S3020, the second device 2000 may compare the biometric information acquired in operation S3010 with the biometric information included in the second file. In particular, the second device 2000 may determine whether the biometric information acquired in operation S3010 is identical to the biometric information included in the second file.

In operation S3030, the second device 2000 may execute the first file based on a result of the comparison in operation S3020. When determining that the biometric information acquired in operation S3010 is identical to the biometric information included in the second file, the second device 2000 may execute the first file. The second device 2000 may decrypt the first file and execute the decrypted first file.

Figure 31:
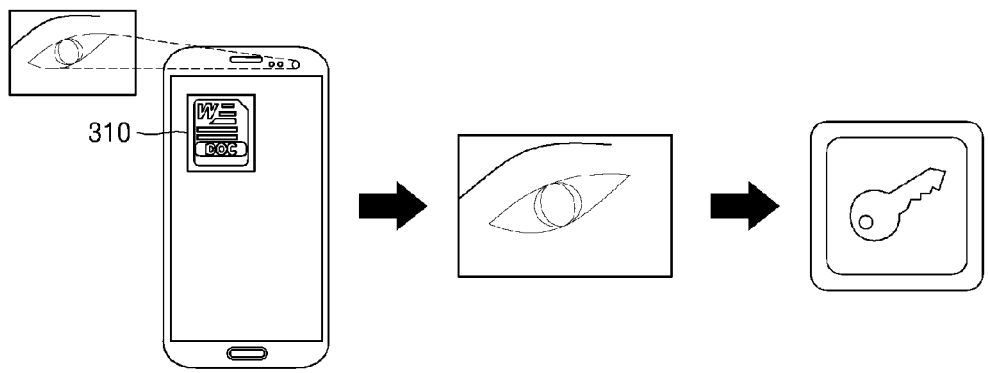
FIG. 31 illustrates an example in which the first device generates an encryption key by using biometric information of a user and encrypts a file by using the generated biometric information, according to an exemplary embodiment.

FIG. 31 illustrates an example in which the first device 1000 generates an encryption key by using biometric information of a user and encrypts a file 310 by using the generated biometric information, according to an exemplary embodiment.

Referring to FIG. 31, the first device 1000 may generate a decryption key by using biometric information of the user and reinforce the security of a file 310 shared between the first device 1000 and the second device 2000 by using the decryption key generated from the biometric information of the user.

Figure 32:
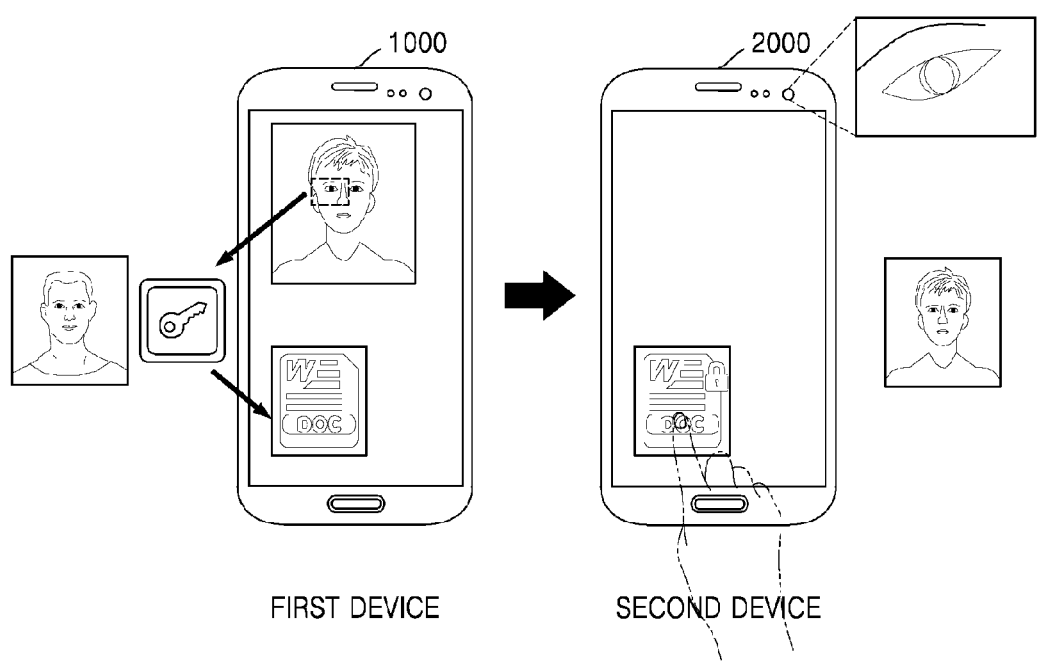
FIG. 32 illustrates an example in which the first device encrypts a file by using biometric information of the second user and the second device decrypts the file by using the biometric information of the second user, according to an exemplary embodiment.

FIG. 32 illustrates an example in which the first device 1000 encrypts a file by using biometric information of the second user and the second device 2000 decrypts the file by using the biometric information of the second user, according to an exemplary embodiment.

Referring to FIG. 32, the first device 1000 may generate an encryption key by using a pupil image of the second user and encrypt a file by using the generated encryption key. The first device 1000 may provide the encrypted file to the second device 2000, and the second device 2000 may receive the encrypted file from the first device 1000. In order to decrypt the encrypted file, the second device 2000 may capture a pupil image of the second user and generate a decryption key by using the captured pupil image. Accordingly, the second device 2000 may decrypt the encrypted file by using the generated decryption key.

Figure 33:
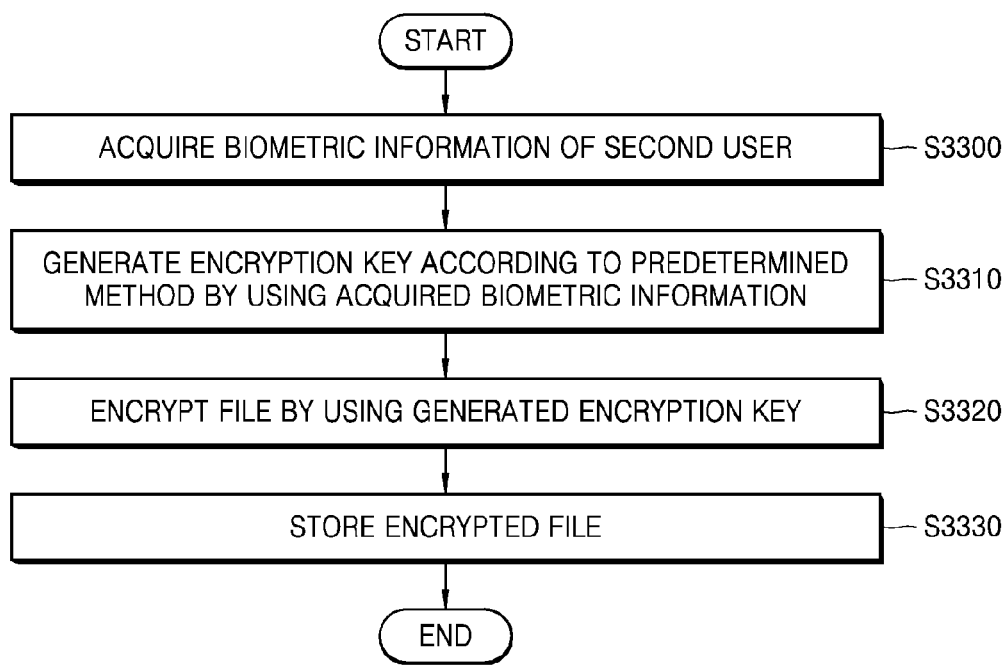
FIG. 33 is a flowchart of a method in which the first device encrypts a file by using biometric information of the second user, according to an exemplary embodiment.

FIG. 33 is a flowchart of a method in which the first device 1000 encrypts a file by using biometric information of the second user, according to an exemplary embodiment.

Referring to FIG. 33, in operation S3300, the first device 1000 may acquire biometric information of the second user. The first device 1000 may acquire biometric information of the second user by acquiring content including the biometric information of the second user. For example, the first device 1000 may acquire a face image of the second user from a picture including a face of the second user from among one or more pictures stored in the first device 1000. However, it is understood that exemplary embodiments are not limited thereto. For example, according to another exemplary embodiment, the first device 1000 may request the server 3000 for a picture including a face of the second user from among one or more pictures stored in the server 3000, receive the picture including the face of the second user from the server 3000, and acquire a face image of the second user from the received picture. Also, the first device 1000 may request the second device 2000 for a picture including a face of the second user, receive the picture including the face of the second user from the second device 2000, and acquire a face image of the second user from the received picture. The first device 1000 may extract biometric information of the second user from the content including the biometric information of the second user.

In operation S3310, the first device 1000 may generate an encryption key according to a predetermined method by using the biometric information of the second user. For example, the first device 1000 may process the biometric information of the second user and generate an encryption key by using the processed biometric information of the second user. The first device 1000 may extract feature information from the biometric information of the second user, correct the extracted feature information, and generate an encryption key by using the corrected feature information. In this case, at least one of a criterion for extracting the feature information, a criterion for correcting the feature information, and a method for generating the encryption key from the feature information may be predetermined.

In operation S3320, the first device 1000 may encrypt a file by using the generated encryption key. The first device 1000 may encrypt the file according to a predetermined encryption method by using the generated encryption key. Also, the first device 1000 may include information related to the encryption key in metadata of the encrypted file. The information related to the encryption key may include, for example, at least one of information about a type of the biometric information used to generate the encryption key, a subject of the biometric information, and a generation method of the encryption key.

In operation S3330, the first device 1000 may store the encrypted file. The first device 1000 may store the encrypted file in the first device 1000 and/or the server 3000.

Figure 34:
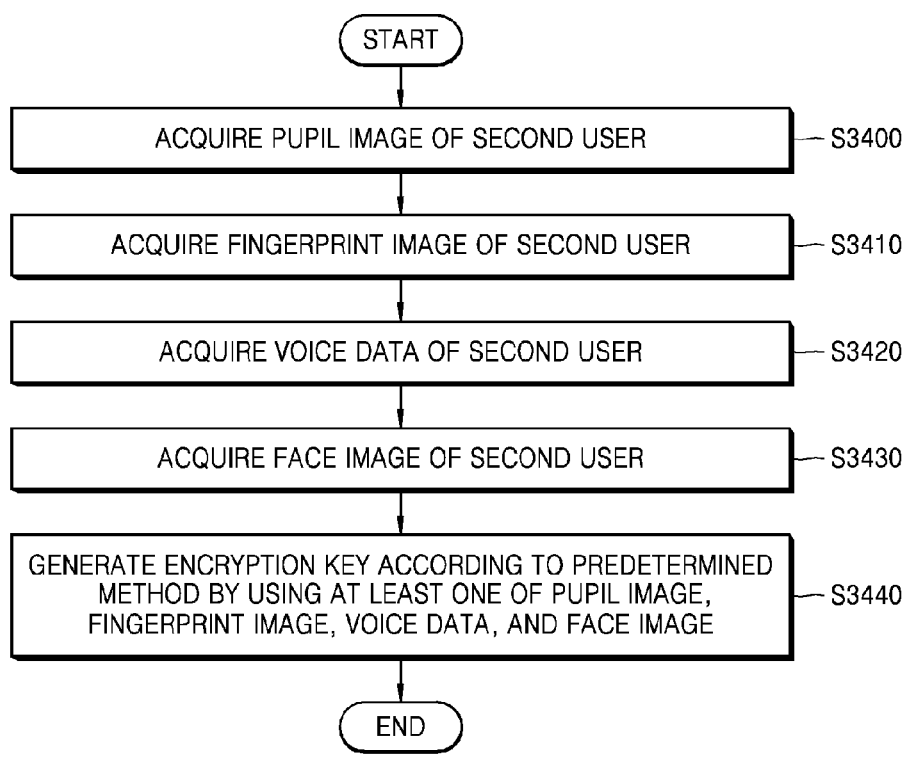
FIG. 34 is a flowchart of a method in which the first device acquires biometric information, according to an exemplary embodiment.

FIG. 34 is a flowchart of a method in which the first device 1000 acquires biometric information, according to an exemplary embodiment.

Referring to FIG. 34, in operation S3400, the first device 1000 may acquire a pupil image of the second user. The first device 1000 may acquire a picture or a moving image including a pupil image of the second user from the first device 1000, the second device 2000, or the server 3000. For example, the first device 1000 may request the second device 2000 for a pupil image of the second user and receive a pupil image captured in real time by the second device 2000 from the second device 2000. Furthermore, the first device 1000 may perform a video call with the second device 2000 and acquire a pupil image from the image of the second user displayed in the first device 1000 during the video call. Also, by way of another example, the first device 1000 may connect with the second device 2000 through a message application and receive a pupil image generated in the second device 2000 from the second device 2000 through an execution window of the message application.

In operation S3410, the first device 1000 may acquire a fingerprint image of the second user. The first device 1000 may acquire a picture or a moving image including a fingerprint image of the second user from the first device 1000, the second device 2000, or the server 3000. For example, the first device 1000 may request the second device 2000 for a fingerprint image of the second user and receive a fingerprint image generated in real time by the second device 2000 from the second device 2000. Moreover, the first device 1000 may connect with the second device 2000 through a message application and receive a fingerprint image generated in the second device 2000 from the second device 2000 through an execution window of the message application.

In operation S3420, the first device 1000 may acquire voice data of the second user. The first device 1000 may acquire an audio file including the voice data of the second user from the first device 1000, the second device 2000, or the server 3000. For example, the first device 1000 may request the second device 2000 for voice data of the second user and receive voice data generated in real time by the second device 2000 from the second device 2000. Furthermore, the first device 1000 may perform a video call or a voice call with the second device 2000 and acquire voice data of the second user by recording a voice of the second user received from the second device 2000 during the video call or the voice call.

In operation S3430, the first device 1000 may acquire a face image of the second user. The first device 1000 may acquire a picture or a moving image including a face image of the second user from the first device 1000, the second device 2000, or the server 3000. For example, the first device 1000 may request the second device 2000 for a face image of the second user and receive a face image captured in real time by the second device 2000 from the second device 2000. Also, the first device 1000 may perform a video call with the second device 2000 and acquire a face image from the image of the second user displayed in the first device 1000 during the video call. Moreover, by way of another example, the first device 1000 may connect with the second device 2000 through a message application and receive a face image generated in the second device 2000 from the second device 2000 through an execution window of the message application.

In operation S3440, the first device 1000 may generate an encryption key according to a predetermined method by using at least one of the pupil image, the fingerprint image, the voice data, and the face image of the second user. For example, at least one of a method of combining and processing the biometric information of the second user and a method of generating the encryption key may be predetermined.

Figure 35:
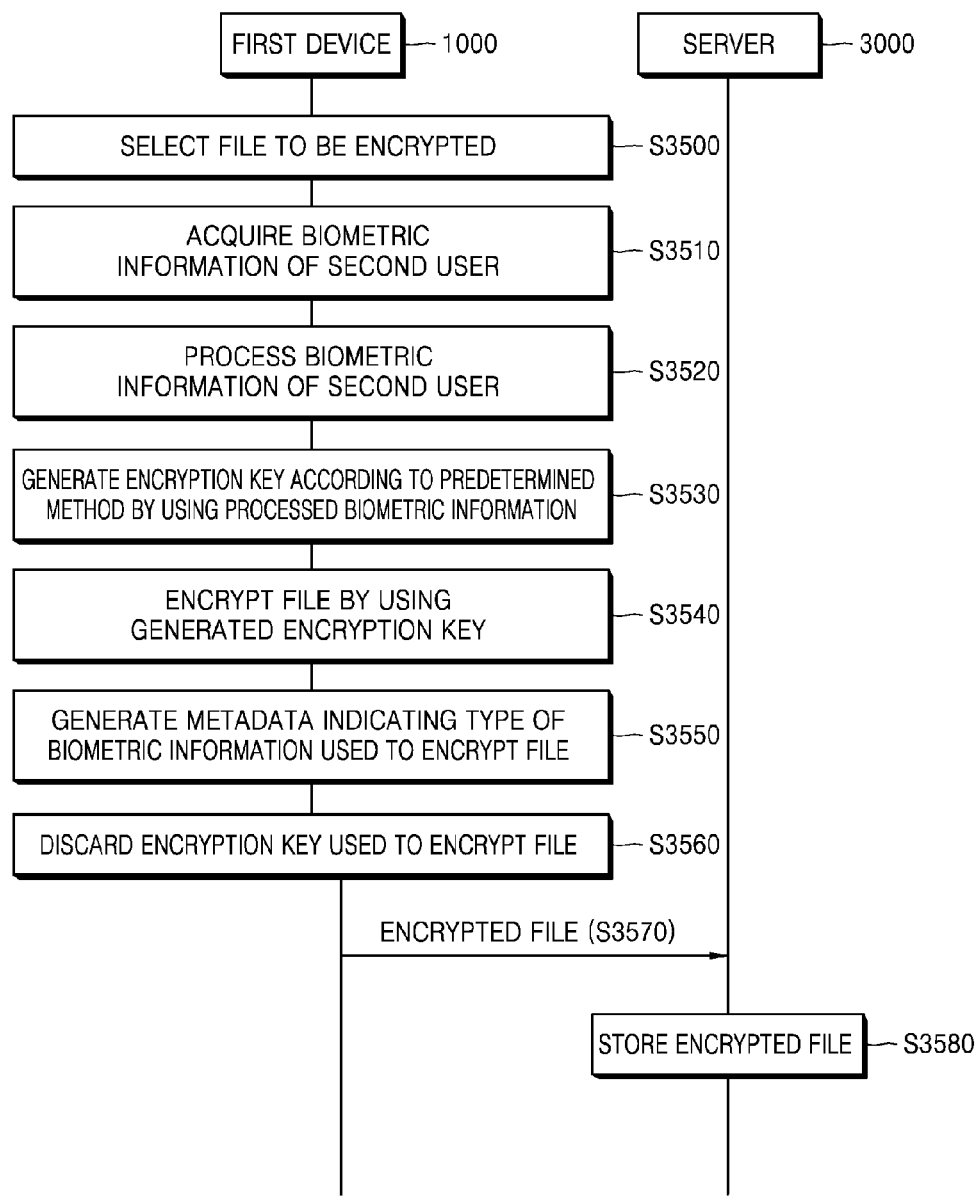
FIG. 35 is a flowchart of a method in which the first device processes biometric information of the second user and encrypts a file by using the processed biometric information, according to an exemplary embodiment.

FIG. 35 is a flowchart of a method in which the first device 1000 processes biometric information of the second user and encrypts a file by using the processed biometric information, according to an exemplary embodiment.

Referring to FIG. 35, in operation S3500, the first device 1000 may select a file to be encrypted. In operation S3510, the first device 1000 may acquire biometric information of the second user.

In operation S3520, the first device 1000 may process the biometric information of the second user. For example, the first device 1000 may extract feature information from the biometric information of the second user and correct the extracted feature information. In this case, an extraction criterion and a correction criterion of the feature information may be predetermined. According to another exemplary embodiment, the first device 1000 may extract feature information from each of pieces of biometric information and calculate an average value of pieces of extracted feature information.

In operation S3530, the first device 1000 may generate an encryption key according to a predetermined method by using the processed biometric information. In order to generate the encryption key, at least one of criterions related to an encryption key generating method, the strength of the encryption key, the type of the biometric information, and the combination of the biometric information may be predetermined. Also, when pieces of biometric information are acquired, the first device 1000 may generate a plurality of encryption keys.

In operation S3540, the first device 1000 may encrypt a file by using the generated encryption key. When a plurality of encryption keys are generated from pieces of biometric information, the first device 1000 may encrypt the file by using each of the encryption keys.

In operation S3550, the first device 1000 may generate metadata indicating the type of biometric information used to encrypt the file. At least one of information about the type of biometric information used to generate the encryption key, the subject of biometric information, the combination of pieces of biometric information, and the number of pieces of biometric information may be included in the metadata of the encrypted file.

In operation S3560, the first device 1000 may discard the encryption key used to encrypt the file. Since a decryption key for decrypting the encrypted file may always be generated from the biometric information of the second user, the first device 1000 may discard the encryption key used to encrypt the file without separately storing the encryption key. However, it is understood that exemplary embodiments are not limited thereto.

In operation S3570, the first device 1000 may transmit the encrypted file to the server 3000. In operation S3580, the server 3000 may store the encrypted file.

Figure 36:
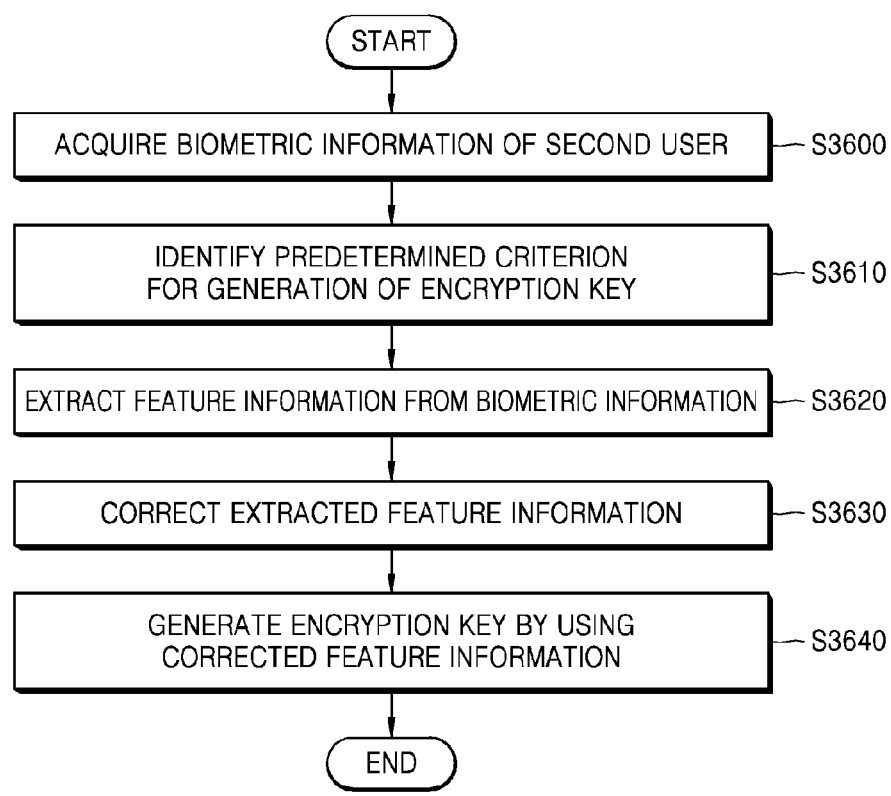
FIG. 36 is a flowchart of a method in which the first device processes biometric information of the second user, according to an exemplary embodiment.

FIG. 36 is a flowchart of a method in which the first device 1000 processes biometric information of the second user, according to an exemplary embodiment.

Referring to FIG. 36, in operation S3600, the first device 1000 may acquire biometric information of the second user. In operation S3610, the first device 1000 may identify a predetermined criterion for generation of an encryption key. The criterion for generation of the encryption key may include, for example, criterions related to at least one of a method of extracting feature information according to the type of biometric information, a method of correcting feature information, an encryption strength, and a method of generating the encryption key.

In operation S3620, the first device 1000 may extract feature information from the biometric information of the second user. For example, when the biometric information of the second user is a pupil image, the first device 1000 may extract a predetermined number of feature points from feature portions of the pupil image and acquire coordinate values of the extracted feature points. Also, when the biometric information of the second user is a face image, the first device 1000 may extract a predetermined number of feature points from feature portions of the face image and acquire coordinate values of the extracted feature points. Furthermore, when the biometric information of the second user is a fingerprint image, the first device 1000 may extract a predetermined number of feature points from feature portions of the fingerprint image and acquire coordinate values of the extracted feature points.

In operation S3630, the first device 1000 may correct the extracted feature information. The first device 1000 may quantize the coordinate values of the extracted feature information. For example, the first device 1000 may quantize the coordinate values of the extracted feature information based on a plurality of predetermined level values, although it is understood that exemplary embodiments are not limited thereto. Various quantization schemes may be used to correct the feature information.

In operation S3640, the first device 1000 may generate an encryption key by using the corrected feature information.

Figure 37:
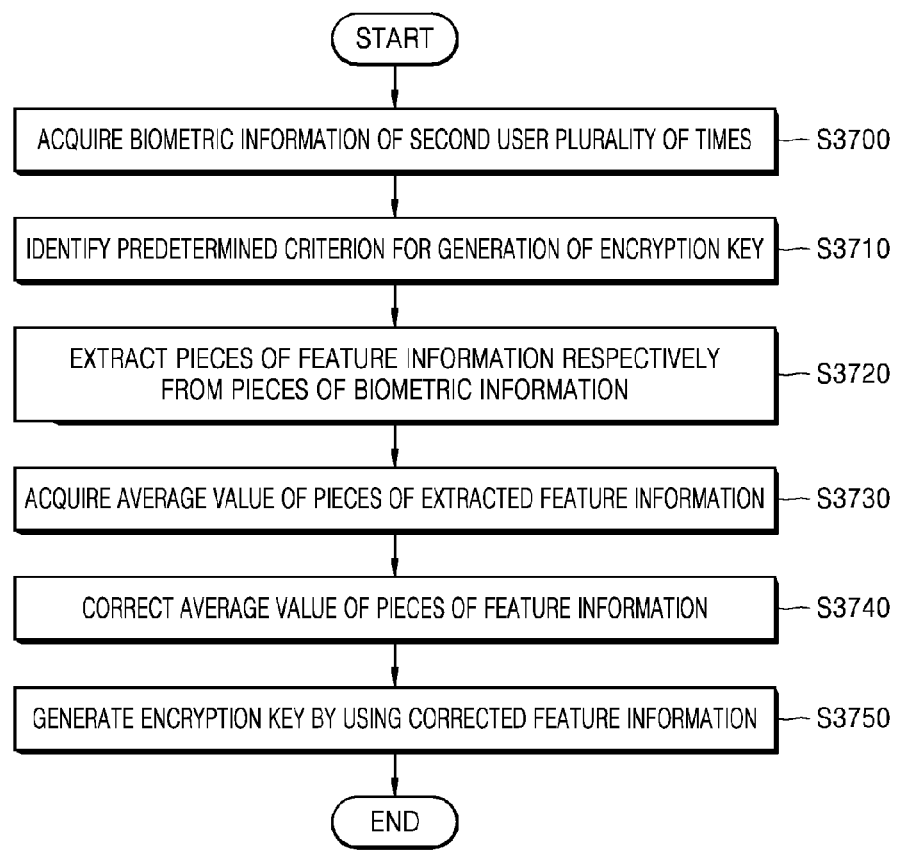
FIG. 37 is a flowchart of a method in which the first device acquires biometric information of the second user a plurality of times and generates an encryption key by using an average value of pieces of feature information extracted from pieces of extracted biometric information, according to an exemplary embodiment.

FIG. 37 is a flowchart of a method in which the first device 1000 acquires biometric information of the second user a plurality of times and generates an encryption key by using an average value of pieces of feature information extracted from pieces of extracted biometric information, according to an exemplary embodiment.

Referring to FIG. 37, in operation S3700, the first device 1000 may acquire biometric information of the second user a plurality of times. The pieces of biometric information of the second user may not be identical to each other. For example, when the first device 1000 acquires three fingerprint images of the second user, the three fingerprint images may not be identical to each other.

In operation S3710, the first device 1000 may identify a predetermined criterion for generation of an encryption key. The criterion for generation of the encryption key may include, for example, criterions related to a method of extracting feature information according to the type of biometric information, a method of correcting feature information, an encryption strength, and a method of generating the encryption key.

In operation S3720, the first device 1000 may extract feature information from each of the pieces of biometric information of the second user. The first device 1000 may extract feature points respectively from the pieces of biometric information of the second user and calculate coordinate values of the extracted feature points.

In operation S3730, the first device 1000 may acquire an average value of the pieces of biometric information. For example, one or more feature points extracted from first biometric information of the second user may be respectively matched to one or more feature points extracted from second biometric information of the second user. In this case, the first device 1000 may calculate an average value of the coordinate values of the respectively-matched feature points.

In operation S3740, the first device 1000 may correct the average value of the feature information. The first device 1000 may quantize the average value of the feature information. For example, the first device 1000 may quantize the average value of the feature information based on a plurality of predetermined level values, although it is understood that exemplary embodiments are not limited thereto. Various quantization schemes may be used to correct the feature information.

In operation S3750, the first device 1000 may generate an encryption key by using the corrected feature information.

Figure 38:
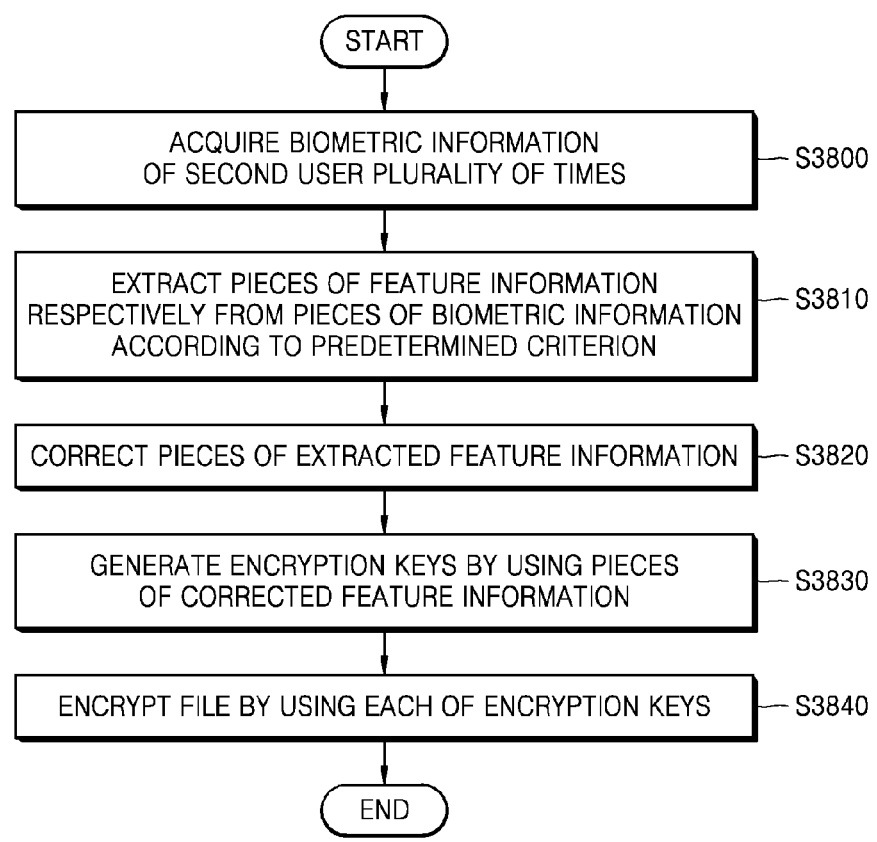
FIG. 38 is a flowchart of a method in which the first device acquires biometric information of the second user a plurality of times and generates encryption keys from pieces of extracted biometric information, according to an exemplary embodiment.

FIG. 38 is a flowchart of a method in which the first device 1000 acquires biometric information of the second user a plurality of times and generates encryption keys from pieces of extracted biometric information, according to an exemplary embodiment.

Referring to FIG. 38, in operation S3800, the first device 1000 may extract biometric information of the second user a plurality of times. In operation S3810, the first device 1000 may extract feature information from each of the pieces of biometric information. For example, a plurality of feature points from a fingerprint image, and in this case, coordinates values of the feature points extracted from the fingerprint image may be feature information extracted from the fingerprint image.

In operation S3820, the first device 1000 may correct each of the pieces of extracted feature information. The first device 1000 may quantize the coordinate values of the extracted feature information. For example, the first device 1000 may quantize the coordinate values of the extracted feature information based on a plurality of predetermined level values, although it is understood that exemplary embodiments are not limited thereto. Various quantization schemes may be used to correct the feature information.

In operation S3830, the first device 1000 may generate a plurality of encryption keys by using the pieces of corrected feature information. In operation S3840, the first device 1000 may generate a plurality of encrypted files by encrypting the plurality of files using the plurality of encryption keys.

Figure 39:
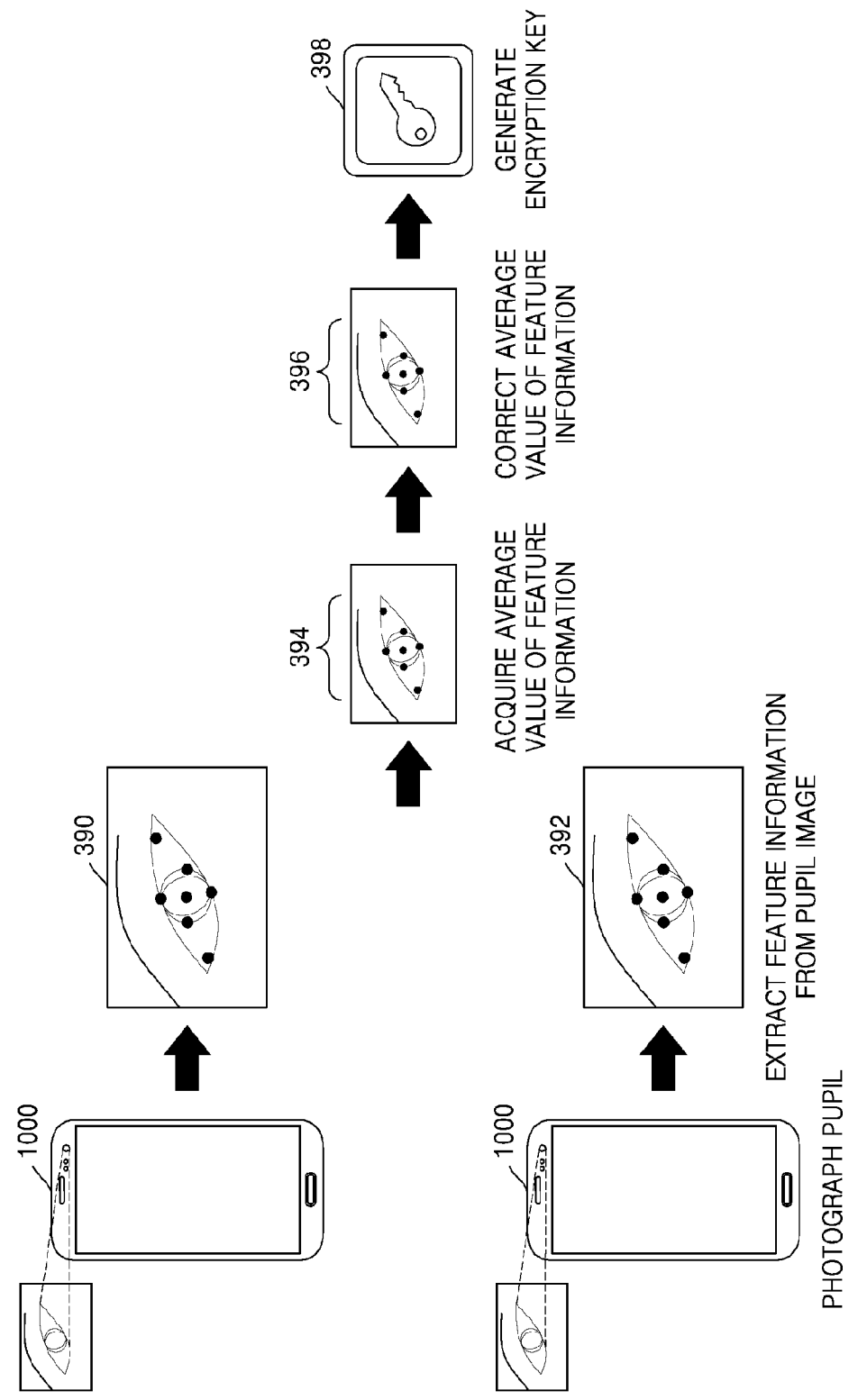
FIG. 39 illustrates an example of generating one encryption key from pupil images of a user, according to an exemplary embodiment.

FIG. 39 illustrates an example of generating one encryption key from pupil images of a user, according to an exemplary embodiment.

Referring to FIG. 39, the first device 1000 may photograph a pupil of the user a plurality of times and extract feature information from each of pupil images 390 and 392. The pieces of feature information extracted from the pupil images 390 and 392 may include coordinate values of feature points extracted from the pupil image 390 and coordinate values of feature points extracted from the pupil image 392.

Thereafter, the first device 1000 may calculate an average value of the pieces of extracted feature information. The feature points extracted from the pupil image 390 may be respectively matched to the feature points extracted from the pupil image 392. In this case, the first device 1000 may calculate an average value of the coordinate values of the respectively-matched feature points. Accordingly, feature points 394 having the average coordinate value may be acquired.

The first device 1000 may correct the average value of the feature information. For example, the first device 1000 may quantize the coordinate values of the feature points 394 based on a plurality of predetermined level values. Accordingly, feature points 396 having a corrected coordinate value may be acquired.

Thereafter, the first device 1000 may generate an encryption key by using the coordinate value of the feature points 396 having the corrected coordinate value.

Figure 40:
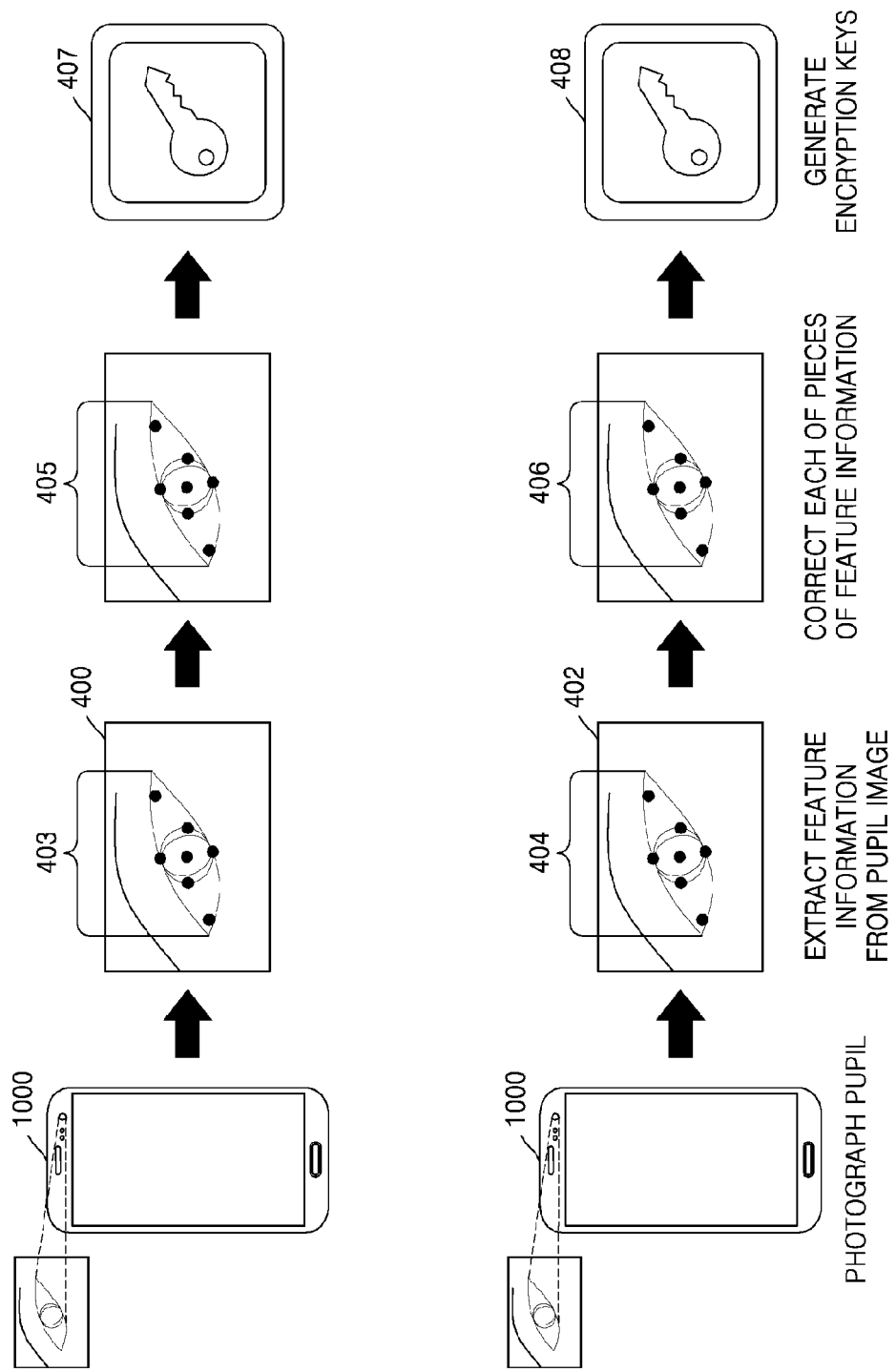
FIG. 40 illustrates an example of generating encryption keys from pupil images of a user, according to an exemplary embodiment.

FIG. 40 illustrates an example of generating encryption keys from pupil images of a user, according to an exemplary embodiment.

Referring to FIG. 40, the first device 1000 may photograph a pupil of the user a plurality of times and extract feature information from each of pupil images 400 and 402. The pieces of feature information extracted from the pupil images 400 and 402 may include coordinate values of feature points 403 extracted from the pupil image 400 and coordinate values of feature points 404 extracted from the pupil image 402.

The first device 1000 may correct the feature information. For example, the first device 1000 may quantize the coordinate values of the feature points 403 based on a plurality of predetermined level values. Accordingly, the first device 1000 may acquire feature points 405 having a corrected coordinate value. For example, the first device 1000 may quantize the coordinate values of the feature points 404 based on a plurality of predetermined level values. Thus, the first device 1000 may acquire feature points 406 having a corrected coordinate value.

Thereafter, the first device 1000 may generate an encryption key by using the coordinate value of the feature points 405 having the corrected coordinate value and may generate an encryption key by using the coordinate value of the feature points 406 having the corrected coordinate value.

Figure 41:
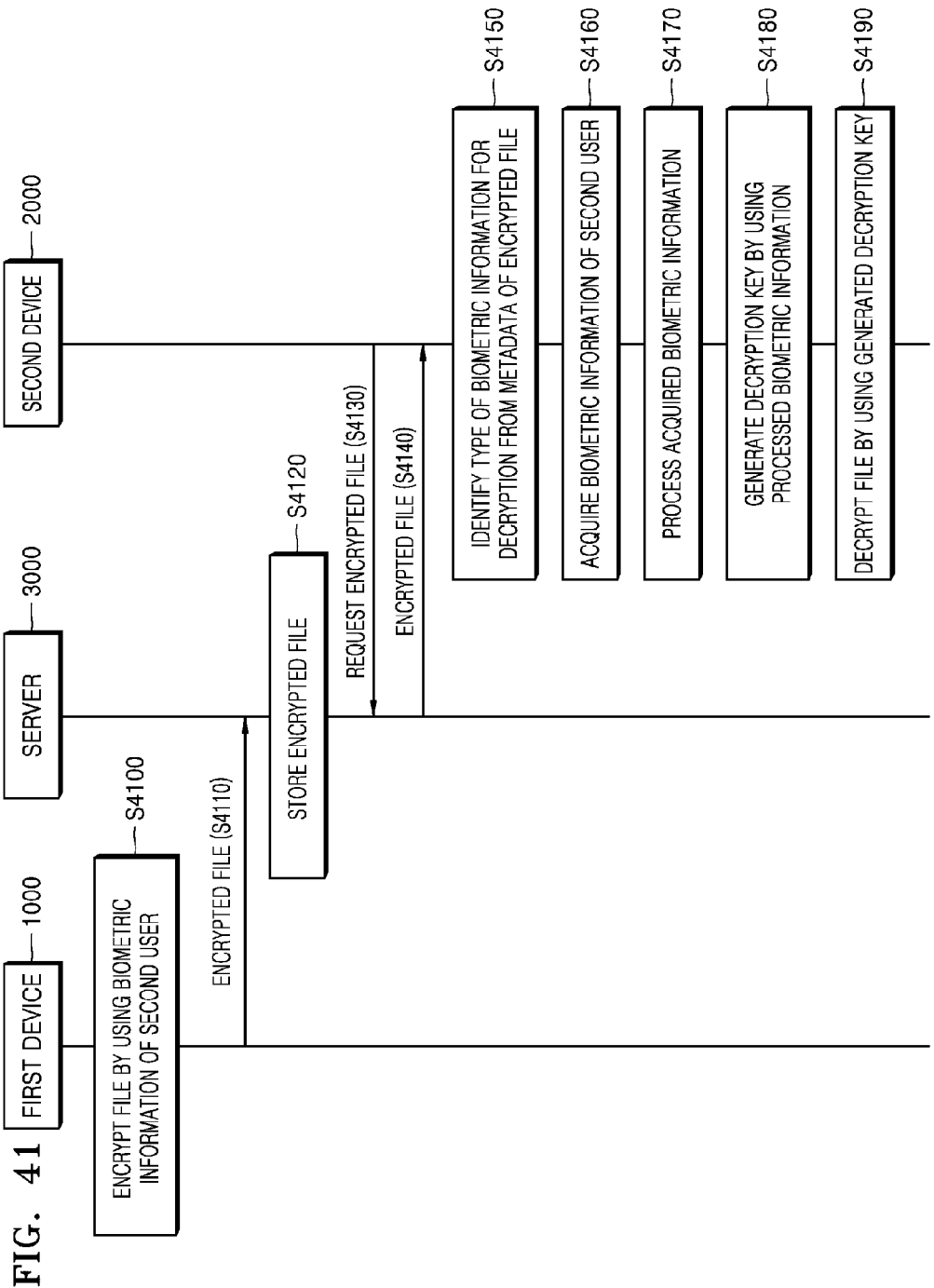
FIG. 41 is a flowchart of a method in which the second device receives an encrypted file from the server and decrypts the encrypted file, according to an exemplary embodiment.

FIG. 41 is a flowchart of a method in which the second device 2000 receives an encrypted file from the server 3000 and decrypts the encrypted file, according to an exemplary embodiment.

Referring to FIG. 41, in operation S4100, the first device 1000 may encrypt a file by using biometric information of the second user. In operation S4110, the first device 1000 may provide the encrypted file to the server 3000.

In operation S4120, the server 3000 may store the encrypted file. The server 3000 may store the encrypted file and set the encrypted file as a file shared between the first user and the second user.

In operation S4130, the second device 2000 may request the server 3000 for the encrypted file. In operation S4140, the server 3000 may provide the encrypted file to the second device 2000.

In operation S4150, the second device 2000 may identify the type of biometric information for decryption from metadata of the encrypted file. For example, from the metadata of the encrypted file, the second device 2000 may identify that a pupil image of the second user is used to decrypt the encrypted file.

In operation S4160, the second device 2000 may acquire biometric information of the second user. For example, the second device 2000 may capture a pupil image of the second user by activating the camera. According to another exemplary embodiment, the second device 2000 may receive the content including a pupil image of the second user from the server 3000 or the memory of the second device 2000 and extract a pupil image of the second user from the received content.

Also, the second device 2000 may acquire pieces of biometric information of the second user, although it is understood that exemplary embodiments are not limited thereto.

In operation S4170, the second device 2000 may process the acquired biometric information. In operation S4180, the second device 2000 may generate a decryption key by using the processed biometric information. In this case, the second device 2000 may acquire information about a biometric information processing method and a decryption key generating method from the metadata of the encrypted file.

In operation S4190, the second device 2000 may decrypt the encrypted file by using the generated decryption key.

Figure 42:
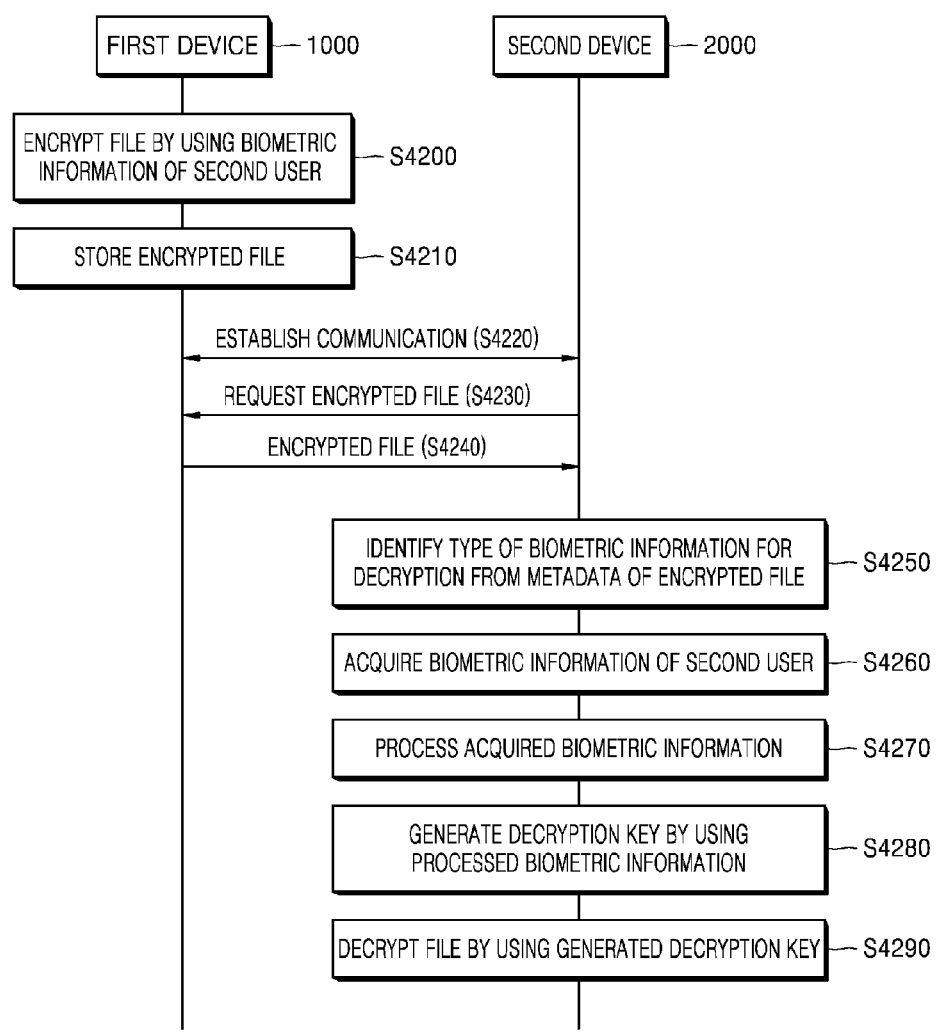
FIG. 42 is a flowchart of a method in which the second device receives an encrypted file from the first device and decrypts the encrypted file, according to an exemplary embodiment.

FIG. 42 is a flowchart of a method in which the second device 2000 receives an encrypted file from the first device 1000 and decrypts the encrypted file, according to an exemplary embodiment.

Referring to FIG. 42, in operation S4200, the first device 1000 may encrypt a file by using biometric information of the second user. In operation S4210, the first device 1000 may store the encrypted file in the first device 1000.

In operation S4220, the first device 1000 establishes communication with the second device 2000. For example, the first device 1000 and the second device 2000 may establish communication therebetween through a wired network such as a local area network (LAN), a wide area network (WAN), or a value-added network (VAN), or through a wireless network such as a mobile communication network or a satellite communication network.

Since operations S4230 to S4290 correspond to operations S4130 to S4190 of FIG. 41, descriptions thereof will be omitted for convenience sake.

Figure 43:
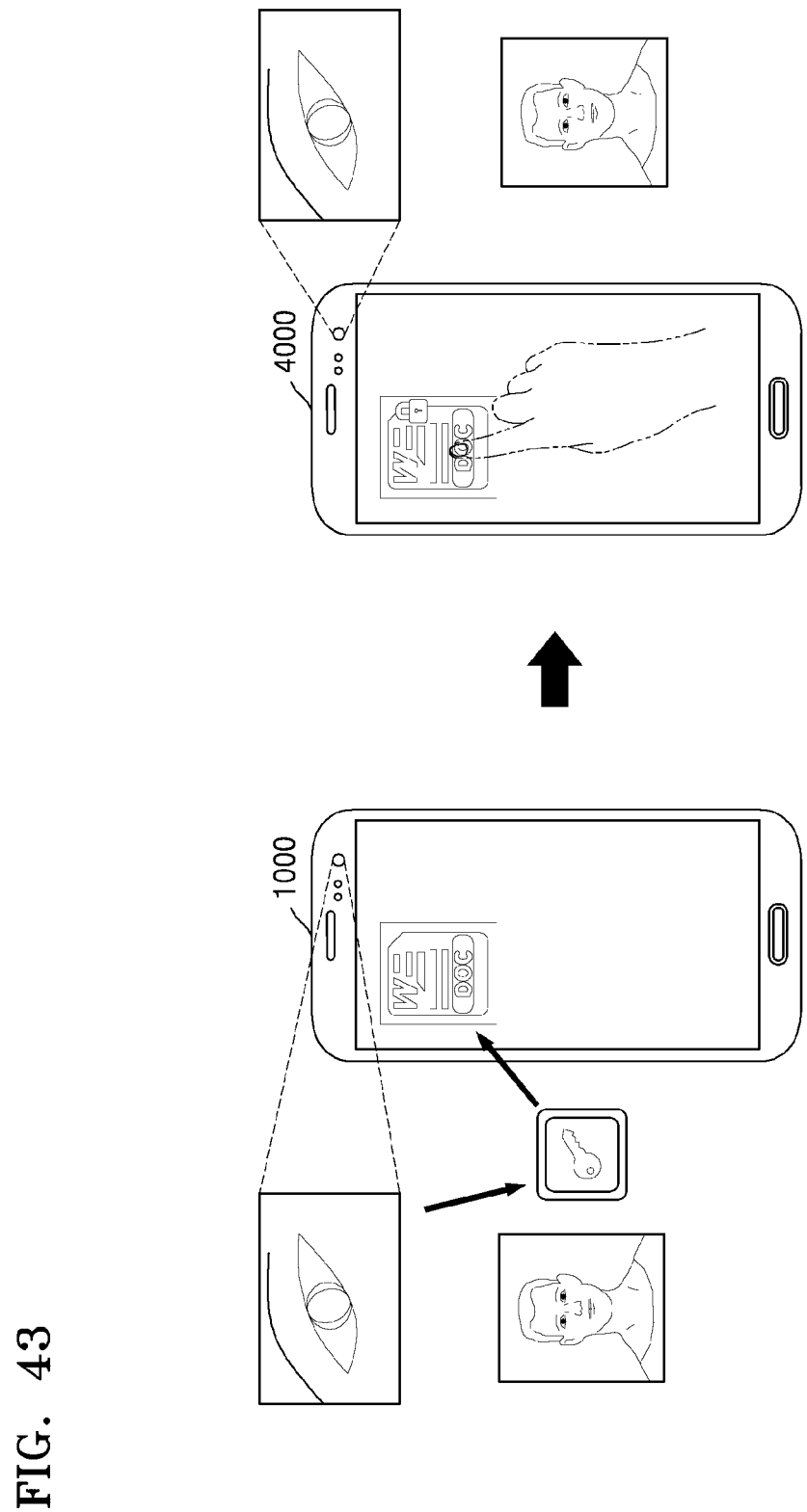
FIG. 43 illustrates an example in which the first device of the first user encrypts a file by using biometric information of the first user and a third device of the first user decrypts the file by using the biometric information of the first user, according to an exemplary embodiment.

FIG. 43 illustrates an example in which the first device 1000 of the first user encrypts a file by using biometric information of the first user and the third device 4000 of the first user decrypts the file by using the biometric information of the first user, according to an exemplary embodiment.

Referring to FIG. 43, the first device 1000 of the first user may generate an encryption key by using a pupil image of the first user and encrypt a file by using the generated encryption key. The first device 1000 may provide the encrypted file to the third device 4000, and the third device 4000 may receive the encrypted file from the first device 1000. In order to decrypt the encrypted file, the third device 4000 may capture a pupil image of the first user and generate a decryption key by using the captured pupil image. The first device 1000 may decrypt the encrypted file by using the generated decryption key.

FIG. 43 illustrates that the third device 4000 of the first user decrypts the encrypted file, although it is understood that exemplary embodiments are not limited thereto. For example, according to another exemplary embodiment, the first device 1000 of the first user may decrypt the encrypted file.

Figure 44:
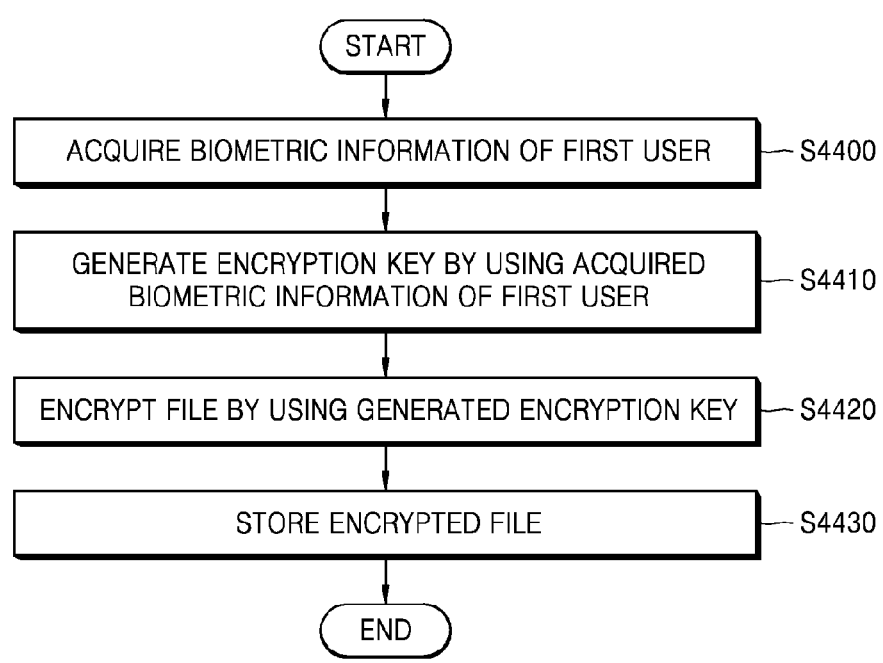
FIG. 44 is a flowchart of a method in which the first device encrypts a file by using biometric information of the first user, according to an exemplary embodiment.

FIG. 44 is a flowchart of a method in which the first device 1000 encrypts a file by using biometric information of the first user, according to an exemplary embodiment.

Referring to FIG. 44, in operation S4400, the first device 1000 may acquire biometric information of the first user. The first device 1000 may acquire biometric information of the first user by acquiring the content including the biometric information of the first user. For example, the first device 1000 may acquire the content including a face image of the first user by photographing a face of the first user by using the camera included in the first device 1000. Also, the first device 1000 may acquire a face image of the first user from a picture including a face of the first user from among one or more pictures stored in the first device 1000. Furthermore, the first device 1000 may request the server 3000 for a picture including a face of the first user from among one or more pictures stored in the server 3000, receive the picture including the face of the first user from the server 3000, and acquire a face image of the first user from the received picture. Moreover, the first device 1000 may extract biometric information of the first user from the content including the biometric information of the first user. According to another exemplary embodiment, the first device 1000 may acquire pieces of biometric information.

In operation S4410, the first device 1000 may generate an encryption key according to a predetermined method by using the biometric information of the first user. The first device 1000 may process the biometric information of the first user and generate an encryption key by using the processed biometric information of the first user. The first device 1000 may extract feature information from the biometric information of the first user, correct the extracted feature information, and generate an encryption key by using the corrected feature information. In this case, at least one of a criterion for extracting the feature information, a criterion for correcting the feature information, and a method for generating the encryption key from the feature information may be predetermined. Also, the first device 1000 may generate a plurality of encryption keys.

In operation S4420, the first device 1000 may encrypt a file by using the generated encryption key. The first device 1000 may encrypt the file according to a predetermined encryption method by using the generated encryption key. Also, the first device 1000 may include information related to the encryption key in metadata of the encrypted file. The information related to the encryption key may include, for example, at least one of information about a type of the biometric information used to generate the encryption key, a subject of the biometric information, and a generation method of the encryption key. Furthermore, the first device 1000 may generate a plurality of encrypted files by using the plurality of encryption keys.

In operation S4430, the first device 1000 may store the encrypted file. The first device 1000 may store the encrypted file in the first device 1000 and/or the server 3000. Also, the first device 1000 may discard the encryption key used to encrypt the file without storing the encryption key.

Figure 45:
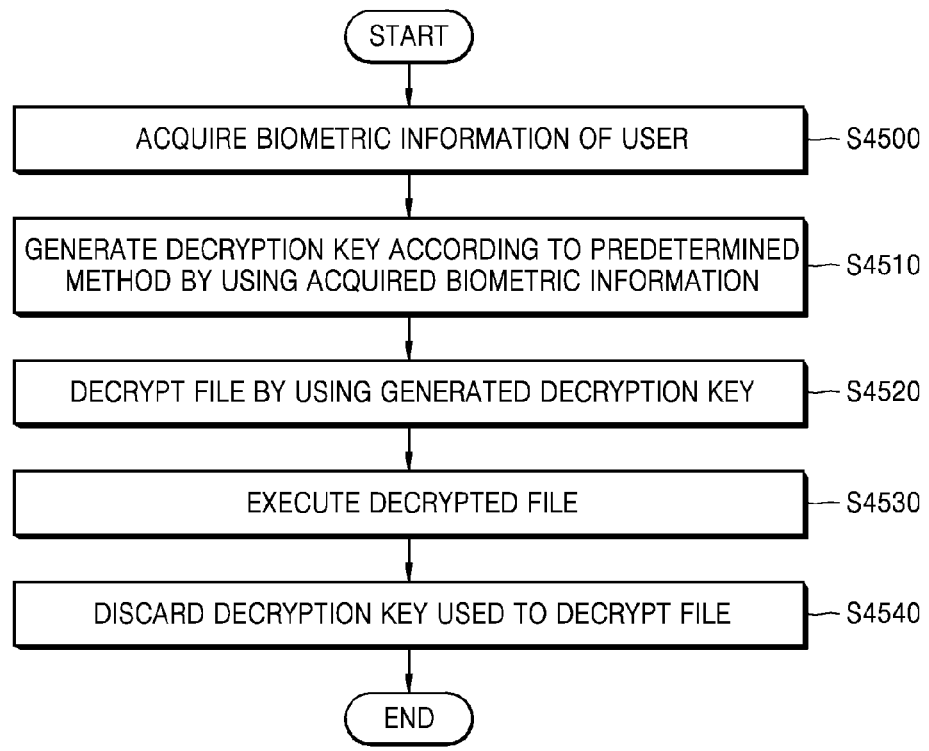
FIG. 45 is a flowchart of a method in which the third device decrypts an encrypted file, according to an exemplary embodiment.

FIG. 45 is a flowchart of a method in which the third device 4000 decrypts an encrypted file, according to an exemplary embodiment.

Referring to FIG. 45, in operation S4500, the third device 4000 may acquire biometric information of the first user. In this case, the third device 4000 may identify the type of biometric information for decryption from metadata of the encrypted file. For example, from the metadata of the encrypted file, the third device 4000 may identify that a face image of the first user is used to decrypt the encrypted file. In this case, the third device 4000 may capture a face image of the first user by activating the camera. Furthermore, the third device 4000 may receive the content including a pupil image of the first user from the server 3000 or the memory of the third device 4000 and extract a pupil image of the first user from the received content.

Also, the third device 4000 may acquire pieces of biometric information of the first user, although it is understood that exemplary embodiments are not limited thereto.

In operation S4510, the third device 4000 may generate a decryption key according to a predetermined method by using the acquired biometric information. The third device 4000 may process the acquired biometric information and generate a decryption key by using the processed biometric information. In this case, the third device 4000 may acquire information about a biometric information processing method and a decryption key generating method from the metadata of the encrypted file. According to another exemplary embodiment, the third device 4000 may generate a plurality of decryption keys.

In operation S4520, the third device 4000 may decrypt the encrypted file by using the generated decryption key. When a plurality of decryption keys are generated, the third device 4000 may decrypt the encrypted file by using each of the decryption keys.

In operation S4530, the third device 4000 may execute the decrypted file. In operation S4540, the third device 4000 may discard the decryption key used to decrypt the encrypted file without storing the decryption key.

FIG. 46 illustrates an example of a table showing metadata of an encrypted file according to an exemplary embodiment.

Referring to FIG. 46, the table showing the metadata of the encrypted file may include a file name field 460, a biometric information subject field 462, a biometric information type field 464, an encryption method field 466, and an encryption key strength field 468.

A name of the encrypted file may be included in the file name field 460. For example, file A, file B, file C, or file D may be included in the file name filed 460.

A subject of the biometric information used to generate the encryption key may be included in the biometric information subject field 462. For example, at least one of the first user and the second user may be included in the biometric information subject filed 462.

A type of the biometric information used to generate the encryption key may be included in the biometric information type field 464. For example, at least one of a pupil image, a fingerprint image, a voice, and a face image may be included in the biometric information type field 464.

A file encryption method may be included in the encryption method field 466. For example, at least one of method A, method B, and method C may be included in the encryption method filed 466.

A file encryption key strength may be included in the encryption key strength field 468. For example, High, Medium, or Low may be included in the encryption key strength field 468.

Although it has been described above that the first device 1000 generates the second file by packaging the first file and the biometric information and provides the generated second file to the second device 2000 and/or the third device 4000, exemplary embodiments are not limited thereto. For example, the first device 1000 may not package the first file and the biometric information, and may separately provide the first file and the biometric information to the second device 2000 and/or the third device 4000.

Figure 47:
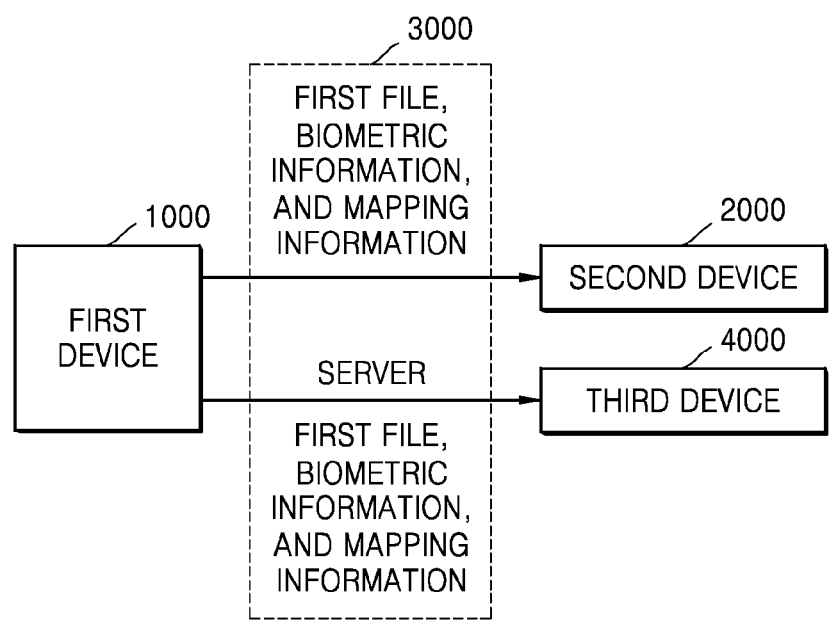
FIG. 47 illustrates an example in which the first device provides a first file, biometric information, and mapping information to the second device and the third device, according to some embodiments.

FIG. 47 illustrates an example in which the first device 1000 provides a first file, biometric information, and mapping information to the second device 2000 and the third device 4000, according to some embodiments.

Referring to FIG. 47, according to some embodiments, the first device 1000 may separately transmit the first file and the biometric information to the second device 2000 and/or the third device 4000. The first device 1000 may encrypt the first file with biometric information of the second user and map the encrypted first file and the biometric information of the second user. Also, the first device 1000 may transmit the encrypted first file, the biometric information of the second user, and the mapping information to the second device 2000.

Also, the first device 1000 may encrypt the first file with biometric information of the first user and map the encrypted first file and the biometric information of the first user. Also, the first device 1000 may transmit the encrypted first file, the biometric information of the first user, and the mapping information to the third device 4000.

Figure 48:
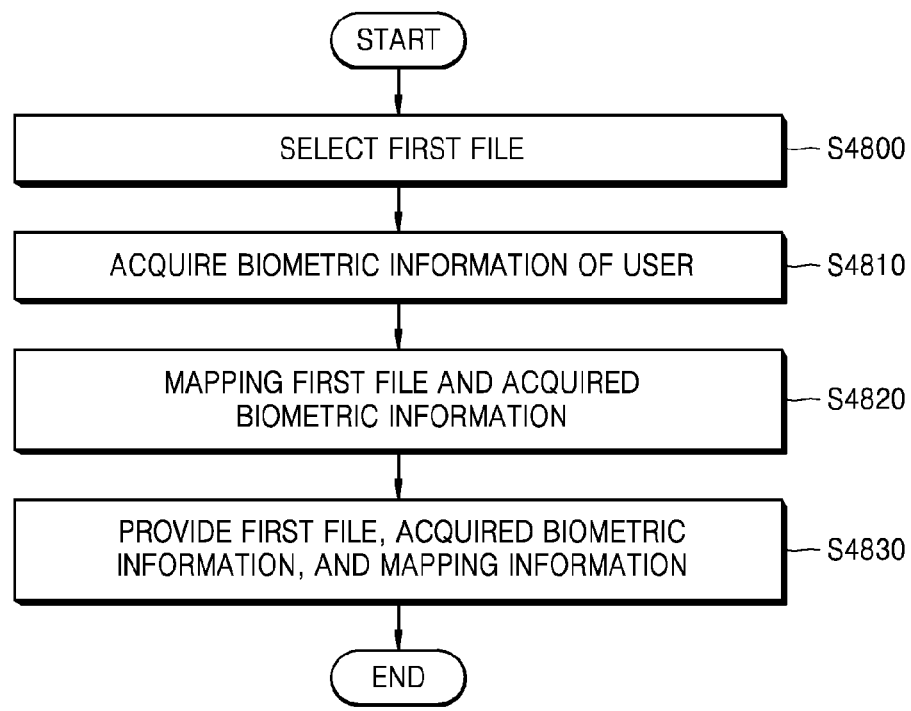
FIG. 48 is a flowchart of a method in which the first device provides a first file, biometric information, and mapping information, according to some embodiments.

FIG. 48 is a flowchart of a method in which the first device 1000 provides a first file, biometric information, and mapping information, according to some embodiments.

Referring to FIG. 48, in operation S4800, the first device 1000 may select a first file. The first device 1000 may select a first file related to setting of authentication information. The first device 1000 may select a first file for setting of authentication information from among files stored in the first device 1000. Also, the first device 1000 may select a first file for setting of authentication information from among the files stored in the server 3000. Also, the first device 1000 may select a first file for setting of authentication information from among files stored in the second device 2000. However, exemplary embodiments are not limited thereto.

In operation S4810, the first device 1000 may acquire biometric information of the user. The first device 1000 may acquire biometric information of the first user of the first device 1000 or biometric information of the second user of the second device 2000. The first device 1000 may acquire biometric information of the user by acquiring contents (e.g., pictures, moving images, or audio files) including the biometric information of the user. The first device 1000 may extract biometric information of the user from the content including the biometric information of the user, but exemplary embodiments are not limited thereto. Also, the first device 1000 may use the content including the biometric information of the user as the biometric information of the user.

In operation S4820, the first device 1000 may map the first file and the biometric information. For example, the first device 1000 may map the unencrypted first file and the biometric information. As another example, the first device 1000 may map the encrypted first file and the biometric information. In this case, the encrypted first file may be a file encrypted by using the biometric information.

In operation S4830, the first device 1000 may provide the first file, the biometric information, and the mapping information. The mapping information may be information indicating that the first file and the biometric information are mapped to each other. For example, the mapping information may include an identification value of the first file and an identification value of the biometric information. Also, the mapping information may be included in metadata of the first file, or may be included in meta-information of a file of the biometric information. However, exemplary embodiments are not limited thereto.

Also, the first device 1000 may provide the first file, the biometric information, and the mapping information to at least one of the second device 2000 and the third device 4000. The first device 1000 may transmit the first file, the biometric information, and the mapping information to at least one of the second device 2000 and the third device 4000 directly or via the server 3000. In this case, the biometric information may be hash-processed according to a predetermined criterion.

Accordingly, in order to execute the first file, the second device 2000 or the third device 4000 may authenticate the execution of the first file by using the biometric information mapped to the first file. The second device 2000 or the third device 4000 may use the mapping information to identify the biometric information mapped to the first file. The second device 2000 or the third device 4000 may authenticate the execution of the first file by comparing the biometric information generated in the second device 2000 or the third device 4000 with the identified biometric information.

Figure 49:
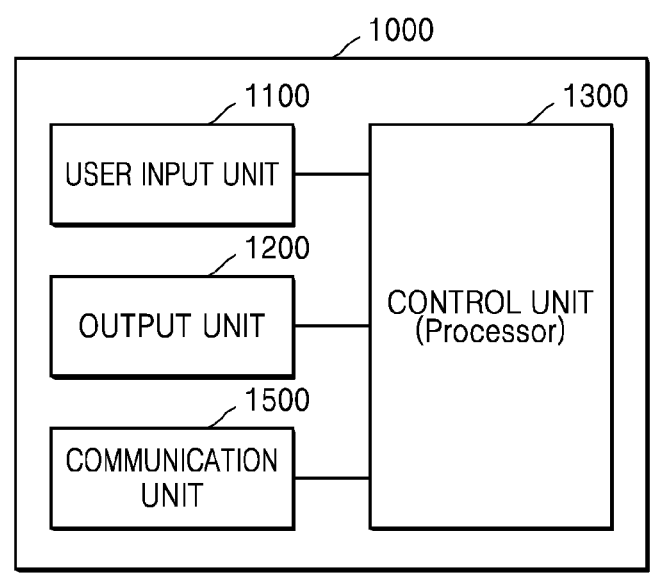
FIGS. 49 and 50 are block diagrams of the first device according to an exemplary embodiment.
Figure 50:
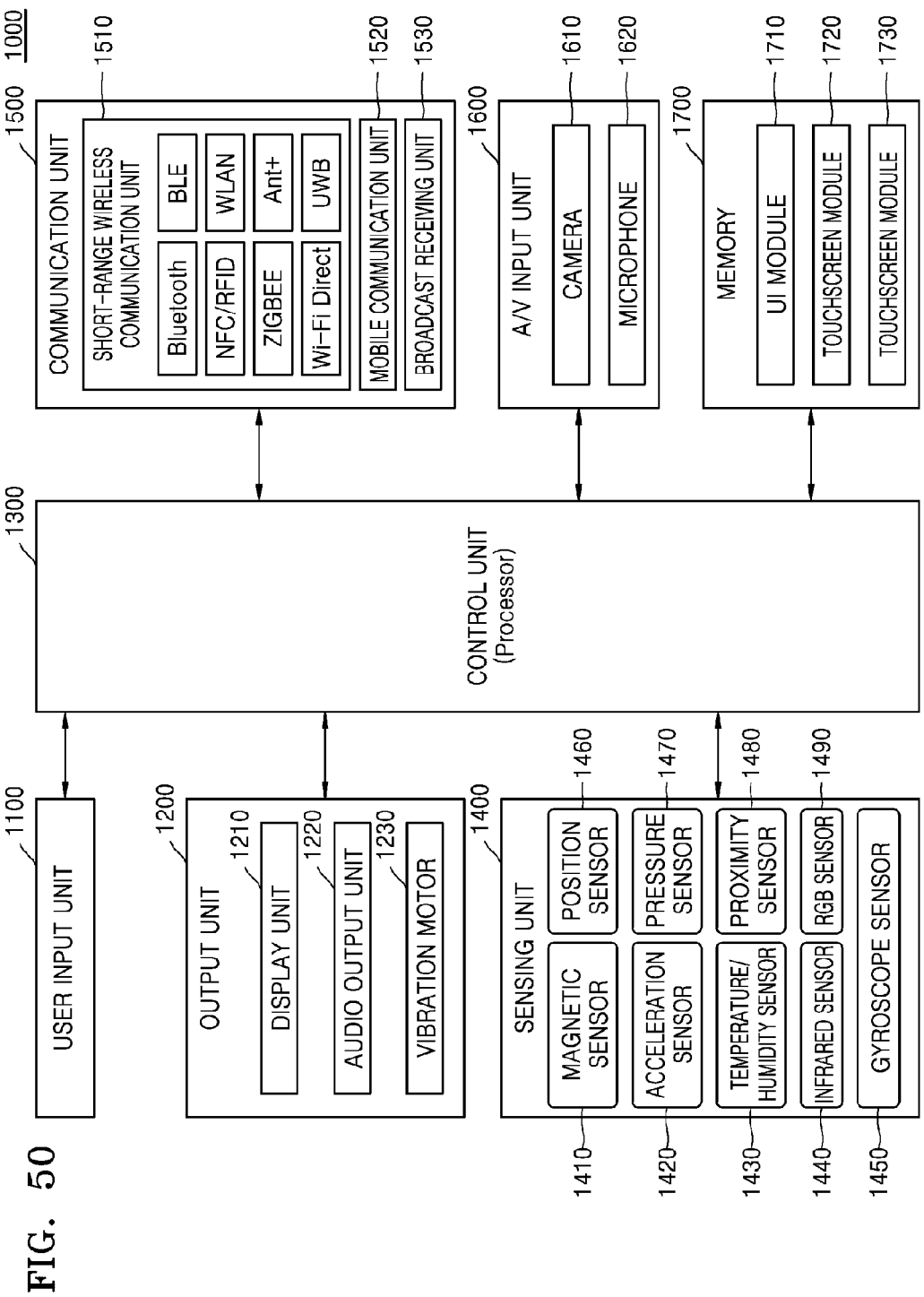

FIGS. 49 and 50 are block diagrams of the first device 1000 according to one or more exemplary embodiments.

Referring to FIG. 49, the first device 1000 may include a user input interface 1100 (e.g., user input unit), an output interface 1200 (e.g., output unit), a controller 1300 (e.g., control unit), and a communicator 1500 (e.g., transceiver, communication unit). However, it is understood that the first device 1000 may include more or less elements than the elements illustrated in FIG. 49 according to one or more other exemplary embodiments.

For example, the first device 1000 may further include a sensor 1400 (e.g., sensor unit), an audio/video (A/V) input interface 1600 (e.g., A/V input unit), and a memory 1700 in addition to the user input interface 1100, the output interface 1200, the controller 1300, and the communicator 1500.

The user input interface 1100 may refer to an interface through which the user inputs data for controlling the first device 1000. For example, the user input interface 1100 may include, but is not limited to, a keypad, a dome switch, a touch pad (e.g., a capacitive overlay type, a resistive overlay type, an infrared beam type, a surface acoustic wave type, an integral strain gauge type, or a piezoelectric type), a jog wheel, a jog switch, a keyboard, one or more buttons, etc.

The user input interface 1100 may receive a user input for generating a second file including a first file and biometric information.

The output interface 1200 may output an audio signal, a video signal, or a vibration signal and may include a display 1210 (e.g., display unit), an audio output interface 1220 (e.g., audio output unit), and a vibration motor 1230.

The display 1210 may display information processed in the first device 1000. For example, the display 1210 may display a user input for generating a second file including a first file and biometric information.

When the display 1210 includes a touchscreen with a layer structure of a touch pad, the display 1210 may be used as an input device in addition to an output device. The display 1210 may include at least one of a liquid crystal display (LCD), a thin film transistor liquid crystal display (TFT-LCD), an organic light-emitting diode (OLED) display, a flexible display, a three-dimensional (3D) display, an electrophoretic display, an active-matrix OLED (AMOLED) display, etc. Also, the first device 1000 may include two or more displays 1210 according to one or more other exemplary embodiments. In this case, the two or more displays 1210 may be disposed to face each other through a hinge structure.

The audio output interface 1220 may output audio data received from the communicator 1500 or stored in the memory 1700. Also, the audio output interface 1220 may output audio signals related to operations (e.g., call signal reception, message reception, and notification) performed in the first device 1000. The audio output interface 1220 may include, for example, at least one of a speaker, a buzzer, etc.

The vibration motor 1230 may output a vibration signal. For example, the vibration motor 1230 may output a vibration signal corresponding to an output of audio data or video data (e.g., a call signal reception sound and a message reception sound). Also, the vibration motor 1230 may output a vibration signal when a touch is input to the touchscreen.

The controller 1300 may control overall operations of the first device 1000. For example, the controller 1300 may control overall operations of the user input interface 1100, the output interface 1200, the sensor 1400, the communicator 1500, and the A/V input interface 1600 by executing programs stored in the memory 1700. Also, the controller 1300 may control the elements of the first device 1000 in order to perform the above operations of the first device 1000.

In detail, the controller 1300 may select a first file related to setting of authentication information. The controller 1300 may select a first file for setting of authentication information from among one or more files stored in the first device 1000. However, it is understood that exemplary embodiments are not limited thereto. For example, according to another exemplary embodiment, the controller 1300 may select a first file for setting of authentication information from among one or more files stored in the server 3000. Furthermore, the controller 1300 may select a first file for setting of authentication information from among one or more files stored in the second device 2000.

The selected first file may be a file to be transmitted to the second device 2000 of the second user. In this case, the controller 1300 may select the first file for setting of authentication information by executing an application for transmitting the first file to the second device 2000 and selecting the first file to be transmitted to the second device 2000 through the executed application.

The controller 1300 may acquire biometric information of the second user. The controller 1300 may acquire biometric information of the second user by acquiring content including the biometric information of the second user. For example, the controller 1300 may acquire a face image of the second user from a picture including a face of the second user from among pictures stored in the first device 1000. However, it is understood that exemplary embodiments are not limited thereto. For example, according to another exemplary embodiment, the controller 1300 may request the server 3000 for a picture including a face of the second user from among one or more pictures stored in the server 3000, receive the picture including the face of the second user from the server 3000, and acquire a face image of the second user from the received picture. Also, the controller 1300 may request the second device 2000 for a picture including a face of the second user, receive the picture including the face of the second user from the second device 2000, and acquire a face image of the second user from the received picture. The controller 1300 may extract biometric information of the second user from the content including the biometric information of the second user.

The controller 1300 may generate a second file including a first file and biometric information of the second user. The controller 1300 may set the acquired biometric information of the second user as authentication information for execution of the first file. Also, the controller 1300 may generate the second file including the first file and the acquired biometric information of the second user by packaging the first file and the biometric information of the second user. For example, the controller 1300 may package the first file and the acquired biometric information of the second user by associating or combining the first file and the acquired biometric information of the second user. However, it is understood that exemplary embodiments are not limited thereto. Furthermore, for example, information indicating the need to authenticate biometric information for execution of the first file and information about at least one of a type of biometric information for authentication, a subject of biometric information for authentication, a storage position of biometric information for authentication, and a storage position of a decryption key may be included in the packaged second file or included in metadata of the packaged second file, although it is understood that exemplary embodiments are not limited thereto.

The controller 1300 may acquire the biometric information of the second user as follows.

The controller 1300 may acquire content including biometric information of the second user from among one or more contents stored in the first device 1000. The controller 1300 may acquire the content including biometric information of the second user from among the one or more contents stored in the first device 1000 by using an identification value (e.g., a name, a nickname, or an ID) of the second user. For example, the controller 1300 may acquire a picture including a face image of the second user by determining whether the identification value of the second user is included in metadata of a picture stored in the first device 1000. However, it is understood that exemplary embodiments are not limited thereto. For example, according to another exemplary embodiment, the controller 1300 may acquire an audio file including a voice of the second user by determining whether the identification value of the second user is included in metadata of an audio file stored in the first device 1000. Also, the controller 1300 may acquire a fingerprint image of the second user by determining whether the identification value of the second user is included in metadata of a fingerprint image stored in the first device 1000.

Furthermore, the controller 1300 may determine the content including biometric information of the second user by displaying a list of acquired contents and receiving a selection input of the first user. The controller 1300 may extract the biometric information of the second user from the determined content.

However, it is understood that exemplary embodiments are not limited thereto. For example, according to another exemplary embodiment, and the controller 1300 may display a list of contents stored in the first device 1000 and the first user may directly select the content including the biometric information of the second user from the displayed list of contents. In this case, the controller 1300 may execute a contact address application and display a user list including an image of the user on an execution screen of the contact address application, and the first user may select an image of the second user from the displayed user list. For example, the controller 1300 may execute an image viewer application and display a picture list on an execution screen of the image viewer application, and the first user may select an image of the second user from the displayed picture list.

Also, the controller 1300 may acquire content including biometric information of the second user from among one or more contents stored in the server 3000. The controller 1300 may request the server 3000 for the content including the biometric information of the second user by transmitting the identification value of the second user to the server 3000. In this case, the server 3000 may acquire the content including the biometric information of the second user from among the contents stored in the server 3000 by using the identification value of the second user and transmit the acquired content to the first device 1000.

However, it is understood that exemplary embodiments are not limited thereto. For example, according to another exemplary embodiment, the server 3000 may provide a list of contents stored in the server 3000 to the first device 1000, the controller 1300 may display the provided list of contents, and the first user may directly select the content including the biometric information of the second user from the displayed list of contents. In this case, the controller 1300 may receive contact address information including a user image from the server 3000, display the received contact address information, and select an image of the second user from the displayed contact address information based on a user input of the first user.

According to another exemplary embodiment, the controller 1300 may acquire biometric information of the second user from the second device 2000. The controller 1300 may request the second device 2000 to transmit content including biometric information of the second user and receive the content including the biometric information of the second user from the second device 2000. For example, the controller 1300 may transmit a push message for requesting the content including the biometric information of the second user to the second device 2000. Also, for example, the controller 1300 may execute a messenger application and transmit a message for requesting the content including the biometric information of the second user to the second device 2000 through the executed messenger application.

In response to the request of the controller 1300, the second device 2000 may acquire the content including the biometric information of the second user from among one or more contents stored in the second device 2000 and transmit the acquired content to the first device 1000. According to another exemplary embodiment, in response to the request of the controller 1300, the second device 2000 may acquire the content including the biometric information of the second user from among one or more contents stored in the server 3000 and transmit the acquired content to the first device 1000.

Furthermore, according to another exemplary embodiment, in response to the request of the controller 1300, the second device 2000 may generate the content including the biometric information of the second user in real time and transmit the generated content to the first device 1000. In this case, in response to the request of the controller 1300, the second device 2000 may automatically perform an operation for generating the content including the biometric information of the second user in real time. For example, in response to the request of the first device 1000, the second device 2000 may automatically activate a photographing operation or a recording operation of the second device 2000. However, it is understood that exemplary embodiments are not limited thereto.

The controller 1300 may generate a second file including a first file and acquired biometric information.

The controller 1300 may encrypt a first file and generate a second file including the encrypted first file. The controller 1300 may encrypt the first file by using a predetermined encryption key. Also, the controller 1300 may generate information for acquiring a decryption key of the encrypted first file. Furthermore, the controller 1300 may generate an encryption key from biometric information and encrypt the first file by using the generated encryption key. In this case, the controller 1300 may process biometric information and generate an encryption key by using the processed biometric information. The decryption key of the first file may be identical to or different from the encryption key of the first file.

The information for acquiring the decryption key of the first file may include, for example, information about the storage position of the decryption key and information for generating the decryption key. For example, the decryption key may be stored in the memory of the first device 1000, the DB of the server 3000, or the second file to be generated, although it is understood that exemplary embodiments are not limited thereto. The information for generating the decryption key may include, for example, source data for generating the decryption key and information about a generation method of the decryption key.

Furthermore, the controller 1300 may encrypt biometric information to be included in the second file by using a predetermined encryption key. Also, the controller 1300 may generate an encryption key from biometric information and encrypt biometric information by using the generated encryption key. In this case, the controller 1300 may process biometric information and generate an encryption key by using the processed biometric information.

Moreover, the controller 1300 may generate information for acquiring a decryption key of the encrypted biometric information. The decryption key of the biometric information may be identical to or different from the encryption key of the biometric information. Similarly, the encryption key of the biometric information may be identical to or different from the encryption key of the first file.

Also, the controller 1300 may generate a second file including biometric information, an encrypted first file (or information for acquiring the encrypted first file), and information for acquiring a decryption key. The first device 1000 may generate the second file by packaging the biometric information, the encrypted first file, and the information for acquiring a decryption key.

Furthermore, the controller 1300 may generate a second file including encrypted biometric information, an encrypted first file (or information for acquiring an encrypted first file), and information for acquiring a decryption key. The first device 1000 may generate the second file by packaging the encrypted biometric information, the encrypted first file, and the information for acquiring a decryption key.

The controller 1300 may acquire biometric information of the first user, set the biometric information of the first user as authentication information for execution of the first file, and generate a second file including the first file and the biometric information of the first user.

The controller 1300 may acquire biometric information of the first user or the second user, generate an encryption key from the acquired biometric information, and encrypt the first file by using the generated encryption key.

The sensor 1400 may detect a state of the first device 1000 or a peripheral state of the first device 1000 and transmit the detected information to the controller 1300.

The sensor 1400 may include, but is not limited to, at least one of a magnetic sensor 1410, an acceleration sensor 1420, a temperature/humidity sensor 1430, an infrared sensor 1440, a gyroscope sensor 1450, a position sensor (e.g., GPS sensor) 1460, a pressure sensor 1470, a proximity sensor 1480, and an illuminance sensor (e.g., RGB sensor 1490). Since those or ordinary skill in the art may intuitively infer the respective operations of the sensors from the respective names thereof, detailed descriptions thereof will be omitted.

The communicator 1500 may include one or more elements for allowing communication between the first device 1000 and the second device 2000 or between the first device 1000 and the server 3000. For example, the communicator 1500 may include a short-range wireless communicator 1510, a mobile communicator 1520, and a broadcast receiver 1530.

The short-range wireless communicator 1510 may include, but is not limited to, a Bluetooth communicator, a Bluetooth Low Energy (BLE) communicator, a near field communicator, a wireless local area network (WLAN) such as WiFi communicator, a ZigBee communicator, an infrared data association (IrDA) communicator, a WiFi Direct (WFD) communicator, a ultra wideband (UWB) communicator, Ant+ communicator, a location limited communication protocol communicator, etc.

The mobile communicator 1520 may transmit and/or receive wireless signals with at least one of a base station, an external terminal, and a server on a mobile communication network. Herein, the wireless signals may include voice call signals, video call signals, or various types of data for transmission and reception of text/multimedia messages.

The broadcast receiver 1530 may receive broadcast signals and/or broadcast-related information from external devices through broadcast channels. The broadcast channels may include satellite channels and terrestrial channels. In one or more exemplary embodiments, the first device 1000 may not include the broadcast receiver 1530.

Also, the communicator 1500 may communicate information for generating a second file including a first file and biometric information with the second device 2000 and the server 3000.

The A/V input interface 1600 may be used to input audio signals or video signals and may include a camera 1610 and a microphone 1620. The camera 1610 may obtain a video frame such as a still image or a moving image through an image sensor in a video call mode or a photographing mode. The image captured through the image sensor may be processed by the controller 1300 or a separate image processor.

The image frame processed by the camera 1610 may be stored in the memory 1700, or may be transmitted to an outside thereof through the communicator 1500. Two or more cameras 1610 may be provided according to the configurations of the first device 1000.

The microphone 1620 may receive an input of an external audio signal and process the same into electrical audio data. For example, the microphone 1620 may receive an audio signal from an external device or a speaker. The microphone 1620 may use various noise cancellation algorithms for cancelling a noise that may be generated during the input of an external audio signal.

The memory 1700 may store a program for processing and control of the controller 1300 and may store data input/output to/from the first device 1000.

The memory 1700 may include at least one type of storage media from among a flash memory type, a hard disk type, a multimedia card micro type, a card type memory (e.g., SD and XD memories), a random access memory (RAM), a static random access memory (SRAM), a read-only memory (ROM), an electronically erasable programmable read-only memory (EEPROM), a programmable a read-only memory (PROM), a magnetic memory, a magnetic disk, and an optical disk.

The programs stored in the memory 1700 may be classified into a plurality of modules according to their operations and may be classified into, for example, a user interface (UI) module 1710, a touchscreen module 1720, and a notification module 1730.

The UI module 1710 may provide a specialized UI and graphical user interface (GUI) that interlock with the first device 1000 for respective applications. The touchscreen module 1720 may sense a touch gesture of the user on a touchscreen and transfer information about the touch gesture to the controller 1300. In one or more exemplary embodiments, the touchscreen module 1720 may detect and analyze a touch code. The touchscreen module 1720 may include separate hardware including a controller.

Various sensors may be provided in or near the touchscreen to sense a proximity touch or a touch to the touchscreen. An example of the sensor for sensing a touch to the touchscreen is a tactile sensor. The tactile sensor refers to a sensor that senses a touch of an object in the degree of a human sense or more. The tactile sensor may sense a variety of information, such as the roughness of a touch surface, the hardness of a touch object, and the temperature of a touch point.

Another example of the sensor for sensing a touch to the touchscreen is a proximity sensor.

The proximity sensor refers to a sensor that detects the presence of an object approaching a predetermined detection surface or an object located in the proximity thereof without mechanical contact by using an electromagnetic force or infrared rays. Examples of the proximity sensor may include transmission type photoelectric sensors, direct reflection type photoelectric sensors, mirror reflection type photoelectric sensors, high frequency oscillation type proximity sensors, electrostatic capacity type proximity sensors, magnetic type proximity sensors, and infrared proximity sensors. Examples of the touch gesture of the user may include tap, touch and hold, double tap, drag, panning, flick, drag and drop, swipe, multi-touch, predetermined pattern touch, etc.

The notification module 1730 may generate a signal for notifying the occurrence of an event in the first device 1000. Examples of the event occurring in the first device 1000 include call signal reception, message reception, key signal input, schedule notification, physical condition notification, biometric notification, application notification, content reception, email reception, social media update, etc. The notification module 1730 may output a notification signal of a video signal type through the display 1210, output a notification signal of an audio signal type through the audio output interface 1220, and output a notification signal of a vibration signal type through the vibration motor 1230.

Like the first device 1000, the second device 2000 may include the configurations of FIGS. 49 and 50. Also, the controller 1300 may control the elements of the second device 2000 in order to perform the above operations of the second device 2000. Hereinafter, the controller 1300 will be described on the assumption that the controller 1300 is an element included in the second device 2000.

The controller 1300 of the second device 2000 may execute a first file included in a second file. In detail, the controller 1300 may select a second file including a first file and biometric information. For example, the controller 1300 may receive a second file from the first device 1000 and select (e.g., open) the received second file. According to another example, the controller 1300 may receive a second file from the server 3000 and select the received second file.

When the second file is selected, the controller 1300 may unpackage the second file and acquire data included in the second file. The controller 1300 may acquire data included in the second file illustrated in FIGS. 9A to 9D, but exemplary embodiments are not limited thereto.

Also, the controller 1300 may acquire biometric information of the second user. When the second file is selected, the controller 1300 may display a user interface for guiding the input of biometric information and may acquire biometric information of the second user based on a user input received through the displayed user interface. Moreover, when the second file is selected, the controller 1300 display information indicating a type of biometric information and a subject of biometric information, which is used to execute the first file, on a screen of the second device 2000. In this case, the controller 1300 may identify the type of biometric information and the subject of biometric information from information included in the second file. However, exemplary embodiments are not limited thereto. For example, according to another exemplary embodiment, the controller 1300 may identify the type of biometric information and the subject of biometric information from the packaging information table stored in the server 3000 or the first device 1000.

Furthermore, the controller 1300 may activate a sensor included in the second device 2000 and acquire biometric information of the second user based on a user input received through a displayed user interface. For example, when the type of biometric information is a pupil image, the controller 1300 may activate a camera included in the second device 2000 and display a user interface for capturing a pupil image of the second user on the screen of the second device 2000. Also, the second device 2000 may photograph a pupil of the second user based on a user input of the second user through a user interface. According to another exemplary embodiment, the controller may activate the sensor included in the second device and acquire the biometric information directly without displaying a user interface to receive the user input.

Moreover, the controller 1300 may acquire content including biometric information of the second user from the server 3000.

The controller 1300 may compare the acquired biometric information with the biometric information included in the second file. In this case, the controller 1300 may determine whether the acquired biometric information is identical to the biometric information included in the second file.

The controller 1300 may execute the first file based on a result of the comparison in operation S2020. Also, when determining that the biometric information acquired in operation S2010 is identical to the biometric information included in the second file, the controller 1300 may execute the first file. The controller 1300 may decrypt the first file and execute the decrypted first file.

According to one or more exemplary embodiments, the controller 1300 may output guide information for acquiring biometric information of the second user. When the second file is selected, the controller 1300 may display a user interface for guiding the input of biometric information. The guide information included in the user interface for guiding the input of biometric information may include, for example, information about a type of biometric information, a subject of biometric information, and an acquisition method of biometric information.

Also, the controller 1300 may execute an encrypted first file included in the second file. In this case, the controller 1300 may acquire a decryption key of the encrypted first file. The controller 1300 may extract information for acquiring the decryption key included in the second file and acquire the decryption key based on information for acquiring the extracted decryption key. The decryption key of the first file may be stored, for example, in the server 3000 and/or the first device 1000. Further, the decryption key of the first file may be included in the second file, or the controller 1300 may generate the decryption key from the biometric information of the second user.

The controller 1300 may decrypt the encrypted first file and execute the decrypted first file.

Figure 51:
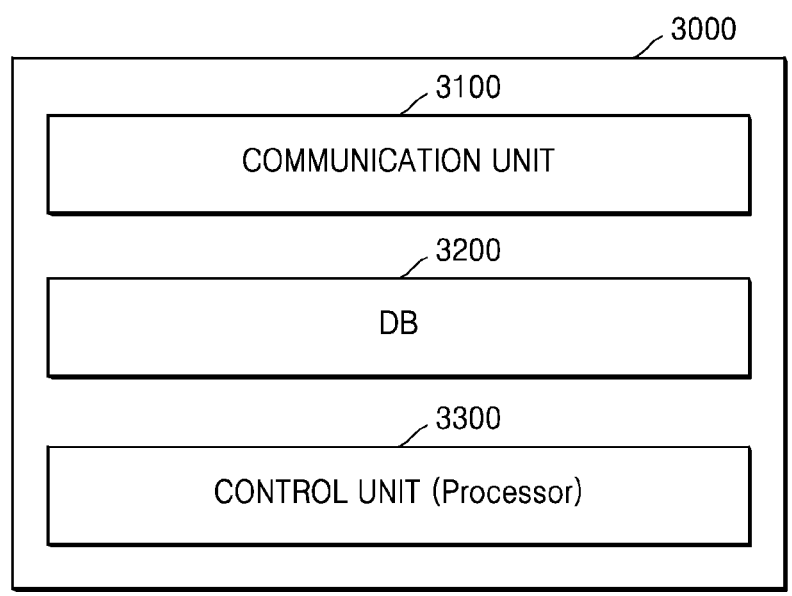
FIG. 51 is a block diagram of the server according to an exemplary embodiment.

FIG. 51 is a block diagram of the server 3000 according to an exemplary embodiment.

Referring to FIG. 51, the server 3000 may include a communicator 3100 (e.g., transceiver or communication unit), a controller 3300 (e.g., control unit), and a storage (e.g., DB 3200).

The communicator 3100 may communicate data with the first device 1000 and the second device 2000. The communicator 3100 may communicate content including biometric information of the first user and content including biometric information of the second user with the first device 1000 and the second device 2000. Also, the communicator 3100 may communicate signals, which are used to provide the content including the biometric information of the first user and the content including the biometric information of the second user to the first device 1000 and the second device 2000, with the first device 1000 and the second device 2000.

The DB 3200 may store data communicated between the first device 1000, the second device 2000, and the server 3000. The DB 3200 may store, for example, at least one of the content including the biometric information of the first user, the content including the biometric information of the second user, the information related to the encryption of the first file, the information related to the encryption of the second file, the information related to the decryption of the first file, the information related to the decryption of the second file, the first file, the second file, and a packaging setting table, but exemplary embodiments are not limited thereto.

The controller 3300 may control overall operations of the server 3000. Also, the controller 3300 may control the communicator 3100 and the DB 3200 in order to perform the above operations of the server 3000. In response to a request from the first device 1000, the controller 3300 may provide the first device 1000 with at least one of the content including at least one of the biometric information of the first user, the content including the biometric information of the second user, the information related to the encryption of the first file, the information related to the encryption of the second file, the information related to the decryption of the first file, the information related to the decryption of the second file, the first file, the second file, the packaging setting table, etc.

Additionally, in response to a request from the second device 2000, the controller 3300 may provide the second device 2000 with at least one of the content including the biometric information of the first user, the content including the biometric information of the second user, the information related to the encryption of the first file, the information related to the encryption of the second file, the information related to the decryption of the first file, the information related to the decryption of the second file, the first file, the second file, the packaging setting table, etc.

Furthermore, the controller 3300 may store and manage the first file, the second file, and the authentication information related to the first file in the DB 3200.

FIG. 9 illustrates that the second file is generated by packaging the first file and the biometric information. However, exemplary embodiments are not limited thereto. For example, elements (e.g., the first file, the biometric information, and the encryption key) used for generation of the second file may be packaged in various ways or may be transmitted separately.

Also, the elements (e.g., the first file, the biometric information, and the encryption key) used for generation of the second file may be transmitted to other devices not directly but via the server. The elements (e.g., the first file, the biometric information, and the encryption key) used for generation of the second file may be transmitted to other devices after the other devices are authenticated by the biometric information or the like.

Also, the biometric information may be transmitted as above, or the elements, descriptions, feature points, audio samples, and characteristics of the biometric information may be transmitted, and they may be used for at least one of authentication, encryption, and decryption.

Also, the following combinations of elements may be transmitted from the first device 1000 to other devices.

A combination of (a) unencrypted data and (b) unencrypted biometric information used to authenticate access to the unencrypted data;

A combination of (a) data encrypted with a public key, a preset key, or a separately stored key and (b) unencrypted biometric information used to authenticate access to the encrypted data;

A combination of (a) data encrypted with an encryption key, (b) the encryption key, and (c) unencrypted biometric information used to authenticate access to the encryption key or used for encryption/decryption;

A combination of (a) unencrypted data authenticated by public authentication information, preset authentication information, or separately stored authentication information and (b) unencrypted biometric information used to authenticate access to the public authentication information, the preset authentication information, or the separately stored authentication information;

A combination of (a) data, (b) authentication information used to authenticate access to the data, and (c) biometric information used to authenticate access to the authentication information or used for encryption/decryption;

A combination of (a) data encrypted with a public key, a preset key, or a separately stored key and (b) biometric information used to authenticate access to the data;

A combination of (a) data encrypted with a public key, a preset key, or a separately stored key and (b) biometric information used to authenticate access to the data and encrypted with a public key, a preset key, or a separately stored key (identical to or different from those used for encryption of the data);

A combination of (a) data and (b) biometric information used to authenticate access to the data or used for encryption/decryption and encrypted with a public key, a preset key, or a separately stored key; and A combination of (a) data, (b) biometric information used to authenticate access to the data, and (c) a key used for encryption/decryption of the biometric information.

However, exemplary embodiments are not limited to the above-stated combinations of elements. Various combinations of elements including biometric information of the user (the user intending to use data) used to control access to data or used for protection may be provided. Also, the biometric information used to control access to data or used for protection may not be transmitted. For example, data encrypted by the biometric information may be transmitted without transmission of the biometric information.

Similarly, data encrypted with an encryption key (e.g., data transmitted while being included in a packaged file, or data transmitted separately) may be transmitted without biometric information. In this case, the biometric information may be used to encrypt the encryption key or a combination of the encryption key and the data encrypted with the encryption key.

Also, the data authenticated by the encrypted authentication information may be transmitted without the biometric information. Herein, the biometric information may be used to encrypt the authentication information. In this case, the biometric information may not be transmitted, since the biometric information is not used for comparison with biometric information acquired from other devices. Also, the other devices may access the data only when the biometric information acquired from the other devices is used to successfully decrypt the transmitted data.

Also, since the biometric information is used as a reference for decryption, it may be understood that the biometric information may be directly used for encryption/decryption or the encryption key may be determined from the biometric information.

While the above-described exemplary embodiments are with reference to a second file as a combination of a first file and biometric information (as illustrated in FIG. 9A), a second file as a combination of an encrypted first file and biometric information (as illustrated in FIG. 9B), a second file as a combination of an encrypted first file, biometric information, and information for acquiring a decryption key (as illustrated in FIG. 9C), and a second file as a combination of an encrypted first file, encrypted biometric information, and information for acquiring a decryption key (as illustrated in FIG. 9D), it is understood that one or more other exemplary embodiments are not limited thereto. For example, according to one or more other exemplary embodiments, the above-described elements (i.e., first file, biometric information, key, etc.) may be packaged in various manners (for example, as a same file according to a file structure of the second file) or may be transmitted separately.

Additionally, any of the above-described elements (i.e., first file, biometric information, key, etc.) may not be transmitted directly to the second device, and may instead be transmitted to a third device (e.g., a server) and obtained by the second device, may be transmitted after the second device is authenticated by the biometric information, etc. In this case, information regarding the first file or regarding a location of the first file may be transmitted to the second device. Furthermore, it is understood that in one or more exemplary embodiments, biometric information may be transmitted (as described above) or components, descriptions, feature points, audio samples, characteristics (e.g., waveforms), etc., of the biometric information may be transmitted and/or used for at least one of encryption, decryption, and authentication.

Additionally, it is understood that one or more exemplary embodiments may provide the following combination of elements transmitted from a first device to a second device:

a combination of at least (a) unencrypted data and (b) unencrypted biometric information that is used to authenticate an access to the data;

a combination of at least (a) data encrypted by a known key, a predetermined key, or a separately stored key and (b) unencrypted biometric information that is used to authenticate an access to the known key, the predetermined key, or the separately stored key;

a combination of at least (a) data encrypted by an encryption key, (b) the encryption key, and (c) biometric information that is used to encrypt/decrypt or authenticate an access to the encryption key;

a combination of at least (a) unencrypted data that is authenticated by known authentication information, predetermined authentication information, or separately stored authentication information and (b) biometric information that is used to authenticate an access to the known authentication information, the predetermined authentication information, or the separately stored authentication information;

a combination of at least (a) data, (b) authentication information that is used to authenticate an access to the data, and (c) biometric information that is used to encrypt/decrypt or authenticate an access to authentication information;

a combination of at least (a) data encrypted by a known key, a predetermined key, or a separately stored key and (b) biometric information that is used to authenticate an access to the data;

a combination of at least (a) data encrypted by a known key, a predetermined key, or a separately stored key and (b) biometric information that is used to authenticate an access to the data and is encrypted by a known key, a predetermined key, or a separately stored key that is the same key or a different key from that used on the data;

a combination of at least one of (a) data and (b) biometric information that is used to encrypt/decrypt or authenticate an access to the data, and that is encrypted by a known key, a predetermined key, or a separately stored key; and a combination of at least one of (a) data, (b) biometric information that is used to encrypt/decrypt or authenticate an access to the data, and (c) a key that is used to encrypt/decrypt the biometric information.

However, it is understood that one or more other exemplary embodiments may not limited to the above-described combinations, and may provide any combination of elements whereby biometric information of a recipient user (i.e., an intended recipient of the data) is used to protect or control an access to the data. Additionally, according to one or more other exemplary embodiments, biometric information used to protect or control an access to the data may not be transmitted. For example, according to one or more other exemplary embodiments, data that is encrypted by biometric information may be transmitted without transmitting the biometric information. Similarly, data that is encrypted by an encryption key (and transmitted therewith in a packaged file or separately) may be transmitted without the biometric information where the biometric information is used to encrypt the encryption key or a combination of the encrypted data (encrypted by the encryption key) and the encryption key. Also, data that is authenticated by encrypted authentication information may be transmitted without the biometric information where the biometric information is used to encrypt the authentication information. In these cases, since the biometric information is not used for comparing with biometric information acquired or obtained at the recipient second device, the biometric information may not be transmitted. Rather, the recipient second device may access the data only if the biometric information acquired or obtained therein successfully decrypts the transmitted data.

Furthermore, where the biometric information is referred as being used to for encryption in the above-described exemplary embodiments, it is understood that the biometric information may be directly used to encrypt/decrypt, or an encryption key may be determined from the biometric information (e.g., from feature points, a characteristic, a waveform, an attribute, etc.).

Exemplary embodiments may also be implemented in the form of a computer-readable recording medium including instructions executable by a computer, such as a program module executed by a computer. The computer-readable recording medium may be any available medium accessible by computers, examples of which may include a volatile recording medium, a nonvolatile recording medium, a removable recording medium, and an unremovable recording medium. Examples of the computer-readable medium may also include a computer storage medium and a communication medium. Examples of the computer storage medium may include a volatile storage medium, a nonvolatile storage medium, a removable storage medium, and an unremovable storage medium that are implemented by any method or technology for storing information such as computer-readable instructions, data structures, program modules, or other data. Examples of the communication medium may include any information transmission medium including computer-readable instructions, data structures, program modules, other data of modulated data signals, or other transmission mechanisms.

Also, in the specification, "units" may be hardware components such as processors or circuits, and/or software components executed by hardware components such as processors.

The foregoing is illustrative of exemplary embodiments and is not to be construed as limiting thereof. Although exemplary embodiments have been described above, those of ordinary skill in the art will readily appreciate that various modifications are possible in exemplary embodiments without materially departing from the concepts and features of exemplary embodiments. Therefore, it is to be understood that exemplary embodiments described above should be considered in descriptive sense only and not for purposes of limitation. For example, elements described as being combined may also be implemented in a distributed manner, and elements described as being distributed may also be implemented in a combined manner.

Therefore, the scope of the inventive concept is defined not by the detailed description of exemplary embodiments, but by the appended claims, and all modifications or differences within the scope should be construed as being included in the present inventive concept.

It should be understood that exemplary embodiments described herein should be considered in a descriptive sense only and not for purposes of limitation. Descriptions of features or aspects within each exemplary embodiment should typically be considered as available for other similar features or aspects in other embodiments.

While one or more exemplary embodiments have been described above with reference to the figures, it will be understood by those of ordinary skill in the art that various changes in form and details may be made therein without departing from the spirit and scope of the inventive concept as defined by the following claims.

What is claimed is:

1. A device of a first user for transmitting data to a device of a second user, the device of the first user comprising:
   a controller configured to obtain and to store, in association with the second user distinct from the first user, biometric information of the second user; and
   a transceiver configured to transmit, to the device of the second user, the data and to transmit, to the device of the second user, the obtained biometric information to control an access to the data by the second user.

2. The device of claim 1, further comprising:
   a storage configured to store the biometric information of the second user,
   wherein the controller is configured to obtain the biometric information from the storage in response to a selection, identified as being input by the first user, of the second user.

3. The device of claim 1, wherein:
   the controller is configured to combine the data and the obtained biometric information into a single file to control the access to the data; and
   the transceiver is configured to transmit the single file to the device of the second user.

4. The device of claim 1, wherein the transceiver is configured to transmit the data separately from the obtained biometric information.

5. The device of claim 1, wherein:
   the controller is configured to encrypt the data using the obtained biometric information; and
   the transceiver is configured to transmit the encrypted data as well as the obtained biometric information to the device of the second user.

6. The device of claim 1, wherein:
   the controller is configured to encrypt the data using an encryption key based on the obtained biometric information; and
   the transceiver is configured to transmit the encrypted data.

7. The device of claim 1, wherein:
   the controller is configured to encrypt the data using an encryption key; and
   the transceiver is configured to transmit, to the device of the second user, the data, and to transmit, to the device of the second user, the obtained biometric information to control an access to the encryption key.

8. The device of claim 7, wherein the transceiver is configured to transmit, to the device of the second user, the encryption key or information for obtaining the encryption key.

9. The device of claim 1, wherein:
   the controller is configured to encrypt the data and the obtained biometric information using at least one encryption key; and
   the transceiver is configured to transmit, to the device of the second user, the data, and to transmit, to the device of the second user, the obtained biometric information to control an access to the data.

10. The device of claim 9, wherein the transceiver is configured to transmit, to the device of the second user, the at least one encryption key or information for obtaining the at least one encryption key.

11. A device of a second user for receiving data from a device of a first user, the device of the second user comprising:
    a transceiver configured to receive, from the device of the first user, data to which access is controlled based on first biometric information of the second user; and
    a controller configured to obtain second biometric information of the second user and to access the received data using the obtained second biometric information.

12. The device of claim 11, wherein:
    the transceiver is configured to receive, from the device of the first user, the first biometric information; and
    the controller is configured to access the received data in response to the obtained second biometric information corresponding to the received first biometric information.

13. The device of claim 12, wherein the transceiver is configured to receive a single file comprising the data and the first biometric information.

14. The device of claim 12, wherein the transceiver is configured to receive the data separately from the first biometric information.

15. The device of claim 11, wherein:
    the received data is encrypted by the first biometric information; and
    the controller is configured to access the data in response to the obtained second biometric information decrypting the data.

16. The device of claim 11, wherein:
    the received data is encrypted using an encryption key based on the first biometric information; and the controller is configured to access the data in response to a decryption key based on the obtained second biometric information decrypting the data.

17. The device of claim 11, wherein:

the received data is encrypted using an encryption key;

the transceiver is configured to receive, from the device of the first user, the first biometric information; and the controller is configured to access the encryption key using the obtained second biometric information.

18. The device of claim 17, wherein:

the transceiver is configured to receive, from the device of the first user, information for obtaining the encryption key; and the controller is configured to access the information for obtaining the encryption key using the obtained second biometric information.

19. A system for transmitting data between devices, the system comprising:

a device of a first user, comprising:

a first controller configured to obtain first biometric information of a second user, and a first transceiver configured to transmit the data and to transmit the obtained first biometric information to control an access to the data by the second user; and a device of the second user, comprising:

a second transceiver configured to receive the data transmitted by the first transceiver, and a second controller configured to obtain second biometric information of the second user and to access the received data using the obtained second biometric information.

20. The system of claim 19, wherein:

the second transceiver is configured to receive the first biometric information transmitted by the first transceiver; and the second controller is configured to access the received data in response to the obtained second biometric information corresponding to the received first biometric information.

21. The system as claimed in claim 19, further comprising a server configured to receive the data transmitted by the first transceiver, and to transmit the received data to the second transceiver.

* * * * *